US010557067B2

(12) United States Patent
Arcona et al.

(10) Patent No.: US 10,557,067 B2
(45) Date of Patent: Feb. 11, 2020

(54) ABRASIVE ARTICLE INCLUDING SHAPED ABRASIVE PARTICLES

(71) Applicant: Saint-Gobain Ceramics & Plastics, Inc., Worcester, MA (US)

(72) Inventors: Christopher Arcona, Northborough, MA (US); David Louapre, Newton, MA (US); Samuel S. Marlin, Plan d'Orgon (FR); Doruk O. Yener, Wilmington, MA (US); Jennifer H. Czerepinski, Framingham, MA (US); Kristin Breder, Belchertown, MA (US); Flavien Fremy, Boston, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 49 days.

(21) Appl. No.: 14/686,733

(22) Filed: Apr. 14, 2015

(65) Prior Publication Data
US 2015/0291866 A1 Oct. 15, 2015

Related U.S. Application Data

(60) Provisional application No. 61/979,457, filed on Apr. 14, 2014.

(51) Int. Cl.
*B24D 3/14* (2006.01)
*C09K 3/14* (2006.01)
(52) U.S. Cl.
CPC .................. *C09K 3/1409* (2013.01)

(58) Field of Classification Search
None
See application file for complete search history.

(56) References Cited

U.S. PATENT DOCUMENTS

| 345,604 A | 7/1886 | Semper |
|---|---|---|
| 1,910,444 A | 5/1933 | Nicholson |
| 2,036,903 A | 4/1936 | Webster |
| 2,049,874 A | 8/1936 | Sherk |
| 2,148,400 A | 2/1939 | Crompton, Jr. |

(Continued)

FOREIGN PATENT DOCUMENTS

| CA | 743715 A | 10/1966 |
|---|---|---|
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.

(Continued)

*Primary Examiner* — Colleen P Dunn
*Assistant Examiner* — Ross J Christie
(74) *Attorney, Agent, or Firm* — Abel Schillinger, LLP; Adrian Lawrence

(57) ABSTRACT

A shaped abrasive particle including a body comprising a first major surface, a second major surface, and a side surface extending between the first major surface and the second major surface, the body comprising a sharpness-shape-strength factor (3SF) within a range between about 0.7 and about 1.7 and a Shape Index within a range between at least about 0.01 and not greater than about 0.49.

20 Claims, 12 Drawing Sheets

(56) References Cited

U.S. PATENT DOCUMENTS

| | | |
|---|---|---|
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |

(56) References Cited

U.S. PATENT DOCUMENTS

| | | |
|---|---|---|
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |

(56) References Cited

U.S. PATENT DOCUMENTS

| | | |
|---|---|---|
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0137597 A1 | 6/2012 | Adefris et al. |
| 2012/0144754 A1 | 6/2012 | Culler et al. |

(56) References Cited

U.S. PATENT DOCUMENTS

| | | |
|---|---|---|
| 2012/0144755 A1 | 6/2012 | Erickson et al. |
| 2012/0153547 A1 | 6/2012 | Bauer et al. |
| 2012/0167481 A1* | 7/2012 | Yener .............. C09K 3/1409 51/308 |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1* | 1/2013 | Wang .............. C09K 3/1418 51/298 |
| 2013/0000216 A1* | 1/2013 | Wang .............. B24D 3/14 51/309 |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1* | 3/2013 | Panzarella .............. B24D 3/348 51/295 |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2018/0086957 A1 | 3/2018 | Sahlin et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2236247 A1 | 10/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| EP | 3342839 A1 | 7/2018 |
| FR | 2354373 A1 | 1/1978 |
| GB | 986847 A | 3/1965 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |

(56) References Cited

FOREIGN PATENT DOCUMENTS

| | | |
|---|---|---|
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2019001908 A1 | 1/2009 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A1 | 1/2018 |
| WO | 2018/026669 A1 | 2/2018 |
| WO | 2018/057465 A1 | 3/2018 |
| WO | 2018/057558 A1 | 3/2018 |

(56) References Cited

FOREIGN PATENT DOCUMENTS

| WO | 2018/063902 A1 | 4/2018 |
|---|---|---|
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018207145 A1 | 11/2018 |

OTHER PUBLICATIONS

Austin, Benson M., "Thick-Film Screen Printing," Solid State Technology, Jun. 1969, pp. 53-58.

Avril, Nicholas Joseph, "Manufacturing Glass-fiber Reinforcement for Grinding Wheels," Massachusetts Institute of Technology, 1996, 105 pgs.

Bacher, Rudolph J., "High Resolution Thick Film Printing," E.I. du Pont de Nemours & Company, Inc., pp. 576-581, date unknown.

Besse, John R., "Understanding and controlling wheel truing and dressing forces when rotary plunge dressing," Cutting Tool Engineering, Jun. 2012, vol. 64, Issue 6, 5 pages.

Brewer, L. et al., Journal of Materials Research, 1999, vol. 14, No. 10, pp. 3907-3912.

Ciccotti, M. et al., "Complex dynamics in the peeling of an adhesive tape," International Journal of Adhesion & Adhesives 24 (2004) pp. 143-151.

Dupont, "Kevlar Aramid Pulp", Copyright 2011, DuPont, 1 page.

Wu, J. et al., Friction and Wear Properties of Kevlar Pulp Reinforced Epoxy.

J. European Ceramic Society 31, Abstract only (2011) 2073-2081.

Riemer, Dietrich E., "Analytical Engineering Model of the Screen Printing Process: Part II," Solid State Technology, Sep. 1988, pp. 85-90.

Miller, L.F., "Paste Transfer in the Screening Process," Solid State Technology, Jun. 1969, pp. 46-52.

Morgan, P. et al., "Ceramic Composites of Monazite and Alumina," J. Am. Ceram. Soc., 78, 1995, 1553-63.

Riemer, Dietrich E., "Analytical Engineering Model of the Screen Printing Process: Part I," Solid State Technology, Aug. 1988, pp. 107-111.

Winter Catalogue No. 5, Dressing tools, Winter diamond tools for dressing grinding wheels, 140 pages.

Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.

3M Cubitron II Abrasive Belts Brochure, Shaping the Future, Jan. 2011, 6 pages.

Vanstrum et al., Precisely Shaped Grain (PSG): 3M's Innovation in Abrasive Grain Technology, date unknown, 1 page.

Graf, "Cubitron II: Precision-Shaped Grain (PSG) Turns the Concept of Gear Grinding Upside Down," gearsolutions.com, May 2014, pp. 36-44.

DOW Machine Tool Accessories, Grinding & Surface Finishing, www.1mta.com, Nov. 2014, 72 pages.

International Search Report for Application No. PCT/US2015/025825, dated Jul. 16, 2015, 1 page.

\* cited by examiner

FIG. 26
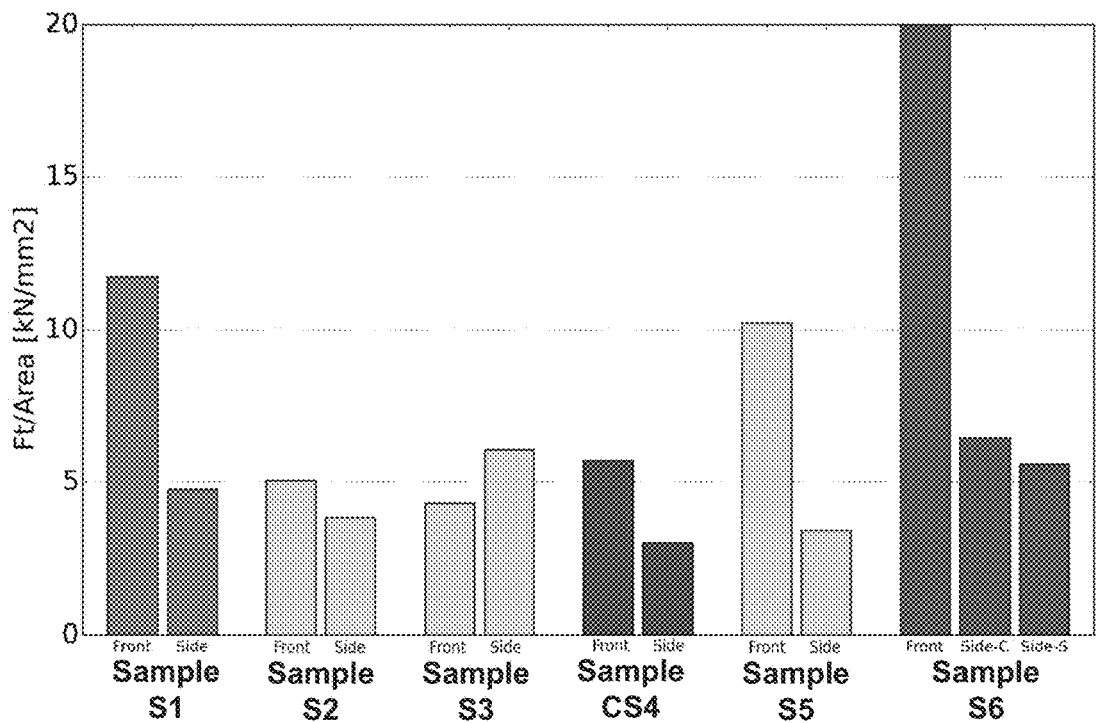
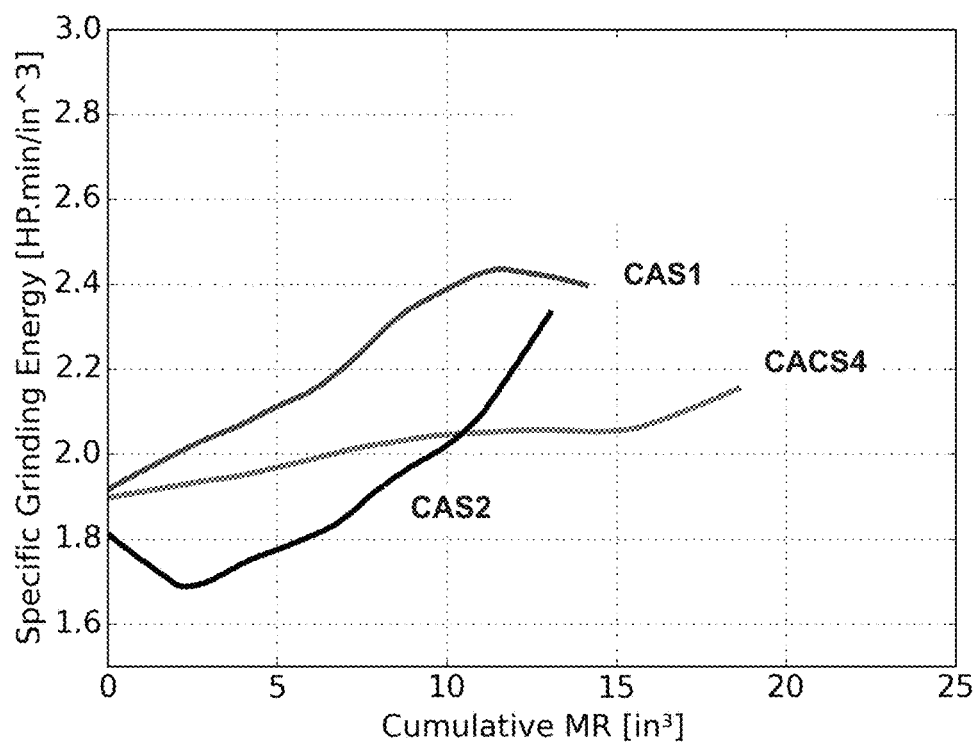
FIG. 27

ABRASIVE ARTICLE INCLUDING SHAPED ABRASIVE PARTICLES

CROSS-REFERENCE TO RELATED APPLICATION(S)

This application claims priority under 35 U.S.C. § 119(e) to U.S. Patent Application No. 61/979,457, entitled "ABRASIVE ARTICLE INCLUDING SHAPED ABRASIVE PARTICLES," by Christopher ARCONA, David LOUAPRE, Samuel S. MARLIN, Doruk O. YENER, Jennifer H. CZEREPINSKI, Kristin BREDER, and Flavien FREMY, filed Apr. 14, 2014, which is assigned to the current assignee hereof and incorporated herein by reference in its entirety.

BACKGROUND

Field of the Disclosure

The following is directed to abrasive articles, and particularly, abrasive articles including shaped abrasive particles.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660 (disclosing a process including flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor).

In the sintering process, abrasive particles can be formed from refractory powders having a particle size of up to 10 micrometers in diameter. Binders can be added to the powders along with a lubricant and a suitable solvent, e.g., water. The resulting mixture, mixtures, or slurries can be shaped into platelets or rods of various lengths and diameters. See, for example, U.S. Pat. No. 3,079,242 (disclosing a method of making abrasive particles from calcined bauxite material including (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size).

Chemical ceramic technology involves converting a colloidal dispersion or hydrosol (sometimes called a sol), optionally in a mixture, with solutions of other metal oxide precursors, into a gel or any other physical state that restrains the mobility of the components, drying, and firing to obtain a ceramic material. See, for example, U.S. Pat. Nos. 4,744,802 and 4,848,041. Other relevant disclosures on shaped abrasive particles and associated methods of forming and abrasive articles incorporating such particles are available at: abelip.com/publications/.

Still, there remains a need in the industry for improving performance, life, and efficacy of abrasive particles, and the abrasive articles that employ abrasive particles.

SUMMARY

According to one aspect, a method of making a shaped abrasive particle includes forming a body of a shaped abrasive comprising at least one of i) selecting a material having a predetermined strength within a range between at least about 350 MPa and not greater than about 1500 MPa and forming the body of the shaped abrasive particle with a predetermined tip sharpness and predetermined Shape Index based upon the predetermined strength, ii) selecting a predetermined Shape Index of the body of the shaped abrasive particle within a range between at least about 0.01 and not greater than about 0.49 and forming the body with the predetermined tip sharpness and the predetermined strength based upon the predetermined Shape Index, and iii) selecting a predetermined tip sharpness of a body of the shaped abrasive particle within a range between at least about 1 micron and not greater than about 80 microns, and forming the body of a shaped abrasive particle with a predetermined Shape Index and a predetermined strength based upon the predetermined tip sharpness.

In one aspect, a shaped abrasive particle includes a body comprising a first major surface, a second major surface, and a side surface extending between the first major surface and the second major surface, wherein the body comprises a sharpness-shape-strength factor (3SF) within a range between about 0.7 and about 1.7 and a Shape Index within a range between at least about 0.01 and not greater than about 0.49.

For another aspect, a shaped abrasive particle includes a body comprising a first major surface, a second major surface, and a side surface extending between the first major surface and the second major surface, wherein the body comprises a Shape Index within a range between at least about 0.01 and not greater than about 0.49 and a strength within a range between at least about 350 MPa and not greater than about 1500 MPa.

According to another aspect, a shaped abrasive particle includes a body comprising a first major surface, a second major surface, and a side surface extending between the first major surface and the second major surface, wherein the body comprises an average tip sharpness within a range between not greater than about 80 microns and at least about 1 micron, a Shape Index within a range between at least about 0.01 and not greater than about 0.49, and the body comprises a strength of at least about 350 MPa and not greater than about 1500 MPa.

For another aspect, a shaped abrasive particle includes a body comprising a first major surface, a second major surface, and a side surface extending between the first major surface and the second major surface, wherein a first portion of the side surface has a partially-concave shape.

In still another aspect, a shaped abrasive particle includes a body comprising a first major surface, a second major surface, and a side surface extending between the first major surface and the second major surface, wherein a first portion of the side surface extends between a first corner and second corner of the body that are adjacent to each other, and wherein the first portion of the side surface comprises a first curved section joined to a first linear section.

According to yet another aspect, a shaped abrasive particle includes a body comprising a first major surface, a second major surface, and a side surface extending between the first major surface and the second major surface, wherein a first portion of the side surface comprises a first curved section joined to a first linear section and defining an interior corner defining an obtuse angle.

For another aspect, a shaped abrasive particle includes a body comprising a first major surface, a second major surface, and a side surface extending between the first major surface and the second major surface, wherein the body is a hybrid polygonal shape having a sum of the external corners of substantially 180 degrees, and further comprising a first portion of the side surface having a first curved section.

In another aspect, a shaped abrasive particle includes a body comprising a first major surface, a second major surface, and a side surface extending between the first major surface and the second major surface, wherein the body comprises a first maximum tip width (Wt1) that defines a maximum width of a first arm of the body, and wherein the first maximum tip width (Wt1) is disposed a distance from a first terminal end of the first arm and between a midpoint of the body and the first terminal end.

BRIEF DESCRIPTION OF THE DRAWINGS

The present disclosure may be better understood, and its numerous features and advantages made apparent to those skilled in the art by referencing the accompanying drawings.

FIG. 26 includes a plot of median force per total area removed from the workpiece for shaped abrasive particles of the Examples.

FIG. 27 includes a plot of specific grinding energy per cumulative material removed for a conventional sample and a representative sample

DETAILED DESCRIPTION

The following is directed to abrasive articles including shaped abrasive particles. The methods herein may be utilized in forming shaped abrasive particles and using abrasive articles incorporating shaped abrasive particles. The shaped abrasive particles may be utilized in various applications, including for example coated abrasives, bonded abrasives, free abrasives, and a combination thereof. Various other uses may be derived for the shaped abrasive particles.

Shaped Abrasive Particles

Various methods may be utilized to obtain shaped abrasive particles. The particles may be obtained from a commercial source or fabricated. Some suitable processes used to fabricate the shaped abrasive particles can include, but is not limited to, depositing, printing (e.g., screen-printing), molding, pressing, casting, sectioning, cutting, dicing, punching, pressing, drying, curing, coating, extruding, rolling, and a combination thereof.

Figure 1:
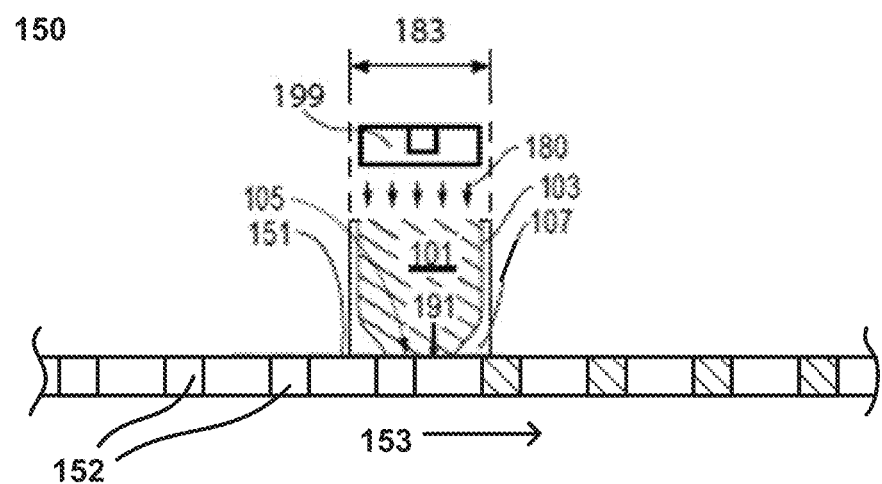
FIG. 1 includes a portion of a system for forming a particulate material in accordance with an embodiment.

FIG. 1 includes an illustration of a system 150 for forming a shaped abrasive particle in accordance with one, non-limiting embodiment. The process of forming shaped abrasive particles can be initiated by forming a mixture 101 including a ceramic material and a liquid. In particular, the mixture 101 can be a gel formed of a ceramic powder material and a liquid. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object. It will be appreciated that in some instances, the mixture 101 may not be a shape-stable material, and the process may rely upon solidification and stabilization of the mixture 101 by further processing, such as drying.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $2 \times 10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $2 \times 10^3$ Pa s, such as at least about $3 \times 10^3$ Pa s, at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In at least one non-limiting embodiment, the mixture 101 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1 can include a die 103. As illustrated, the mixture 101 can be provided within the interior of the die 103 and configured to be extruded through a die opening 105 positioned at one end of the die 103. As further illustrated, extruding can include applying a force 180 on the mixture 101 to facilitate extruding the mixture 101 through the die opening 105. During extrusion within an application zone 183, a tool 151 can be in direct contact with a portion of the die 103 and facilitate extrusion of the mixture 101 into the tool cavities 152. The tool 151 can be in the form of a screen, such as illustrated in FIG. 1, wherein the cavities 152 extend through the entire thickness of the tool 151. Still, it will be appreciated that the tool 151 may be formed such that the cavities 152 extend for a portion of the entire thickness of the tool 151 and have a bottom surface, such that the volume of space configured to hold and shape the mixture 101 is defined by a bottom surface and side surfaces.

The tool 151 may be formed of a metal material, including for example, a metal alloy, such as stainless steel. In other instances, the tool 151 may be formed of an organic material, such as a polymer.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Prior to depositing the mixture 101 in the tool cavities 152, a mold release agent can be applied to the surfaces of the tool cavities 152, which may facilitate removal of precursor shaped abrasive particles from the tool cavities 152 after further processing. Such a process can be optional and may not necessarily be used to conduct the molding process. A suitable exemplary mold release agent can include an organic material, such as one or more polymers (e.g., PTFE). In other instances, an oil (synthetic or organic) may be applied as a mold release agent to the surfaces of the tool cavities 152. One suitable oil may be peanut oil. The mold release agent may be applied using any suitable manner, including but not limited to, depositing, spraying, printing, brushing, coating, and the like.

The mixture 101 may be deposited within the tool cavities 152, which may be shaped in any suitable manner to form shaped abrasive particles having shapes corresponding to the shape of the tool cavities 152.

Figure 2:
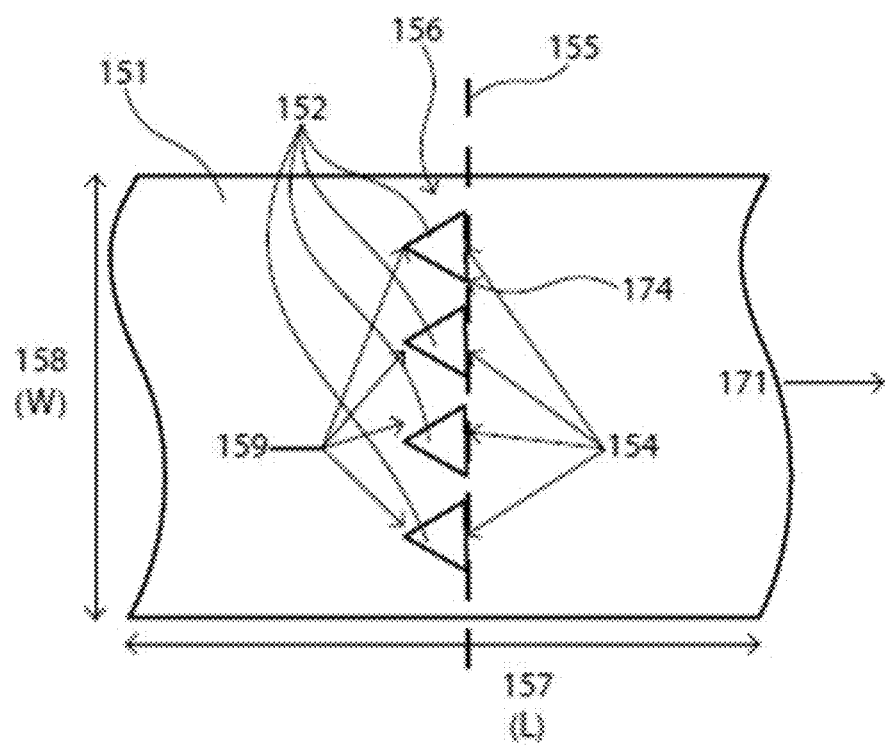
FIG. 2 includes a portion of the system of FIG. 1 for forming a particulate material in accordance with an embodiment.

Referring briefly to FIG. 2, a portion of the tool 151 is illustrated. As shown, the tool 151 can include the tool cavities 152, and more particularly, a plurality of tool cavities 152 extending into the volume of the tool 151. In accordance with an embodiment, the tool cavities 152 can have a two-dimensional shape as viewed in a plane defined by the length (l) and width (w) of the tool 151. The two-dimensional shape can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the tool cavities 152 may have two-dimensional polygonal shapes such as a rectangle, a quadrilateral, a pentagon, a hexagon, a heptagon, an octagon, a nonagon, a decagon, and a combination thereof. Notably, as will be appreciated in further reference to the shaped abrasive particles of the embodiments herein, the tool cavities 152 may utilize various other shapes.

While the tool 151 of FIG. 2 is illustrated as having tool cavities 152 oriented in a particular manner relative to each other, it will be appreciated that various other orientations may be utilized. In accordance with one embodiment, each of the tool cavities 152 can have substantially the same orientation relative to each other, and substantially the same orientation relative to the surface of the screen. For example, each of the tool cavities 152 can have a first edge 154 defining a first plane 155 for a first row 156 of the tool cavities 152 extending laterally across a lateral axis 158 of the tool 151. The first plane 155 can extend in a direction substantially orthogonal to a longitudinal axis 157 of the tool 151. However, it will be appreciated, that in other instances, the tool cavities 152 need not necessarily have the same orientation relative to each other.

Moreover, the first row 156 of tool cavities 152 can be oriented relative to a direction of translation to facilitate particular processing and controlled formation of shaped abrasive particles. For example, the tool cavities 152 can be arranged on the tool 151 such that the first plane 155 of the first row 156 defines an angle relative to the direction of translation 171. As illustrated, the first plane 155 can define an angle that is substantially orthogonal to the direction of translation 171. Still, it will be appreciated that in one embodiment, the tool cavities 152 can be arranged on the tool 151 such that the first plane 155 of the first row 156 defines a different angle with respect to the direction of translation, including for example, an acute angle or an obtuse angle. Still, it will be appreciated that the tool cavities 152 may not necessarily be arranged in rows. The tool cavities 152 may be arranged in various particular ordered distributions with respect to each other on the tool 151, such as in the form of a two-dimensional pattern. Alternatively, the openings may be disposed in a random manner on the tool 151.

Referring again to FIG. 1, during operation of the system 150, the tool 151 can be translated in a direction 153 to facilitate a continuous molding operation. As will be appreciated, the tool 151 may be in the form of a continuous belt, which can be translated over rollers to facilitate continuous processing. In some embodiments, the tool 151 can be translated while extruding the mixture 101 through the die opening 105. As illustrated in the system 150, the mixture 101 may be extruded in a direction 191. The direction of translation 153 of the tool 151 can be angled relative to the direction of extrusion 191 of the mixture 101. While the angle between the direction of translation 153 and the direction of extrusion 191 is illustrated as substantially orthogonal in the system 100, other angles are contemplated, including for example, an acute angle or an obtuse angle. After the mixture 101 is extruded through the die opening 105, the mixture 101 and tool 151 may be translated under a knife edge 107 attached to a surface of the die 103. The knife edge 107 may define a region at the front of the die 103 that facilitates displacement of the mixture 101 into the tool cavities 152 of the tool 151.

In the molding process, the mixture 101 may undergo significant drying while contained in the tool cavity 152. Therefore, shaping may be primarily attributed to substantial drying and solidification of the mixture 101 in the tool cavities 152 to shape the mixture 101. In certain instances, the shaped abrasive particles formed according to the molding process may exhibit shapes more closely replicating the features of the mold cavity compared to other processes, including for example, screen printing processes. However, it should be noted that certain beneficial shape characteristics may be more readily achieved through screen printing processes.

After applying the mold release agent, the mixture 101 can be deposited within the mold cavities and dried. Drying may include removal of a particular content of certain materials from the mixture 101, including volatiles, such as water or organic materials. In accordance with an embodiment, the drying process can be conducted at a drying temperature of not greater than about 300° C., such as not greater than about 250° C., not greater than about 200° C., not greater than about 150° C., not greater than about 100° C., not greater than about 80° C., not greater than about 60° C., not greater than about 40° C., or even not greater than about 30° C. Still, in one non-limiting embodiment, the drying process may be conducted at a drying temperature of at least about −20° C., such as at least about −10° C. at least about 0° C. at least about 5° C. at least about 10° C., or even at least about 20° C. It will be appreciated that the drying temperature may be within a range between any of the minimum and maximum temperatures noted above.

In certain instances, drying may be conducted for a particular duration to facilitate the formation of shaped abrasive particles according to embodiments herein. For example, drying can be conducted for a duration of at least about 1 minute, such as at least about 2 minutes, at least about 4 minutes, at least about 6 minutes, at least about 8 minutes, at least about 10 minutes, at least about 30 minutes, at least about 1 hour, at least about 2 hours, at least about 4 hours, at least about 8 hours, at least about 12 hours, at least about 15 hours, at least about 18 hours, at least about 24 hours. In still other instances, the process of drying may be not greater than about 30 hours, such as not greater than about 24 hours, not greater than about 20 hours, not greater than about 15 hours, not greater than about 12 hours, not greater than about 10 hours, not greater than about 8 hours, not greater than about 6 hours, not greater than about 4 hours. It will be appreciated that the duration of drying can be within a range between any of the minimum and maximum values noted above.

Additionally, drying may be conducted at a particular relative humidity to facilitate formation of shaped abrasive particles according to the embodiments herein. For example, drying may be conducted at a relative humidity of at least about 20%, at least about 30%, at least about 40%, at least about 50%, at least about 60%, such as at least about 62%, at least about 64%, at least about 66%, at least about 68%, at least about 70%, at least about 72%, at least about 74%, at least about 76%, at least about 78%, or even at least about 80%. In still other non-limiting embodiments, drying may be conducted at a relative humidity of not greater than about 90%, such as not greater than about 88%, not greater than about 86%, not greater than about 84%, not greater than about 82%, not greater than about 80%, not greater than about 78%, not greater than about 76%, not greater than about 74%, not greater than about 72%, not greater than about 70%, not greater than about 65%, not greater than about 60%, not greater than about 55%, not greater than about 50%, not greater than about 45%, not greater than about 40%, not greater than about 35%, not greater than about 30%, or even not greater than about 25%. It will be appreciated that the relative humidity utilized during drying can be within a range between any of the minimum and maximum percentages noted above.

After completing the drying process, the mixture 101 can be released from the tool cavities 152 to produce precursor shaped abrasive particles. Notably, before the mixture 101 is removed from the tool cavities 152 or after the mixture 101 is removed and the precursor shaped abrasive particles are formed, one or more post-forming processes may be completed. Such processes can include surface shaping, curing, reacting, radiating, planarizing, calcining, sintering, sieving, doping, and a combination thereof. For example, in one optional process, the mixture 101 or precursor shaped abrasive particles may be translated through an optional shaping zone, wherein at least one exterior surface of the mixture or precursor shaped abrasive particles may be shaped. In still another embodiment, the mixture 101 as contained in the mold cavities or the precursor shaped abrasive particles may be translated through an optional application zone, wherein a dopant material can be applied. In particular instances, the process of applying a dopant material can include selective placement of the dopant material on at least one exterior surface of the mixture 101 or precursor shaped abrasive particles.

The dopant material may be applied utilizing various methods including for example, spraying, dipping, depositing, impregnating, transferring, punching, cutting, pressing, crushing, and any combination thereof. In accordance with an embodiment, applying a dopant material can include the application of a particular material, such as a precursor. In certain instances, the precursor can be a salt, such as a metal salt, that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate. In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The molding process may further include a sintering process. For certain embodiments herein, sintering can be conducted after removing the mixture from the tool cavities 152 and forming the precursor shaped abrasive particles. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

The body of the finally-formed shaped abrasive particles can have particular two-dimensional shapes. For example, the body can have a two-dimensional shape, as viewed in a plane defined by the length and width of the body, and can have a shape including a polygonal shape, ellipsoidal shape, a numeral, a Greek alphabet character, a Latin alphabet character, a Russian alphabet character, a complex shape utilizing a combination of polygonal shapes and a combination thereof. Particular polygonal shapes include rectangular, trapezoidal, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 3:
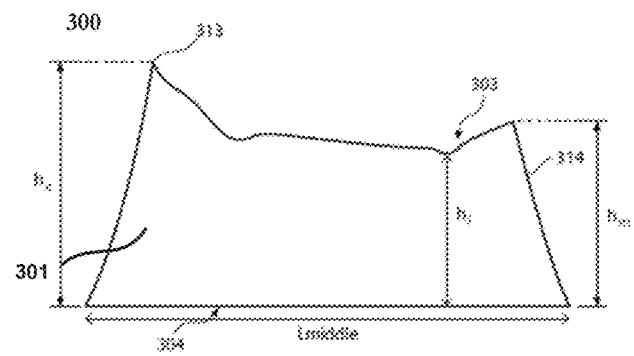
FIG. 3 includes a cross-sectional illustration of a shaped abrasive particle for illustration of certain features according to embodiments.

FIG. 3 includes a cross-sectional illustration of a shaped abrasive particle to illustrate certain features of shaped abrasive particles of the embodiments herein. It will be appreciated that such a cross-sectional view can be applied to any of the exemplary shaped abrasive particles of the embodiments to determine one or more shape aspects or dimensional characteristics as described herein. The body of the shaped abrasive particle can include an upper major surface 303 (i.e., a first major surface) and a bottom major surface 304 (i.e., a second major surface) opposite the upper major surface 303. The upper surface 303 and the bottom surface 304 can be separated from each other by a side surface 314.

In certain instances, the shaped abrasive particles of the embodiments herein, can have an average difference in height, which is a measure of the difference between hc and hm. Notably, the dimension of Lmiddle can be a length defining a distance between a height at a corner (hc) and a height at a midpoint edge (hm) opposite the corner. Moreover, the body 301 can have an interior height (hi), which can be the smallest dimension of height of the body 301 as measured along a dimension between any corner and opposite midpoint edge on the body 301. For convention herein, average difference in height will be generally identified as hc-hm, however it is defined as an absolute value of the difference. Therefore, it will be appreciated that average difference in height may be calculated as hm-hc when the height of the body 301 at the side surface 314 is greater than the height at the corner 313. More particularly, the average difference in height can be calculated based upon a plurality of shaped abrasive particles from a suitable sample size. The heights hc and hm of the particles can be measured using a STIL (Sciences et Techniques Industrielles de la Lumiere—France) Micro Measure 3D Surface Profilometer (white light (LED) chromatic aberration technique) and the average difference in height can be calculated based on the average values of hc and hm from the sample.

As illustrated in FIG. 3, in one particular embodiment, the body 301 of the shaped abrasive particle 300 may have an average difference in height at different locations at the body 301. The body 301 can have an average difference in height, which can be the absolute value of [hc−hm] between the first corner height (hc) and the second midpoint height (hm) that is quite low, such that the particle is relative flat, having an average difference in height that is not greater than about 300 microns, such as not greater than about 250 microns, not greater than about 220 microns, not greater than about 180 microns, not greater than about 150 microns, not greater than about 100 microns, not greater than about 50 microns, or even not greater than about 20 microns.

The body of the shaped abrasive particles herein can include a width (w) that is the longest dimension of the body and extending along a side. The shaped abrasive particles can include a length that extends through a midpoint of the body and bisecting the body (i.e., Lmiddle). The body can further include a height (h), which may be a dimension of the body extending in a direction perpendicular to the length and width in a direction defined by a side surface of the body 301. In specific instances, the width can be greater than or equal to the length, the length can be greater than or equal to the height, and the width can be greater than or equal to the height.

In particular instances, the body 301 can be formed to have a primary aspect ratio, which is a ratio expressed as width:length, having a value of at least 1:1. In other instances, the body 301 can be formed such that the primary aspect ratio (w:l) is at least about 1.5:1, such as at least about 2:1, at least about 4:1, or even at least about 5:1. Still, in other instances, the abrasive particle 300 can be formed such that the body 301 has a primary aspect ratio that is not greater than about 10:1, such as not greater than 9:1, not greater than about 8:1, or even not greater than about 5:1. It will be appreciated that the body 301 can have a primary aspect ratio within a range between any of the ratios noted above. Furthermore, it will be appreciated that reference herein to a height can be reference to the maximum height measurable of the abrasive particle 300.

In addition to the primary aspect ratio, the abrasive particle 300 can be formed such that the body 301 comprises a secondary aspect ratio, which can be defined as a ratio of length:height, wherein the height is an interior median height (Mhi). In certain instances, the secondary aspect ratio can be at least about 1:1, such as at least about 2:1, at least about 4:1, or even at least about 5:1. Still, in other instances, the abrasive particle 300 can be formed such that the body 301 has a secondary aspect ratio that is not greater than about 1:3, such as not greater than 1:2, or even not greater than about 1:1. It will be appreciated that the body 301 can have a secondary aspect ratio within a range between any of the ratios noted above, such as within a range between about 5:1 and about 1:1.

In accordance with another embodiment, the abrasive particle 300 can be formed such that the body 301 comprises a tertiary aspect ratio, defined by the ratio width:height, wherein the height is an interior median height (Mhi). The tertiary aspect ratio of the body 301 can be can be at least about 1:1, such as at least about 2:1, at least about 4:1, at least about 5:1, or even at least about 6:1. Still, in other instances, the abrasive particle 300 can be formed such that the body 301 has a tertiary aspect ratio that is not greater than about 3:1, such as not greater than 2:1, or even not greater than about 1:1. It will be appreciated that the body 301 can have a tertiary aspect ratio within a range between any of the ratios noted above, such as within a range between about 6:1 and about 1:1.

According to one embodiment, the body 301 of the shaped abrasive particle 300 can have particular dimensions, which may facilitate improved performance. For example, in one instance, the body 301 can have an interior height (hi), which can be the smallest dimension of height of the body 301 as measured along a dimension between any corner and opposite midpoint edge on the body 301. In particular instances, the interior height (hi) may be the smallest dimension of height (i.e., measure between the bottom surface 304 and the upper surface 305) of the body 301 for three measurements taken between each of the exterior corners and the opposite midpoint edges. The interior height (hi) of the body 301 of a shaped abrasive particle 300 is illustrated in FIG. 3. According to one embodiment, the interior height (hi) can be at least about 20% of the width (w). The height (hi) may be measured by sectioning or mounting and grinding the shaped abrasive particle 300 and viewing in a manner sufficient (e.g., light microscope or SEM) to determine the smallest height (hi) within the interior of the body 301. In one particular embodiment, the height (hi) can be at least about 22% of the width, such as at least about 25%, at least about 30%, or even at least about 33%, of the width of the body 301. For one non-limiting embodiment, the height (hi) of the body 301 can be not greater than about 80% of the width of the body 301, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body 301 can be within a range between any of the above noted minimum and maximum percentages.

A batch of shaped abrasive particles can be fabricated where the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 20% of the width, such as at least about 22%, at least about 25%, at least about 30%, or even at least about 33% of the median width of the shaped abrasive particles of the batch. For one non-limiting embodiment, the median interior height (Mhi) of the body 301 can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width of the body 301. It will be appreciated that the median interior height (Mhi) of the body 301 can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body 301 of the shaped abrasive particle 300 can have a height, which may be an interior height (hi), of at least about 70 microns. More particularly, the height may be at least about 80 microns, such as at least about 90 microns, at least about 100 microns, at least about 110 microns, at least about 120 microns, at least about 150 microns, at least about 175 microns, at least about 200 microns, at least about 225 microns, at least about 250 microns, at least about 275 microns, or even at least about 300 microns. In still one non-limiting embodiment, the height of the body 301 can be not greater than about 3 mm, such as not greater than about 2 mm, not greater than about 1.5 mm, not greater than about 1 mm, or even not greater than about 800 microns, not greater than about 600 microns, not greater than about 500 microns, not greater than about 475 microns, not greater than about 450 microns, not greater than about 425 microns, not greater than about 400 microns, not greater than about 375 microns, not greater than about 350 microns, not greater than about 325 microns, not greater than about 300 microns, not greater than about 275 microns, or even not greater than about 250 microns. It will be appreciated that the height of the body 301 can be within a range between any of the above noted minimum and maximum values. Moreover, it will be appreciated that the above range of values can be representative of a median interior height (Mhi) value for a batch of shaped abrasive particles.

For certain embodiments herein, the body 301 of the shaped abrasive particle 300 can have particular dimensions, including for example, a width≥length, a length≥height, and a width≥height. More particularly, the body 301 of the shaped abrasive particle 300 can have a width (w) of at least about 200 microns, such as at least about 250 microns, at least about 300 microns, at least about 350 microns, at least about 400 microns, at least about 450 microns, at least about 500 microns, at least about 550 microns, at least about 600 microns, at least about 700 microns, at least about 800 microns, or even at least about 900 microns. In one non-limiting instance, the body 301 can have a width of not greater than about 4 mm, such as not greater than about 3 mm, not greater than about 2.5 mm, or even not greater than about 2 mm. It will be appreciated that the width of the body 301 can be within a range between any of the above noted minimum and maximum values. Moreover, it will be appreciated that the above range of values can be representative of a median width (Mw) for a batch of shaped abrasive particles.

The body 301 of the shaped abrasive particle 300 can have particular dimensions, including for example, a length (Lmiddle or Lp) of at least about 0.4 mm, such as at least about 0.6 mm, at least about 0.8 mm, or even at least about 0.9 mm. Still, for at least one non-limiting embodiment, the body 301 can have a length of not greater than about 4 mm, such as not greater than about 3 mm, not greater than about 2.5 mm, or even not greater than about 2 mm. It will be appreciated that the length of the body 301 can be within a range between any of the above noted minimum and maximum values. Moreover, it will be appreciated that the above range of values can be representative of a median length (Ml), which may be more particularly a median middle length (MLmiddle) or median profile length (MLp), for a batch of shaped abrasive particles.

The shaped abrasive particle 300 can have a body 301 having a particular amount of dishing, wherein the dishing value (d) can be defined as a ratio between an average height of the body 301 at the exterior corners (Ahc) as compared to the smallest dimension of height of the body 301 at the interior (hi). The average height of the body 301 at the corners (Ahc) can be calculated by measuring the height of the body 301 at all corners and averaging the values, and may be distinct from a single value of height at one corner (hc). The average height of the body 301 at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, not greater than about 1.5, or even not greater than about 1.2. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 301 of the particle of FIG. 3 can have a bottom surface 304 defining a bottom area ($A_b$). In particular instances, the bottom surface 304 can be the largest surface of the body 301. The bottom major surface 304 can have a surface area defined as the bottom area ($A_b$) that is different than the surface area of the upper major surface 303. In one particular embodiment, the bottom major surface 304 can have a surface area defined as the bottom area ($A_b$) that is different than the surface area of the upper major surface 303. In another embodiment, the bottom major surface 304 can have a surface area defined as the bottom area ($A_b$) that is less than the surface area of the upper major surface 303.

Additionally, the body 301 can have a cross-sectional midpoint area ($A_m$) defining an area of a plane perpendicular to the bottom area ($A_b$) and extending through a midpoint 381 of the particle 300. In certain instances, the body 301 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein including, for example, the particle of FIG. 3, can have a normalized height difference of not greater than about 0.3. The normalized height difference can be defined by the absolute value of the equation [(hc−hm)/(hi)]. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, or even at least about 0.06. It will be appreciated that the normalized height difference can be within a range between any of the minimum and maximum values noted above. Moreover, it will be appreciated that the above normalized height values can be representative of a median normalized height value for a batch of shaped abrasive particles.

The shaped abrasive particle 300 can be formed such that the body 301 includes a crystalline material, and more particularly, a polycrystalline material. Notably, the polycrystalline material can include abrasive grains. In one embodiment, the body 301 can be essentially free of an organic material, including for example, a binder. More particularly, the body 301 can consist essentially of a polycrystalline material.

In one aspect, the body 301 of the shaped abrasive particle 300 can be an agglomerate including a plurality of abrasive particles, grit, and/or grains bonded to each other to form the body 301 of the abrasive particle 300. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 300 is formed such that the abrasive grains forming the body 301 include alumina, and more particularly, may consist essentially of alumina. Moreover, in particular instances, the shaped abrasive particle 300 can be formed from a seeded sol-gel.

The abrasive grains (i.e., crystallites) contained within the body 301 may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron, not greater than about 0.9 microns, not greater than about 0.8 microns, not greater than about 0.7 microns, or even not greater than about 0.6 microns. Still, the average grain size of the abrasive grains contained within the body 301 can be at least about 0.01 microns, such as at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns, or even at least about 0.5 microns. It will be appreciated that the abrasive grains can have an average grain size within a range between any of the minimum and maximum values noted above.

In accordance with certain embodiments, the abrasive particle 300 can be a composite article including at least two different types of grains within the body 301. It will be appreciated that different types of grains are grains having different compositions with regard to each other. For example, the body 301 can be formed such that is includes at least two different types of grains, wherein the two different types of grains can be nitrides, oxides, carbides, borides, oxynitrides, oxyborides, diamond, and a combination thereof.

In accordance with an embodiment, the abrasive particle 300 can have an average particle size, as measured by the largest dimension measurable on the body 301, of at least about 100 microns. In fact, the abrasive particle 300 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 300 can have an average particle size that is not greater than about 5 mm, such as not greater than about 3 mm, not greater than about 2 mm, or even not greater than about 1.5 mm. It will be appreciated that the abrasive particle 300 can have an average particle size within a range between any of the minimum and maximum values noted above.

Figure 4:
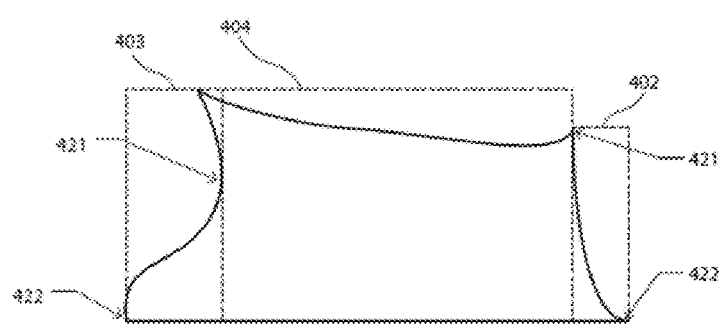
FIG. 4 includes a side view of a shaped abrasive particle and percentage flashing according to an embodiment.

The shaped abrasive particles of the embodiments herein can have a percent flashing that may facilitate improved performance. Notably, the flashing defines an area of the particle as viewed along one side, such as illustrated in FIG. 4, wherein the flashing extends from a side surface of the body 301 within the boxes 402 and 403. The flashing can represent tapered regions proximate to the upper surface 303 and bottom surface 304 of the body 301. The flashing can be measured as the percentage of area of the body 301 along the side surface contained within a box extending between an innermost point of the side surface (e.g., 421) and an outermost point (e.g., 422) on the side surface of the body 301. In one particular instance, the body 301 can have a particular content of flashing, which can be the percentage of area of the body 301 contained within the boxes 402 and 403 compared to the total area of the body 301 contained within boxes 402, 403, and 404. According to one embodiment, the percent flashing (f) of the body 301 can be at least about 1%. In another embodiment, the percent flashing can be greater, such as at least about 2%, at least about 3%, at least about 5%, at least about 8%, at least about 10%, at least about 12%, such as at least about 15%, at least about 18%, or even at least about 20%. Still, in a non-limiting embodiment, the percent flashing of the body 301 can be controlled and may be not greater than about 45%, such as not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, or even not greater than about 4%. It will be appreciated that the percent flashing of the body 301 can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle 300 on its side and viewing the body 301 at the side to generate a black and white image, such as illustrated in FIG. 4. A suitable program for such includes ImageJ software. The percentage flashing can be calculated by determining the area of the body 301 in the boxes 402 and 403 compared to the total area of the body 301 as viewed at the side (total shaded area), including the area in the center 404 and within the boxes. Such a procedure can be completed for a suitable sampling of particles to generate average, median, and/or and standard deviation values.

Figure 12A:
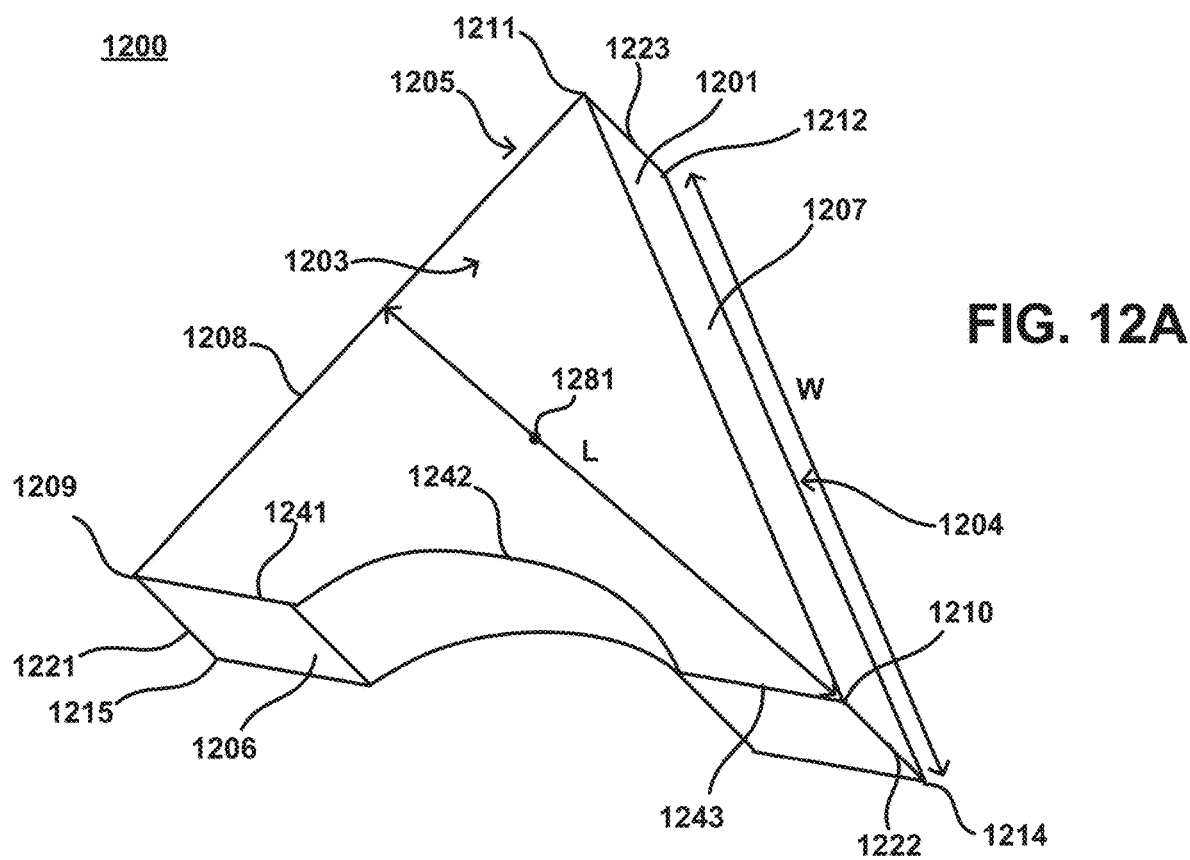
FIG. 12A includes a perspective view illustration of a shaped abrasive particle according to an embodiment.
Figure 12B:
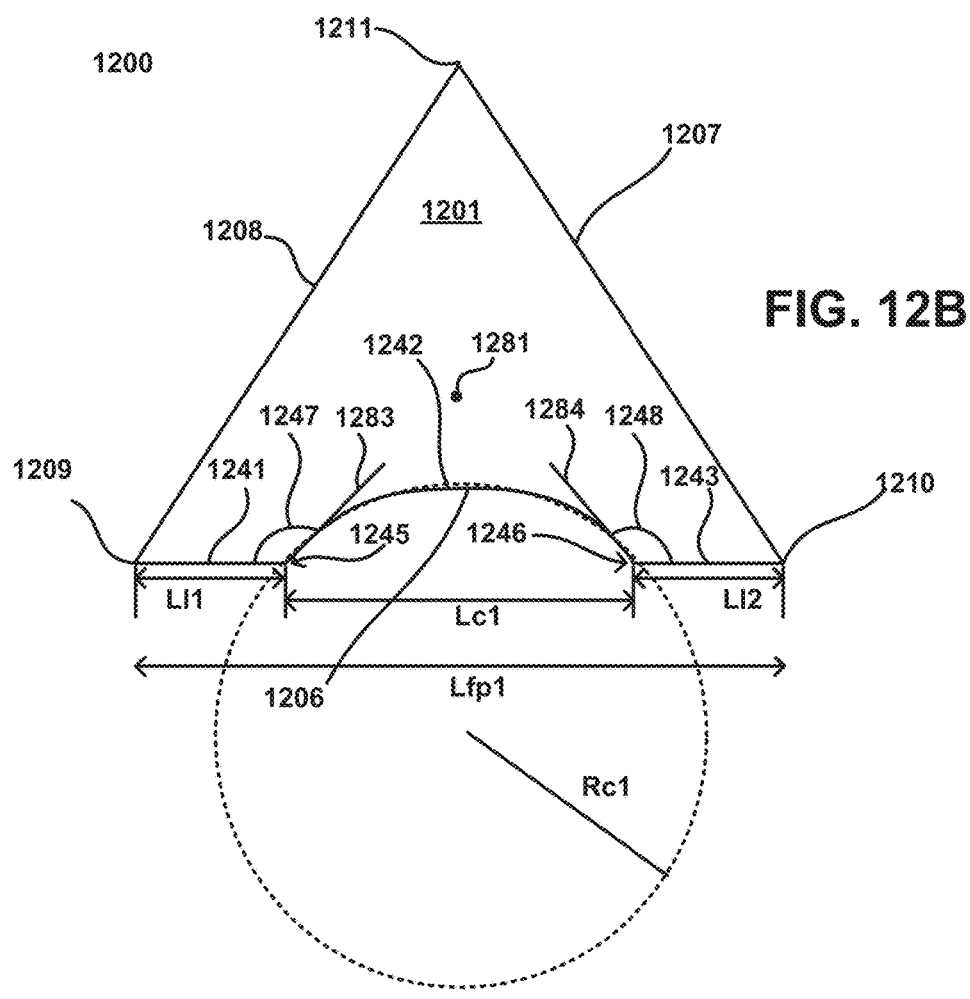
FIG. 12B includes a top view illustration of a shaped abrasive particle according to an embodiment.

FIG. 12A includes a perspective view illustration of a shaped abrasive particle according to an embodiment. FIG. 12B includes a top view illustration of a shaped abrasive particle according to an embodiment. As illustrated, the shaped abrasive particle 1200 can include a body 1201 having an upper major surface 1203 (i.e., a first major surface) and a bottom major surface 1204 (i.e., a second major surface) opposite the upper major surface 1203. The upper surface 1203 and the bottom surface 1204 can be separated from each other by at least one side surface 1205, which may include one or more discrete side surface portions, including for example, a first portion 1206 of the side surface 1205, a second portion 1207 of the side surface 1205, and a third portion 1208 of the side surface 1205. In particular, the first portion 1206 of the side surface 1205 can extend between a first corner 1209 and a second corner 1210. Notably, the first corner 1209 can be an external corner joining two portions of the side surface 1205. The first corner 1209 and second corner 1210, which is also an external corner, are adjacent to each other and have no other external corners disposed between them. External corners of a body are defined by the joining of two linear sections when viewing the body of the shaped abrasive particle top down.

The second portion 1207 of the side surface 1205 can extend between a second corner 1210 and a third corner 1211. Notably, the second corner 1210 is an external corner joining two portions of the side surface 1205. The second corner 1210 and third corner 1211, which is also an external corner, are adjacent to each other and have no other external corners disposed between them. Also, the third portion 1208 of the side surface 1205 can extend between the third corner 1211 and the first corner 1209, which are both external corners that are adjacent to each other, having no other external corners disposed between them.

Moreover, as illustrated in the perspective view of FIG. 12A, the first portion 1206, second portion 1207, and third portion 1208 of the side surface 1205 may be joined to each other by edges 1221, 1222, and 1223, respectively. The edges 1221, 1222, and 1223 extend between the upper major surface 1203 and the bottom major surface 1204.

The edge 1223 can extend between an external corner 1211 of the upper major surface 1203 and an external corner 1212 of the bottom major surface 1204. The edge 1222 can extend between an external corner 1210 of the upper major surface 1203 and an external corner 1214 of the bottom major surface 1204. The edge 1221 can extend between an external corner 1209 of the upper major surface 1203 and an external corner 1215 of the bottom major surface 1204.

The body 1201 can have a length (L or Lmiddle) as shown in FIG. 12A, which may be measured as the longest dimension extending from an external corner (e.g., 1210) to a midpoint at the opposite side surface (e.g., the third portion 1208 of the side surface 1205). Notably, in some embodiments, such as illustrated in FIG. 12A, the length can extend through a midpoint 1281 of the upper surface 1203 of the body 1201, however, this may not necessarily be the case for every embodiment. Moreover, the body 1201 can have a width (W), which is the measure of the longest dimension of the body 1201 along a discrete side surface portion of the side surface 1205. The height of the body may be generally the distance between the upper major surface 1203 and the bottom major surface 1204. As described in embodiments herein, the height may vary in dimension at different locations of the body 1201, such as at the corners versus at the interior of the body 1201.

As illustrated, the body 1201 of the shaped abrasive particle 1200 can have a generally polygonal shape as viewed in a plane parallel to the upper surface 1203, and more particularly, a hybrid polygonal two-dimensional shape as viewed in the plane of the width and length of the body (i.e., the top view as shown in FIG. 12B), having 5 external points or external corners.

As noted in other embodiments herein, the body 1201 can be formed to have a primary aspect ratio, which can be a ratio expressed as width:length, having the values described in embodiments herein. In other instances, the body 1201 can be formed such that the primary aspect ratio (w:l) can be at least about 1.5:1, such as at least about 2:1, at least about 4:1, or even at least about 5:1. Still, in other instances, the abrasive particle 1200 can be formed such that the body 1201 has a primary aspect ratio that is not greater than about 10:1, such as not greater than 9:1, not greater than about 8:1, or even not greater than about 5:1. It will be appreciated that the body 1201 can have a primary aspect ratio within a range between any of the ratios noted above.

In addition to the primary aspect ratio, the abrasive particle 1200 can be formed such that the body 1201 comprises a secondary aspect ratio, which can be defined as a ratio of length:height, wherein the height may be an interior median height (Mhi) measured at the midpoint 1281. In certain instances, the secondary aspect ratio can be at least about 1:1, such as at least about 2:1, at least about 4:1, or even at least about 5:1. Still, in other instances, the abrasive particle 1200 can be formed such that the body 1201 has a secondary aspect ratio that is not greater than about 1:3, such as not greater than 1:2, or even not greater than about 1:1. It will be appreciated that the body 1201 can have a secondary aspect ratio within a range between any of the ratios noted above, such as within a range between about 5:1 and about 1:1.

In accordance with another embodiment, the abrasive particle 1200 can be formed such that the body 1201 comprises a tertiary aspect ratio, defined by the ratio width:height, wherein the height may be an interior median height (Mhi). The tertiary aspect ratio of the body 1201 can be at least about 1:1, such as at least about 2:1, at least about 4:1, at least about 5:1, or even at least about 6:1. Still, in other instances, the abrasive particle 1200 can be formed such that the body 1201 has a tertiary aspect ratio that is not greater than about 3:1, such as not greater than 2:1, or even not greater than about 1:1. It will be appreciated that the body 1201 can have a tertiary aspect ratio within a range between any of the ratios noted above, such as within a range between about 6:1 and about 1:1.

In one aspect, the body 1201 of the shaped abrasive particle 1200 can have a first portion 1206 of the side surface 1205 with a partially-concave shape. As shown in FIG. 12B, a partially concave shape includes a curved section 1242 whose first curved section length (Lc1 extends for a fraction of the total length (Lfp1) of the first portion 1206 of the side surface 1205 between the adjacent corners 1209 and 1210. In an embodiment, the total length (Lfp1) can be equivalents to a width of the body 1201. Moreover, as further illustrated in the embodiment of FIGS. 12A and 12B, the first curved section 1242 can be disposed between a first linear section 1241 and a second linear section 1243. The first linear section 1241 can terminate at a first end at the external corner 1209 of the body 1201, extend along the first portion 1206 of the side surface 1205 for a length (Ll1), and terminate at a second end at the joining of the first linear section 1241 with the first curved section 1242. The first curved section 1242 and the first linear section 1241 can define a first interior corner 1245, which along with the first linear section 1241 and the first curved section 1242 can define a first interior angle 1247 having an obtuse value. The second linear section 1243 can terminate at a first end at the external corner 1210, extend along the first portion 1206 of the side surface 1205 for a length (Ll2), and terminate at a second end at the joining of the second linear section 1243 with the first curved section 1242. The second linear section 1243 and the first curved section 1242 can define a second interior corner 1246. The second interior corner 1246, along with the second linear section 1243 and the first curved section 1242 can define a second interior angle 1248 having an obtuse value.

As will be appreciated, the first linear section 1241 and the second linear section 1243 can be substantially linear when viewed from the top down, as illustrated in FIG. 12B. The first curved section 1242 can have a significant arcuate contour when viewed from the top down, also as shown in FIG. 12B. In certain instances, the body 1201 may be referred to as a hybrid polygonal shape, wherein a sum of the external corners is substantially 180 degrees, and wherein at least a portion of the side surface (e.g., the first portion 1206) has an arcuate curvature, such as the contour of the first curved section 1242.

As illustrated in FIG. 12B, the first linear section 1241 can have a first linear section length (Ll1) and the first curved section 1242 can have a first curved section length (Lc1). In certain embodiments, the length of the first curved section 1242 can be not less than the length of the first linear section 1241 (i.e., Lc1≥Ll1). Still, in at least one non-limiting embodiment, the length of the first linear section 1241 can be not less than the length of the first curved section 1242 (i.e., Ll1≥Lc1). In at least one particular instance, the relationship between the length of the first linear section 1241 and the first curved section 1242 may define a length factor (Ll1/Lc1) that may facilitate certain performance of the shaped abrasive particle 1200. For example, the length factor (Ll1/Lc1) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. For yet another non-limiting embodiment, the length factor ($Ll1/Lc1$) can be at least about 0.05, such as at least about 0.1, at least about 0.15, or even at least about 0.2. It will be appreciated that the length factor ($Ll1/Lc1$) can be within a range between any of the minimum and maximum values noted above.

In at least one alternative embodiment, the body 1201 can define another length factor ($Lc1/Ll1$), which may be suitable for facilitating improved performance e of the shaped abrasive particle and having a value not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the length factor ($Lc1/Ll1$) can be at least about 0.05, such as at least about 0.1, at least about 0.15, or even at least about 0.2. It will be appreciated that the length factor ($Lc1/Ll1$) can be within a range between any of the minimum and maximum values noted above.

As further illustrated, the second linear section 1243 can have a length ($Ll2$). In at least one embodiment, $Ll1$ and $Ll2$ can be substantially equal to each other. In still other instances, $Ll1$ and $Ll2$ can be measurably different compared to each other.

In another aspect, the second linear section 1243 can have a particular length relative to the length of the first curved section 1242, which may facilitate improved performance of the body 1201. For example, in one embodiment, $Lc1$ can be not less than $Ll2$ (i.e., $Lc1 \geq Ll2$). In a more particular embodiment, the relationship between the length ($Ll2$) of the second linear section 1243 and the length ($Lc1$) of the first curved section 1242 can define a length factor ($Ll2/Lc1$), which may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor ($Ll2/Lc1$) may be at least about 0.05, such as at least about 0.1, at least about 0.15, or even at least about 0.2. It will be appreciated that the length factor ($Ll2/Lc1$) can be within a range between any of the minimum and maximum values noted above.

In still another embodiment, the relationship between the length ($Ll2$) of the second linear section 1243 and the length ($Lc1$) of the first curved section 1242 can define another length factor ($Lc1/Ll2$), which may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. In still another non-limiting embodiment, the length factor ($Lc1/Ll2$) can be at least about 0.05, such as at least about 0.1, at least about 0.15, at least about 0.2. It will be appreciated that the length factor ($Lc1/Ll2$) can be within a range between any of the minimum and maximum values noted above.

The body 1201 may be formed such that the first portion 1206 of the side surface 1205 has a particular relationship between the sum of the length ($Ll1$) of the first linear section 1241 and the length ($Ll2$) of the second linear section 1243, relative to the length ($Lc1$) of the first curved section 1242, such that a linear sum factor (($Ll1+Ll2$)/$Lc1$) may be controlled to facilitate improved performance of the body 1201. According to at least one embodiment, the linear sum factor can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another non-limiting embodiment, the linear sum factor (($Ll1+Ll2$)/$Lc1$) can be at least about 0.05, such as at least about 0.1, at least about 0.15, or even at least about 0.2. It will be appreciated that the linear sum factor (($Ll1+Ll2$)/$Lc1$) can be within a range between any of the minimum and maximum values noted above.

For still another embodiment, the body 1201 may be formed such that the first portion 1206 of the side surface 1205 can have a particular relationship between the sum of the length ($Ll1$) of the first linear section 1241 and the length ($Ll2$) of the second linear section 1243, relative to the length ($Lc1$) of the first curved section 1242, such that an inverse linear sum factor (($Lc1/(Ll1+Ll2)$) is defined. The inverse linear sum factor can be controlled to facilitate improved performance of the body 1201. In at least one embodiment the inverse linear sum factor ($Lc1/(Ll1+Ll2)$) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the inverse linear sum factor (Lc1/(Ll1+Ll2)) can be at least about 0.05, such as at least about 0.1, at least about 0.15, or even at least about 0.2. It will be appreciated that the inverse linear sum factor (Lc1/(Ll1+Ll2)) can be within a range between any of the minimum and maximum values noted above.

According to one embodiment, the first curved section 1242 can have a particular first curved section length (Lc1) relative to the total length (Lfp1) of the first portion 1206 that may facilitate improved performance of the body 1201. The total length (Lfp1) of the first portion 1206 can be equivalent to a width (W) of the body 1201. In certain instances, the first curved section length (Lc1) can be a fraction of a total length (Lfp1) of the first portion 1206 of the side surface 1205. For example, the relationship between the first curved section length (Lc1) and the total length (Lfp1) of the first portion 1206 can define a length factor (Lc1/Lfp1), which maybe not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Lc1/Lfp1) may be at least about 0.05, such as at least about 0.1, at least about 0.15, or even at least about 0.2. It will be appreciated that the length factor (Lc1/Lfp1) can be within a range between any of the minimum and maximum values noted above.

Further to the body 1201, the first linear section 1241 can have a particular length (Ll1) relative to the total length (Lfp1) of the first portion 1206 that may facilitate improved performance of the body 1201. In certain instances, the first linear section length (Ll1) can be a fraction of a total length (Lfp1) of the first portion 1206 of the side surface 1205. For example, the relationship between the first linear section length (Ll1) and the total length (Lfp1) of the first portion 1206 can define a length factor (Ll1/Lfp1), which maybe not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Ll1/Lfp1) may be at least about 0.05, such as at least about 0.1, at least about 0.15, or even at least about 0.2. It will be appreciated that the length factor (Ll1/Lfp1) can be within a range between any of the minimum and maximum values noted above.

Moreover, the second linear section 1243 can have a particular length (Ll2) relative to the total length (Lfp1) of the first portion 1206 that may facilitate improved performance of the body 1201. In certain instances, the second linear section length (Ll2) can be a fraction of a total length (Lfp1) of the first portion 1206 of the side surface 1205. For example, the relationship between the second linear section length (Ll2) and the total length (Lfp1) of the first portion 1206 can define a length factor (Ll2/Lfp1), which maybe not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Ll2/Lfp1) may be at least about 0.05, such as at least about 0.1, at least about 0.15, or even at least about 0.2. It will be appreciated that the length factor (Ll2/Lfp1) can be within a range between any of the minimum and maximum values noted above.

As noted herein, and as illustrated in the embodiments of FIGS. 12A and 12B, the first curved section 1242 can be joined to the first linear section 1241 and define an interior corner 1245. Moreover, the first curved section 1242 can be joined to the second linear section 1243 and define an interior corner 1246. In particular instances, the first curved section 1242 can have a first end defined at the joint of the interior corner 1245 that is spaced apart from the first external corner 1209 of the body 1201. Moreover, the first curved section 1242 can have a second end defined at the joint of the interior corner 1246, which can be spaced apart from the second external corner 1210 of the body 1201. Notably, in certain embodiments, the first portion 1206 of the side surface 1205 can include the first interior corner 1245 and the second interior corner 1246, which can be spaced apart from each other. In particular, the first interior corner 1245 and the second interior corner 1246 can be separated by the first curved section 1242, and more particularly, disposed at opposite ends of the first curved section 1242. The first interior corner 1245 can be disposed at an edge between the first linear section 1241 and the first curved section 1242 and the second interior corner 1246 can be disposed at an edge between the first curved section 1242 and the second linear section 1243.

The first interior corner 1245, along with the first curved section 1242 and the first linear section 1241, can define the first interior angle 1247, which can have an obtuse value. The first interior angle 1247 can be measured as the angle formed between the first linear section 1241 and a tangent 1283 of the first curved section 1242 that extends from the first interior corner 1245. According to one embodiment, the first interior angle 1247 can have a value between at least about 92 degrees and not greater than about 178 degrees. More particularly, in at least one embodiment, the first interior angle 1247 can have a value of at least about 94 degrees, such as at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. In yet another embodiment, the first interior angle 1247 can have a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the first interior angle 1247 can have a value within a range between any of the minimum and maximum values noted above.

The second interior corner 1246, along with the first curved section 1242 and the second linear section 1243, can define the second interior angle 1248, which can have an obtuse value. The second interior angle 1248 can be measured as the angle formed between the second linear section 1243 and a tangent 1284 of the first curved section 1242 extending from the second interior corner 1246. According to one embodiment, the second interior angle 1248 can have a value between at least about 92 degrees and not greater than about 178 degrees. More particularly, in at least one embodiment, the second interior angle 1248 can have a value of at least about 94 degrees, such as at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. In yet another embodiment, the second interior angle 1248 can have a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the second interior angle 1248 can have a value within a range between any of the minimum and maximum values noted above.

As further illustrated, the first curved section 1242 of the first portion 1206 of the side surface 1205 can have a substantially concave shape and may curve inwards into the body 1201 toward the midpoint 1281. The first curved section 1242 may define an arc having a single distinct curvature as illustrated in FIGS. 12A and 12B.

Moreover, the first curved section 1242 can have a particular radius of curvature (Rc1) relative to the width (W) (e.g., the total length (Lfp1) in an embodiment) of the body 1201 that may facilitate improved performance of the body. The radius of curvature may be determined by superimposing a best fit circle to the curvature of the first curved section 1242 and determining the radius of the best fit circle. Any suitable computer program, such as ImageJ may be used in conjunction with an image (e.g., SEM image or light microscope image) of suitable magnification of the body 1201 to accurately measure the best fit circle. According to one embodiment, the first curved section 1242 can have a radius of curvature (Rc1) that is at least half of the width (W) of the body 1201, such as at least about 0.8 times the width (W) of the body 1201, at least 1.5 times the width (W) of the body 1201, or even at least 2 times the width (W) of the body 1201. In another embodiment, the radius of curvature (Rc1) can be not greater than about 50 times the width (W) of the body 1201, such as not greater than about 20 times the width (W) of the body 1201, not greater than about 15 times the width (W) of the body 1201, not greater than about 10 times the width (W) of the body 1201, or even not greater than about 5 times the width (W) of the body 1201. The first curved section 1242 can have a radius of curvature (Rc1) within a range between any of the minimum and maximum values noted above.

In at least one embodiment, the first curved section 1242 can have a radius of curvature (Rc1) that is not greater than 4 mm or not greater than 3 mm or not greater than 2.5 mm or not greater than 2 mm or even not greater than 1.5 mm. Still, in another embodiment, the first curved section 1242 can have a radius of curvature of at least 0.01 mm, such as at least 0.1 mm or at least 0.5 mm or at least 0.8 mm or even at least 1 mm. It will be appreciated that the radius of curvature of any one of the curved sections described in the embodiments herein can be within a range including any of the minimum and maximum values noted above.

Figure 13:
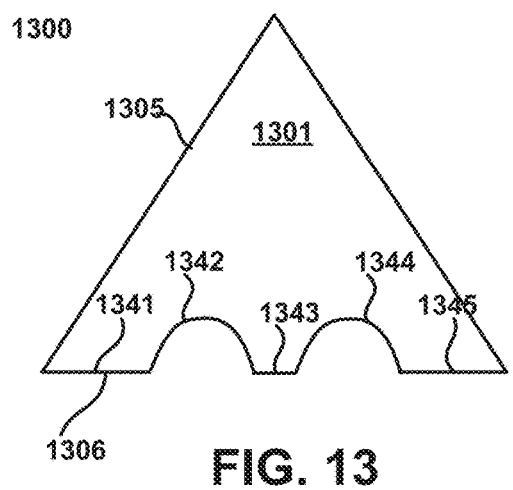
FIG. 13 includes a top view illustration of a shaped abrasive particle according to an embodiment.

However, it will be appreciated that a particular side portion of a side surface can include multiple curved sections. For example, FIG. 13 includes an illustration of one embodiment of a shaped abrasive particle 1300 including a body 1301 with a first portion 1306 of a side surface 1305. The first portion 1306 can include a first curved section 1342 disposed between a first linear section 1341 and a second linear section 1343. Moreover, the first portion 1306 can include a second curved section 1344 disposed between the second linear section 1343 and a third linear section 1345, which second curved section 1344 may be spaced apart from the first curved section 1342. The linear sections 1341, 1343, and 1345 can have any of the features of any linear sections described in the embodiments herein. Similarly, the curved sections 1342 and 1344 can have any of the features of the embodiments of the curved sections described herein.

Figure 14:
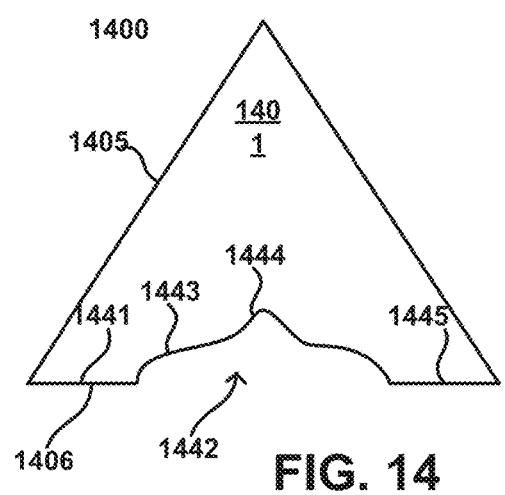
FIG. 14 includes a top view illustration of a shaped abrasive particle according to an embodiment.

It will be further appreciated that it is within the scope of embodiments herein to form a body of a shaped abrasive particle having a curved section with multiple curvatures, such that it has at least two distinct curvatures. For example, FIG. 14 includes an illustration of a first curved section 1442 having a first section 1443 defining a first curvature and a second section 1444 defining a second curvature. Notably, the curvature of the first section 1443 can be distinct from the curvature of the second section 1444. Moreover, the first section 1443 can be integrally joined to the second section 1444.

Figure 15:
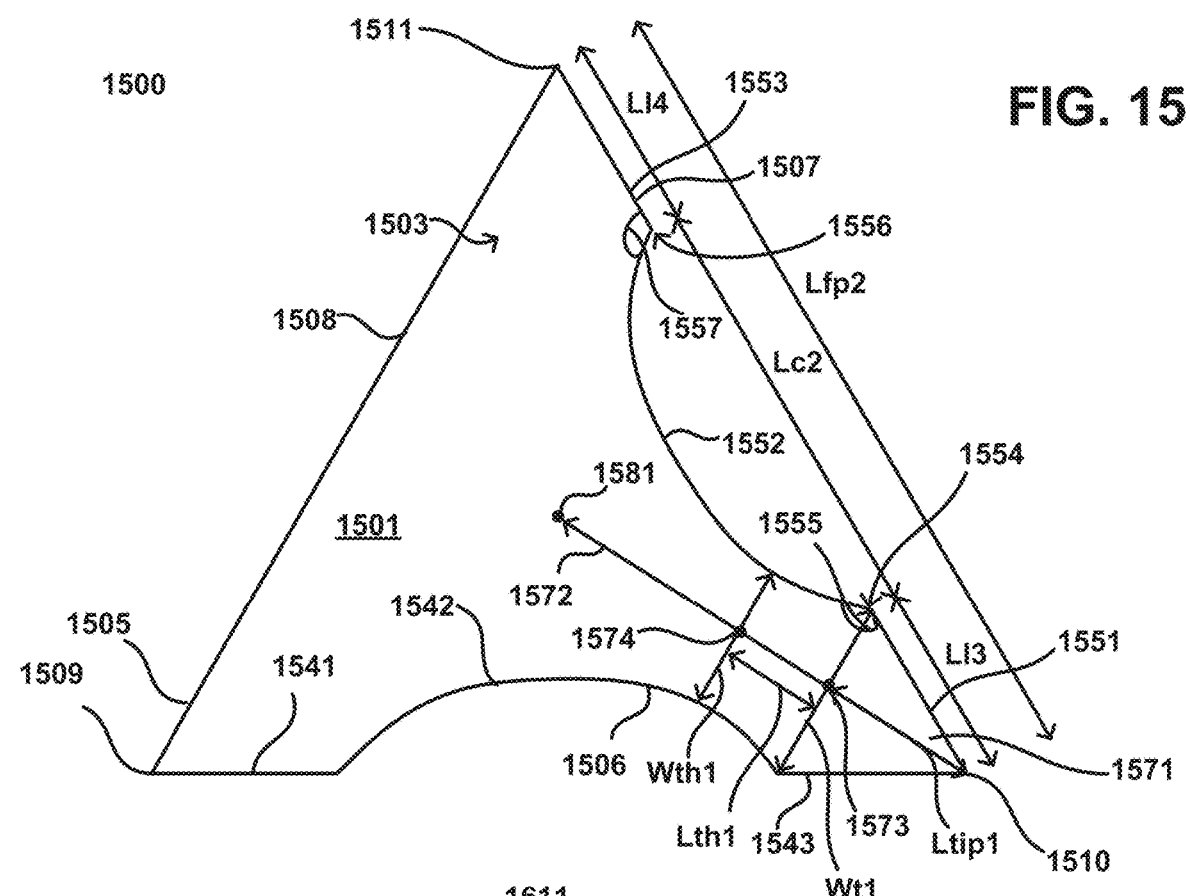
FIG. 15 includes a top view illustration of a shaped abrasive particle according to an embodiment.

FIG. 15 includes a top view of a shaped abrasive particle 1500 according to an embodiment. In particular, the shaped abrasive 1500 can include a body 1501 having the features of other shaped abrasive particles of embodiments herein, including an upper major surface 1503 and a bottom major surface (not shown) opposite the upper major surface 1503. The upper major surface 1503 and the bottom major surface can be separated from each other by at least one side surface 1505, which may include one or more discrete side surface portions, including for example, a first portion 1506 of the side surface 1505, a second portion 1507 of the side surface 1505, and a third portion 1508 of the side surface 1505. In particular, the first portion 1506 of the side surface 1505 can extend between a first corner 1509 and a second corner 1510. The second portion 1507 of the side surface 1505 can extend between the second corner 1510 and a third corner 1511. Notably, the second corner 1510 can be an external corner joining two portions of the side surface 1505. The second corner 1510 and third corner 1511, which is also an external corner, are adjacent to each other and have no other external corners disposed between them. Also, the third portion 1508 of the side surface 1505 can extend between the third corner 1511 and the first corner 1509, which are both external corners that are adjacent to each other having no other external corners disposed between them.

As illustrated, the body 1501 can include a first portion 1506 including a first curved section 1542 disposed between a first linear section 1541 and a second linear section 1543 and between the external corners 1509 and 1510. The body 1501 can further include a second portion 1507 separated from the first portion 1506 of the side surface 1505 by the external corner 1510. The second portion 1507 of the side surface 1505 can include a second curved section 1552 joining a third linear section 1551 and a fourth linear section 1553.

The body 1501 can have any of the features of other embodiments herein, including but not limited to, a primary aspect ratio, a secondary aspect ratio, a tertiary aspect ratio, and the like. In one aspect, the body 1501 of the shaped abrasive particle 1500 can have a second portion 1507 of the side surface 1505 with a partially-concave shape. A partially concave shape can include the curved section 1552 that extends for a fraction of the total length (Lfp2) of the second portion 1507 of the side surface 1505 between the adjacent corners 1510 and 1511. In an embodiment, the total length (Lfp2) can be equivalent to a width (W) of the body 1501. Moreover, as further illustrated in the embodiment of FIG. 15, the second curved section 1552 can be disposed between the third linear section 1551 and the fourth linear section 1553. The third linear section 1551 can terminate at a first end at the first external corner 1510 of the body 1501, extend along the second portion 1507 of the side surface 1505 for a length (Ll3), and terminate at the joining of the second portion 1507 with the second curved section 1552. The second curved section 1552 and the third linear section 1551 can define a third interior corner 1554, which along with the second curved section 1552 and the third linear section 1551 can define a first interior angle 1555 having any of the features of the interior angles of embodiments herein (e.g., defining an obtuse angle). The fourth linear section 1553 can terminate at first end at the third external corner 1511 of the body 1501, extend along the second portion 1507 of the side surface 1505 for a length (Ll4), and terminate at the joining of the second portion 1507 with the second curved section 1552. The fourth linear section 1553 and the second curved section 1552 can define a fourth interior corner 1556. The fourth interior corner 1556, along with the second curved section 1552 and the fourth linear section 1553 can define a fourth interior angle 1557 having any of the features of the interior angles of embodiments herein (e.g., defining an obtuse angle).

As will be appreciated, the third linear section 1551 and the fourth linear section 1553 can be substantially linear when viewed from the top down as illustrated in FIG. 15. The second curved section 1552 can have a significant arcuate contour when viewed from the topdown, also as shown in FIG. 15. The third linear section 1551 can have a third linear section length (Ll3) and can have any of the features of any of the linear sections of shaped abrasive particles of the embodiments herein. The second curved section 1552 can have a length (Lc2) and can have any of the features of the curved sections of shaped abrasive particles of the embodiments herein. The fourth linear section 1553 can have a length (Ll4) and can have any of the features of any of the linear sections of shaped abrasive particles of the embodiments herein.

The body 1501 can include a first arm 1571 extending between the midpoint 1581 of the body 1501 and the terminal end of the first arm 1571, defined by the external corner 1510. The first arm 1571 can have a first arm axis 1572 extending between the terminal end of the first arm 1571 and the midpoint 1581 and defining a total length (Larm1) of the first arm 1571.

According to one particular embodiment, the body 1501 can have a first maximum tip width (Wt1) that defines a maximum width of a first arm 1571 of the body 1501 at a location between the terminal end (i.e., external corner 1510) of the first arm 1571 and the midpoint 1581. Notably, the first maximum tip width (Wt1) can be spaced a distance from the midpoint 1581 along the first arm axis 1572 and spaced a distance from the terminal end of the first arm 1571 along the first arm axis 1572. Moreover, the first maximum tip width (Wt1) can define a first maximum tip width location 1573 along the first arm axis 1572.

The distance between the terminal end of the first arm 1571 and the first maximum tip width location 1573 can define a first tip length (Ltip1). The first tip length (Ltip1) can have a particular relationship relative to the length of the first arm 1571 (Larm1) that may facilitate improved performance of the shaped abrasive particle 1500. In one embodiment, the first tip length (Ltip1) can be a fraction of the total length of the first arm (Larm1). For example, in one embodiment, the first tip length (Ltip1) can be at least about 0.01(Larm1), such as at least about 0.02(Larm1), at least about 0.03(Larm1), at least about 0.04(Larm1), at least about 0.05(Larm1), at least about 0.06(Larm1), at least about 0.07(Larm1), at least about 0.08(Larm1), at least about 0.09(Larm1), at least about 0.1(Larm1), at least about 0.12(Larm1), at least about 0.15(Larm1), at least about 0.18(Larm1), at least about 0.2(Larm1), at least about 0.22 (Larm1), at least about 0.25(Larm1), at least about 0.28 (Larm1), at least about 0.3(Larm1), at least about 0.32 (Larm1), at least about 0.35(Larm1), at least about 0.38 (Larm1), or even at least about 0.4(Larm1). In another non-limiting embodiment, the first tip length (Ltip1) can be not greater than about 0.95(Larm1), such as not greater than about 0.9(Larm1), not greater than about 0.85(Larm1), not greater than about 0.8(Larm1), not greater than about 0.75 (Larm1), not greater than about 0.7(Larm1), not greater than about 0.65(Larm1), not greater than about 0.6(Larm1), not greater than about 0.55(Larm1), not greater than about 0.5(Larm1), not greater than about 0.45(Larm1). It will be appreciated that the first tip length (Ltip1) can be within a range between any of the minimum and maximum values above.

The body 1501 can further include a first throat width (Wth1), which can define a narrowest portion of the first arm between a first maximum tip width location 1573 of the first arm 1571 and the midpoint 1581. Moreover, the first throat width (Wth1) can define a first throat width location 1574 along the axis 1572 of the first arm 1571. As illustrated, in certain embodiments, the first throat location 1574 can be closer to the midpoint 1581 than the first maximum tip width location 1573.

In at least one embodiment, the distance between the first throat width location 1574 and the first maximum tip width location 1573 can define a first throat length (Lth1). In certain embodiments, the first throat length (Lth1) can have a particular length relative to the length of the first arm (Larm1) that may improve the performance of the shaped abrasive particle 1500. For example, the first throat length (Lth1) can be a fraction of a total length of the first arm (Larm1). In one instance, the first throat length (Lth1) can be at least about 0.01(Larm1), such as at least about 0.02 (Larm1), at least about 0.03(Larm1), at least about 0.04 (Larm1), at least about 0.05(Larm1), at least about 0.06 (Larm1), at least about 0.07(Larm1), at least about 0.08 (Larm1), at least about 0.09(Larm1), at least about 0.1 (Larm1), at least about 0.12(Larm1), at least about 0.15 (Larm1), at least about 0.18(Larm1), at least about 0.2 (Larm1), at least about 0.22(Larm1), at least about 0.25 (Larm1), at least about 0.28(Larm1), at least about 0.3 (Larm1), at least about 0.32(Larm1), at least about 0.35 (Larm1), at least about 0.38(Larm1), at least about 0.4 (Larm1). In another non-limiting embodiment, the first throat length (Lth1) can be not greater than about 0.95 (Larm1), such as not greater than about 0.9(Larm1), not greater than about 0.85(Larm1), not greater than about 0.8(Larm1), not greater than about 0.75(Larm1), not greater than about 0.7(Larm1), not greater than about 0.65(Larm1), not greater than about 0.6(Larm1), not greater than about 0.55(Larm1), not greater than about 0.5(Larm1), not greater than about 0.45(Larm1). It will be appreciated that the first throat length (Lth1) can be within a range between any of the minimum and maximum values above.

The body 1501 can be formed such that the first throat width (Wth1) and the maximum tip width (Wt1) have a particular relationship relative to each other, which may improve the performance of the shaped abrasive particle 1500. For example, the first throat width (Wth1) can be less than the first maximum tip width (Wt1). In more particular instances, the first throat width (Wth1) can be not greater than about 0.95(Wt1), such as not greater than about 0.9 (Wt1), not greater than about 0.85(Wt1), not greater than about 0.8(Wt1), not greater than about 0.75(Wt1), not greater than about 0.7(Wt1), not greater than about 0.65 (Wt1), not greater than about 0.6(Wt1), not greater than about 0.55(Wt1), not greater than about 0.5(Wt1), or even not greater than about 0.45(Wt1). In yet another embodiment, the first throat width (Wth1) can be at least about 0.01(Wt1), such as at least about 0.05(Wt1), at least about 0.08(Wt1), at least about 0.1(Wt1), at least about 0.12(Wt1), at least about 0.15(Wt1), at least about 0.18(Wt1), at least about 0.2(Wt1), at least about 0.22(Wt1), at least about 0.25(Wt1), at least about 0.28(Wt1), at least about 0.3(Wt1), at least about 0.32(Wt1), at least about 0.35(Wt1), at least about 0.38(Wt1), at least about 0.4(Wt1), at least about 0.42(Wt1), at least about 0.45(Wt1), at least about 0.48 (Wt1), or even at least about 0.5(Wt1). The first throat width (Wth1) can have a width relative to the first maximum tip width (Wt1) within a range between any of the minimum and maximum values noted above.

Figure 16:
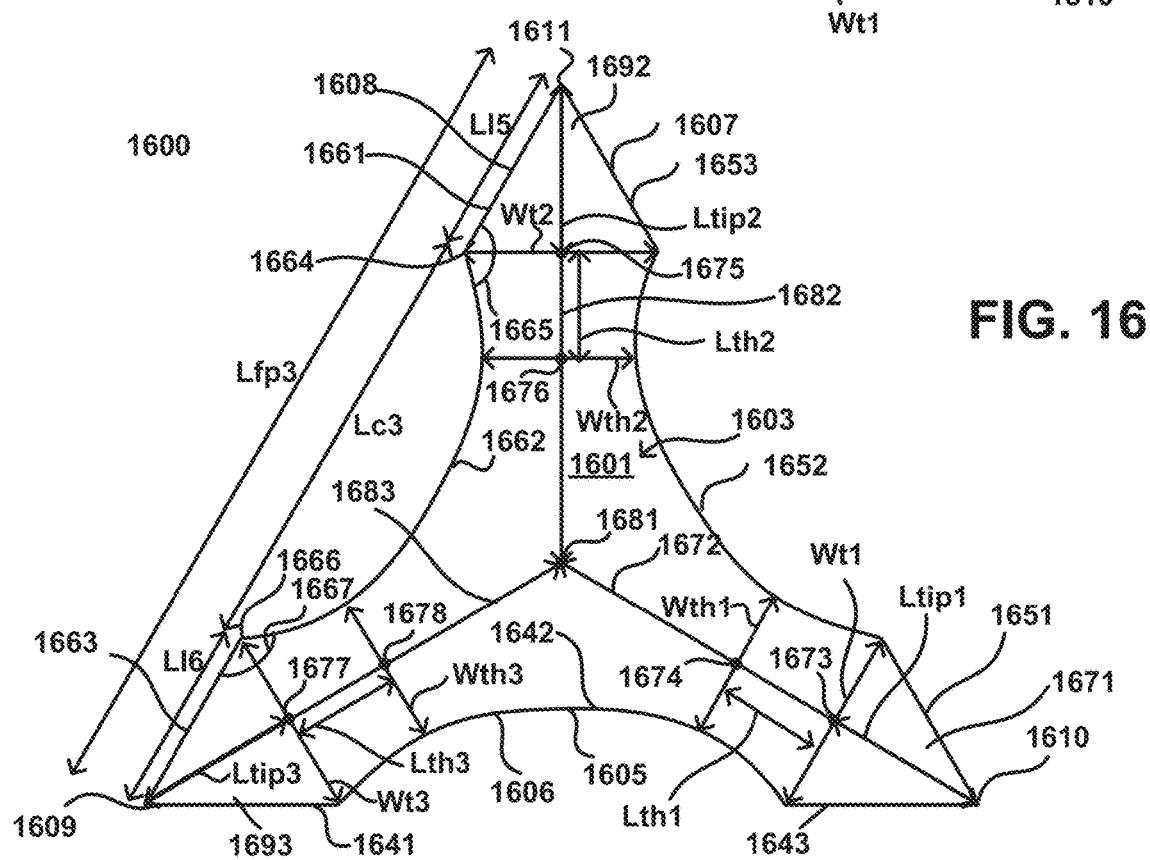
FIG. 16 includes a top view illustration of a shaped abrasive particle according to an embodiment.

FIG. 16 includes a top view illustration of a shaped abrasive particle according to an embodiment. In particular, the shaped abrasive particle 1600 can include a body 1601 having the features of other shaped abrasive particles of embodiments herein, including an upper major surface 1603 and a bottom major surface (not shown) opposite the upper major surface 1603. The upper major surface 1603 and the bottom major surface can be separated from each other by at least one side surface 1605, which may include one or more discrete side surface portions, including for example, a first portion 1606 of the side surface 1605, a second portion 1607 of the side surface 1605, and a third portion 1608 of the side surface 1605. In particular, the first portion 1606 of the side surface 1605 can extend between a first corner 1609 and a second corner 1610. The second portion 1607 of the side surface 1605 can extend between the second corner 1610 and a third corner 1611. Notably, the second corner 1610 can be an external corner joining two portions of the side surface 1605. The second corner 1610 and a third corner 1611, which is also an external corner, are adjacent to each other and have no other external corners disposed between them. Also, the third portion 1608 of the side surface 1605 can extend between the third corner 1611 and the first corner 1609, which are both external corners that are adjacent to each other and have no other external corners disposed between them.

As illustrated, the body 1601 can include a first portion 1606 including a first curved section 1642 disposed between a first linear section 1641 and a second linear section 1643 and between the external corners 1609 and 1610. The second portion 1607 is separated from the first portion 1606 of the side surface 1605 by the external corner 1610. The second portion 1607 of the side surface 1605 can include a second curved section 1652 joining a third linear section 1651 and a fourth linear section 1653. Furthermore, the body 1601 can include a third portion 1608 separated from the first portion 1606 of the side surface 1605 by the external corner 1609 and separated from the second portion 1607 by the external corner 1611. The third portion 1608 of the side surface 1605 can include a third curved section 1662 joining a fifth linear section 1661 and a sixth linear section 1663.

The body 1601 can have any of the features of other embodiments herein, including but not limited to, a primary aspect ratio, a secondary aspect ratio, a tertiary aspect ratio, and the like. In one aspect, the body 1601 of the shaped abrasive particle 1600 can have a third portion 1608 of the side surface 1605 with a partially-concave shape. A partially concave shape can include the third curved section 1662 that extends for a fraction of the total length (Lfp3) of the third portion 1608 of the side surface 1605 between the adjacent, external corners 1609 and 1611. In an embodiment, the total length (Lfp3) can be equivalent to a width (W) of the body 1601. Moreover, as further illustrated in the embodiment of FIG. 16, the third curved section 1662 can be disposed between the fifth linear section 1661 and the sixth linear section 1663. The fifth linear section 1661 can terminate at a first end at the first external corner 1611 of the body 1601, extend along the third portion 1608 of the side surface 1605 for a length (Ll5), and terminate at a second end at the joining of the third portion 1608 with the second curved section 1662. The third curved section 1662 and the fifth linear section 1661 can define a sixth interior corner 1664, which along with the third curved section 1662 and the fifth linear section 1661 can define a fifth interior angle 1665 having any of the features of the interior angles of embodiments herein (e.g., defining an obtuse angle). The sixth linear section 1663 can terminate at a first end at the external corner 1609 of the body 1601, extend along the third portion 1608 of the side surface 1605 for a length (L16), and terminate at a second end at the joining of the third portion 1608 with the third curved section 1662. The sixth linear section 1663 and the third curved section 1662 can define a sixth interior corner 1666. The sixth interior corner 1666, along with the third curved section 1662 and the sixth linear section 1663, can define a sixth interior angle 1667 having any of the features of the interior angles of embodiments herein (e.g., defining an obtuse angle).

As will be appreciated, the fifth linear section 1661 and the sixth linear section 1663 can be substantially linear when viewed from the top down as illustrated in FIG. 16. The third curved section 1662 can have a significant arcuate contour, also when viewed from the top down as shown in FIG. 16. The fifth linear section 1661 can have a fifth linear section length (Ll5) and can have any of the features of any of the linear sections of shaped abrasive particles of the embodiments herein. The third curved section 1662 can have a length (Lc3) and can have any of the features of the curved sections of shaped abrasive particles of the embodiments herein. The sixth linear section 1663 can have a length (L16) and can have any of the features of any of the linear sections of shaped abrasive particles of the embodiments herein.

The body 1605 can include a first arm 1671 extending between the midpoint 1681 of the body 1601 and the terminal end (e.g., the external corner 1610) of the first arm 1671. The first arm 1671 can have any of the features of the arms of the embodiments herein, including for example, but not limited to, a maximum tip width, a throat width, a first tip length, a first throat length, and the like. The body 1605 can include a second arm 1692, extending between the midpoint 1681 of the body 1601 and the terminal end (e.g., the external corner 1611) of the second arm 1692. The second arm 1692 can have any of the features of the arms of the embodiments herein, including for example, but not limited to, a maximum tip width, a throat width, a first tip length, a first throat length, and the like. As also illustrated in FIG. 16, the body 1601 can include a third arm 1693, extending between the midpoint 1681 of the body 1601 and the terminal end (e.g., the external corner 1609) of the third arm 1693. The third arm 1693 can have any of the features of the arms of the embodiments herein, including for example, but not limited to, a maximum tip width, a throat width, a first tip length, a first throat length, and the like.

In one aspect, the body 1601 can have a first maximum tip width (Wt1) that defines a maximum width of the first arm 1671 of the body 1601 at a location between the terminal end (e.g., external corner 1610) of the first arm 1671 and the midpoint 1681. Notably, the first maximum tip width (Wt1) can be spaced a distance from the midpoint 1681 along a first arm axis 1672 and spaced a distance from the terminal end of the first arm 1671 along the first arm axis 1672. Moreover, the first maximum tip width (Wt1) can define a first maximum tip width location 1673 along the first arm axis 1672. The distance between the terminal end of the first arm 1671 and the first maximum tip width location 1673 can define a first tip length (Ltip1). The first tip length (Ltip1) can have a particular relationship relative to a length of the first arm 1671 (referred to as Larm1 defined as a total length between the terminal end of the first arm and the midpoint 1681, which may facilitate improved performance of the shaped abrasive particle. The first arm 1671 can have a first arm axis 1672 extending between the terminal end of the first arm and the midpoint 1681 and defining a total length (Larm1) of the first arm 1671. In one embodiment, the first tip length (Ltip1) can be a fraction of a total length of the first arm (Larm1). For example, in one embodiment, the first tip length (Ltip1) can be at least about 0.01(Larm1), such as at least about 0.02(Larm1), at least about 0.03(Larm1), at least about 0.04(Larm1), at least about 0.05(Larm1), at least about 0.06(Larm1), at least about 0.07(Larm1), at least about 0.08(Larm1), at least about 0.09(Larm1), at least about 0.1(Larm1), at least about 0.12(Larm1), at least about 0.15(Larm1), at least about 0.18(Larm1), at least about 0.2(Larm1), at least about 0.22(Larm1), at least about 0.25(Larm1), at least about 0.28(Larm1), at least about 0.3(Larm1), at least about 0.32(Larm1), at least about 0.35(Larm1), at least about 0.38(Larm1), or even at least about 0.4(Larm1). In another non-limiting embodiment, the first tip length (Ltip1) can be not greater than about 0.95(Larm1), such as not greater than about 0.9(Larm1), not greater than about 0.85(Larm1), not greater than about 0.8(Larm1), not greater than about 0.75(Larm1), not greater than about 0.7(Larm1), not greater than about 0.65(Larm1), not greater than about 0.6(Larm1), not greater than about 0.55(Larm1), not greater than about 0.5(Larm1), not greater than about 0.45(Larm1). It will be appreciated that the first tip length (Ltip1) can be within a range between any of the minimum and maximum values above.

The body 1601 can further include a first throat width (Wth1), which can define a narrowest portion of the first arm 1671 between a first maximum tip width location 1673 of the first arm 1671 and the midpoint 1681. Moreover, the first throat width (Wth1) can define a first throat width location 1674 along the axis 1672 of the first arm 1671. As illustrated, in certain embodiments, the first throat location 1674 can be closer to the midpoint 1681 than the first maximum tip width location 1673.

In at least one embodiment, the distance between the first throat location 1674 and the first maximum tip width location 1673 can define a first throat length (Lth1). In certain embodiments, the first throat length (Lth1) can have a particular length relative to the length of the first arm (Larm1) that may improve the performance of the shaped abrasive particle 1600. For example, the first throat length (Lth1) can be a fraction of a total length of the first arm (Larm1). In one instance, the first throat length (Lth1) can be at least about 0.01(Larm1), such as at least about 0.02(Larm1), at least about 0.03(Larm1), at least about 0.04(Larm1), at least about 0.05(Larm1), at least about 0.06(Larm1), at least about 0.07(Larm1), at least about 0.08(Larm1), at least about 0.09(Larm1), at least about 0.1(Larm1), at least about 0.12(Larm1), at least about 0.15(Larm1), at least about 0.18(Larm1), at least about 0.2(Larm1), at least about 0.22(Larm1), at least about 0.25(Larm1), at least about 0.28(Larm1), at least about 0.3(Larm1), at least about 0.32(Larm1), at least about 0.35(Larm1), at least about 0.38(Larm1), at least about 0.4(Larm1). In another non-limiting embodiment, the first throat length (Lth1) can be not greater than about 0.95(Larm1), such as not greater than about 0.9(Larm1), not greater than about 0.85(Larm1), not greater than about 0.8(Larm1), not greater than about 0.75(Larm1), not greater than about 0.7(Larm1), not greater than about 0.65(Larm1), not greater than about 0.6(Larm1), not greater than about 0.55(Larm1), not greater than about 0.5(Larm1), not greater than about 0.45(Larm1). It will be appreciated that the first throat length (Lth1) can be within a range between any of the minimum and maximum values above.

The body 1601 can be formed such that the first throat width (Wth1) and the first maximum tip width (Wt1) have a particular relationship relative to each other, which may improve the performance of the shaped abrasive particle 1600. For example, the first throat width (Wth1) can be less than the first maximum tip width (Wt1). In more particular instances, the first throat width (Wth1) can be not greater than about 0.95(Wt1), such as not greater than about 0.9 (Wt1), not greater than about 0.85(Wt1), not greater than about 0.8(Wt1), not greater than about 0.75(Wt1), not greater than about 0.7(Wt1), not greater than about 0.65 (Wt1), not greater than about 0.6(Wt1), not greater than about 0.55(Wt1), not greater than about 0.5(Wt1), or even not greater than about 0.45(Wt1). In yet another embodiment, the first throat width (Wth1) can be at least about 0.01(Wt1), such as at least about 0.05(Wt1), at least about 0.08(Wt1), at least about 0.1(Wt1), at least about 0.12(Wt1), at least about 0.15(Wt1), at least about 0.18(Wt1), at least about 0.2(Wt1), at least about 0.22(Wt1), at least about 0.25(Wt1), at least about 0.28(Wt1), at least about 0.3(Wt1), at least about 0.32(Wt1), at least about 0.35(Wt1), at least about 0.38(Wt1), at least about 0.4(Wt1), at least about 0.42(Wt1), at least about 0.45(Wt1), at least about 0.48 (Wt1), or even at least about 0.5(Wt1). The first throat width (Wth1) can have a width relative to the first maximum tip width (Wt1) within a range between any of the minimum and maximum values noted above.

In one aspect, the body 1601 can have a second maximum tip width (Wt2) that defines a maximum width of the second arm 1692 of the body 1601 at a location between the terminal end (e.g., external corner 1611) of the second arm 1692 and the midpoint 1681. Notably, the second maximum tip width (Wt2) can be spaced a distance from the midpoint 1681 along the second arm axis 1682 and spaced a distance from the terminal end of the second arm 1692 along the second arm axis 1682. Moreover, the second maximum tip width (Wt2) can define a second maximum tip width location 1675 along the second arm axis 1682. The distance between the terminal end of the second arm 1692 and the second maximum tip width location 1675 can define a second tip length (Ltip2). The second tip length (Ltip2) can have a particular relationship relative to a length of the second arm 1692 (referred to generally as Larm2),defined as a total length between the terminal end of the second arm 1692 and the midpoint 1681, which may facilitate improved performance of the shaped abrasive particle 1600. In one embodiment, the second tip length (Ltip2) can be a fraction of a total length of the second arm (Larm2). For example, in one embodiment, the second tip length (Ltip2) can be at least about 0.01(Larm2), such as at least about 0.02(Larm2), at least about 0.03(Larm2), at least about 0.04(Larm2), at least about 0.05(Larm2), at least about 0.06(Larm2), at least about 0.07(Larm2), at least about 0.08(Larm2), at least about 0.09(Larm2), at least about 0.1(Larm2), at least about 0.12(Larm2), at least about 0.15(Larm2), at least about 0.18(Larm2), at least about 0.2(Larm2), at least about 0.22(Larm2), at least about 0.25(Larm2), at least about 0.28(Larm2), at least about 0.3(Larm2), at least about 0.32(Larm2), at least about 0.35(Larm2), at least about 0.38(Larm2), or even at least about 0.4(Larm2). In another non-limiting embodiment, the second tip length (Ltip2) can be not greater than about 0.95(Larm2), such as not greater than about 0.9(Larm2), not greater than about 0.85(Larm2), not greater than about 0.8(Larm2), not greater than about 0.75(Larm2), not greater than about 0.7(Larm2), not greater than about 0.65(Larm2), not greater than about 0.6(Larm2), not greater than about 0.55(Larm2), not greater than about 0.5(Larm2), not greater than about 0.45(Larm2). It will be appreciated that the second tip length (Ltip2) can be within a range between any of the minimum and maximum values above.

The body 1601 can further include a second throat width (Wth2), which can define a narrowest portion of the second arm 1692 between a second maximum tip width location 1675 of the second arm 1692 and the midpoint 1681. Moreover, the second throat width (Wth2) can define a second throat width location 1676 along the axis 1682 of the second arm 1692. As illustrated, in certain embodiments, the second throat width location 1676 can be closer to the midpoint 1681 than the second maximum tip width location 1675.

In at least one embodiment, the distance between the second throat location 1676 and the second maximum tip width location 1675 can define a second throat length (Lth2). In certain embodiments, the second throat length (Lth2) can have a particular length relative to the length of the second arm (Larm2) that may improve the performance of the shaped abrasive particle 1600. For example, the second throat length (Lth2) can be a fraction of a total length of the second arm (Larm2). In one instance, the second throat length (Lth2) can be at least about 0.01(Larm2), such as at least about 0.02(Larm2), at least about 0.03(Larm2), at least about 0.04(Larm2), at least about 0.05(Larm2), at least about 0.06(Larm2), at least about 0.07(Larm2), at least about 0.08(Larm2), at least about 0.09(Larm2), at least about 0.1(Larm2), at least about 0.12(Larm2), at least about 0.15(Larm2), at least about 0.18(Larm2), at least about 0.2(Larm2), at least about 0.22(Larm2), at least about 0.25(Larm2), at least about 0.28(Larm2), at least about 0.3(Larm2), at least about 0.32(Larm2), at least about 0.35(Larm2), at least about 0.38(Larm2), at least about 0.4(Larm2). In another non-limiting embodiment, the second throat length (Lth2) can be not greater than about 0.95(Larm2), such as not greater than about 0.9(Larm2), not greater than about 0.85(Larm2), not greater than about 0.8(Larm2), not greater than about 0.75(Larm2), not greater than about 0.7(Larm2), not greater than about 0.65(Larm2), not greater than about 0.6(Larm2), not greater than about 0.55(Larm2), not greater than about 0.5(Larm2), not greater than about 0.45(Larm2). It will be appreciated that the second throat length (Lth2) can be within a range between any of the minimum and maximum values above.

The body 1601 can be formed such that the second throat width (Wth2) and the second maximum tip width (Wt2) have a particular relationship relative to each other, which may improve the performance of the shaped abrasive particle 1600. For example, the second throat width (Wth2) can be less than the second maximum tip width (Wt2). In more particular instances, the second throat width (Wth2) can be not greater than about 0.95(Wt2), such as not greater than about 0.9(Wt2), not greater than about 0.85(Wt2), not greater than about 0.8(Wt2), not greater than about 0.75 (Wt2), not greater than about 0.7(Wt2), not greater than about 0.65(Wt2), not greater than about 0.6(Wt2), not greater than about 0.55(Wt2), not greater than about 0.5 (Wt2), or even not greater than about 0.45(Wt2). In yet another embodiment, the second throat width (Wth2) can be at least about 0.01(Wt2), such as at least about 0.05(Wt2), at least about 0.08(Wt2), at least about 0.1(Wt2), at least about 0.12(Wt2), at least about 0.15(Wt2), at least about 0.18 (Wt2), at least about 0.2(Wt2), at least about 0.22(Wt2), at least about 0.25(Wt2), at least about 0.28(Wt2), at least about 0.3(Wt2), at least about 0.32(Wt2), at least about 0.35(Wt2), at least about 0.38(Wt2), at least about 0.4(Wt2), at least about 0.42(Wt2), at least about 0.45(Wt2), at least about 0.48(Wt2), or even at least about 0.5(Wt2). The second throat width (Wth2) can have a width relative to the second maximum tip width (Wt2) within a range between any of the minimum and maximum values noted above.

In yet another aspect, the body 1601 can have a third maximum tip width (Wt3) that defines a maximum width of the third arm 1693 of the body 1601 at a location between the terminal end (e.g., external corner 1609) of the third arm 1693 and the midpoint 1681. Notably, the third maximum tip width (Wt3) can be spaced a distance from the midpoint

1681 along the third arm axis 1683 and spaced a distance from the terminal end of the third arm 1693 along the third arm axis 1683. Moreover, the third maximum tip width (Wt3) can define a third maximum tip width location 1677 along the third arm axis 1683. The distance between the terminal end of the third arm 1693 and the third maximum tip width location 1677 can define a third tip length (Ltip3). The third tip length (Ltip3) can have a particular relationship relative to the length of the third arm 1693 (referred to generally as Larm3), defined as a total length between the terminal end of the third arm 1693 and the midpoint 1681, which may facilitate improved performance of the shaped abrasive particle 1600. In one embodiment, the third tip length (Ltip3) can be a fraction of a total length of the third arm (Larm3). For example, in one embodiment, the third tip length (Ltip3) can be at least about 0.01(Larm3), such as at least about 0.02(Larm3), at least about 0.03(Larm3), at least about 0.04(Larm3), at least about 0.05(Larm3), at least about 0.06(Larm3), at least about 0.07(Larm3), at least about 0.08(Larm3), at least about 0.09(Larm3), at least about 0.1(Larm3), at least about 0.12(Larm3), at least about 0.15(Larm3), at least about 0.18(Larm3), at least about 0.2(Larm3), at least about 0.22(Larm3), at least about 0.25 (Larm3), at least about 0.28(Larm3), at least about 0.3 (Larm3), at least about 0.32(Larm3), at least about 0.35 (Larm3), at least about 0.38(Larm3), or even at least about 0.4(Larm3). In another non-limiting embodiment, the third tip length (Ltip3) can be not greater than about 0.95(Larm3), such as not greater than about 0.9(Larm3), not greater than about 0.85(Larm3), not greater than about 0.8(Larm3), not greater than about 0.75(Larm3), not greater than about 0.7(Larm3), not greater than about 0.65(Larm3), not greater than about 0.6(Larm3), not greater than about 0.55(Larm3), not greater than about 0.5(Larm3), not greater than about 0.45(Larm3). It will be appreciated that the third tip length (Ltip3) can be within a range between any of the minimum and maximum values above.

The body 1601 can further include a third throat width (Wth3), which can define a narrowest portion of the third arm 1693 between the third maximum tip width location 1677 of the third arm 1693 and the midpoint 1681. Moreover, the third throat width (Wth3) can define a third throat width location 1678 along the axis 1683 of the third arm 1693. As illustrated, in certain embodiments, the third throat location 1678 can be closer to the midpoint 1681 than the third maximum tip width location 1677.

In at least one embodiment, the distance between the third throat location 1678 and the third maximum tip width location 1677 can define a third throat length (Lth3). In certain embodiments, the third throat length (Lth3) can have a particular length relative to the length of the third arm (Larm3) that may improve the performance of the shaped abrasive particle 1600. For example, the third throat length (Lth3) can be a fraction of a total length of the third arm (Larm3). In one instance, the third throat length (Lth3) can be at least about 0.01(Larm3), such as at least about 0.02 (Larm3), at least about 0.03(Larm3), at least about 0.04 (Larm3), at least about 0.05(Larm3), at least about 0.06 (Larm3), at least about 0.07(Larm3), at least about 0.08 (Larm3), at least about 0.09(Larm3), at least about 0.1 (Larm3), at least about 0.12(Larm3), at least about 0.15 (Larm3), at least about 0.18(Larm3), at least about 0.2 (Larm3), at least about 0.22(Larm3), at least about 0.25 (Larm3), at least about 0.28(Larm3), at least about 0.3 (Larm3), at least about 0.32(Larm3), at least about 0.35 (Larm3), at least about 0.38(Larm3), at least about 0.4 (Larm3). In another non-limiting embodiment, the third throat length (Lth3) can be not greater than about 0.95 (Larm3), such as not greater than about 0.9(Larm3), not greater than about 0.85(Larm3), not greater than about 0.8(Larm3), not greater than about 0.75(Larm3), not greater than about 0.7(Larm3), not greater than about 0.65(Larm3), not greater than about 0.6(Larm3), not greater than about 0.55(Larm3), not greater than about 0.5(Larm3), not greater than about 0.45(Larm3). It will be appreciated that the second throat length (Lth3) can be within a range between any of the minimum and maximum values above.

The body 1601 can be formed such that the third throat width (Wth3) and the third maximum tip width (Wt3) have a particular relationship relative to each other, which may improve the performance of the shaped abrasive particle 1600. For example, the third throat width (Wth3) can be less than the third maximum tip width (Wt3). In more particular instances, the third throat width (Wth3) can be not greater than about 0.95(Wt3), such as not greater than about 0.9 (Wt3), not greater than about 0.85(Wt3), not greater than about 0.8(Wt3), not greater than about 0.75(Wt3), not greater than about 0.7(Wt3), not greater than about 0.65 (Wt3), not greater than about 0.6(Wt3), not greater than about 0.55(Wt3), not greater than about 0.5(Wt3), or even not greater than about 0.45(Wt3). In yet another embodiment, the third throat width (Wth3) can be at least about 0.01(Wt3), such as at least about 0.05(Wt3), at least about 0.08(Wt3), at least about 0.1(Wt3), at least about 0.12(Wt3), at least about 0.15(Wt3), at least about 0.18(Wt3), at least about 0.2(Wt3), at least about 0.22(Wt3), at least about 0.25(Wt3), at least about 0.28(Wt3), at least about 0.3(Wt3), at least about 0.32(Wt3), at least about 0.35(Wt3), at least about 0.38(Wt3), at least about 0.4(Wt3), at least about 0.42(Wt3), at least about 0.45(Wt3), at least about 0.48 (Wt3), or even at least about 0.5(Wt3). The third throat width (Wth3) can have a width relative to the third maximum tip width (Wt3) within a range between any of the minimum and maximum values noted above.

Figure 17:
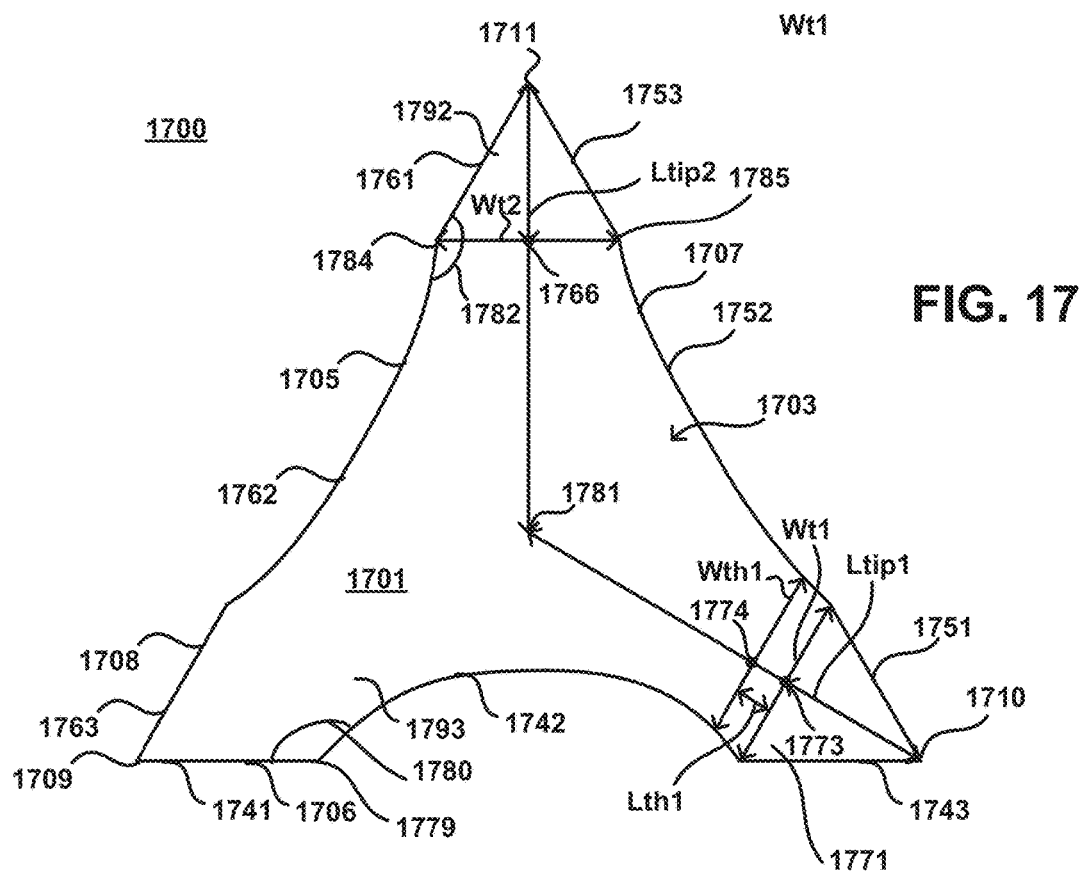
FIG. 17 includes a top view illustration of a shaped abrasive particle according to alternative embodiment.

FIG. 17 includes a top view illustration of a shaped abrasive particle according to alternative embodiment. In particular, the shaped abrasive particle 1700 can include a body 1701 having the features of other shaped abrasive particles of embodiments herein, including an upper major surface 1703 and a bottom major surface (not shown) opposite the upper major surface 1703. The upper major surface 1703 and the bottom major surface can be separated from each other by at least one side surface 1705, which may include one or more discrete side surface portions, including for example, a first portion 1706 of the side surface 1705, a second portion 1707 of the side surface 1705, and a third portion 1708 of the side surface 1705. In particular, the first portion 1706 of the side surface 1705 can extend between a first corner 1709 and a second corner 1710. The second portion 1707 of the side surface 1705 can extend between the second corner 1710 and a third corner 1711. Notably, the second corner 1710 can be an external corner joining two portions of the side surface 1705. The second corner 1710 and a third corner 1711, which is also an external corner, are adjacent to each other and have no other external corners disposed between them. Also, the third portion 1708 of the side surface 1705 can extend between the third corner 1711 and the first corner 1709, which are both external corners that are adjacent to each other and have no other external corners disposed between them.

As illustrated, the body 1701 can include a first portion 1706 including a first curved section 1742 disposed between a first linear section 1741 and a second linear section 1743 and between the external corners 1609 and 1610. The second portion 1707 of the body 1701 can further include a second curved section 1752 disposed between a third linear section 1751 and a fourth linear section 1753 and between the external corners 1610 and 1611. Moreover, the third portion 1708 can include a third curved section 1762 disposed between a fifth linear section 1761 and a sixth linear section 1763 and between the external corners 1609 and 1611. Notably, the second curved section 1752 and the third curved section 1762 have a different contour as compared to the first curved section 1742. Accordingly, the first arm 1771 of the body 1701, which extends between the midpoint 1781 of the body 1701 and the terminal end (i.e., the external corner 1610) of the first arm 1771 can have a first maximum tip width (Wt1), a first maximum tip width location 1773, a first tip length (Ltip1), a first throat width (Wth1), a first throat location 1774, and a first throat length (Lth1) having any of the same features of the embodiments herein. Notably, the first arm 1771 can have a first throat width (Wth1) that is less than or equal to the first maximum tip width (Wt1). By contrast, given the curvatures of the second curved section 1752 and third curved section 1762, the second arm 1792, which extends between the midpoint 1781 of the body 1701 and the terminal end (i.e., the external corner 1711) of the second arm 1792 does not have a throat width region, which is a region having a width that can be less than or equal to the second maximum tip width (Wt2) disposed between the second maximum tip width location 1766 and the midpoint 1781. However, as illustrated, the second arm 1792 can still have a maximum tip width (Wt2) extending between the interior corners 1784 and 1785, which further defines the second tip length (Ltip2), which may have any of the features of the embodiments herein. Moreover, as will be appreciated, the interior corner 1784 can define an angle 1782 that has a value that is distinct from the angle 1780 defined by the interior corner 1779.

The first arm 1771 can have any of the features of the arms of the embodiments herein, including for example, but not limited to, a maximum tip width, a throat width, a first tip length, a first throat length, and the like. The body 1705 can include a second arm 1792, extending between the midpoint 1781 of the body 1701 and the terminal end (e.g., the external corner 1711) of the second arm 1792. The second arm 1792 can have any of the features of the arms of the embodiments herein, including for example, but not limited to, a maximum tip width, a throat width, a first tip length, a first throat length, and the like. As also illustrated in FIG. 17, the body 1701 can include a third arm 1793, extending between the midpoint 1781 of the body 1701 and the terminal end (e.g., the external corner 1709) of the third arm 1793. The third arm 1793 can have any of the features of the arms of the embodiments herein, including for example, but not limited to, a maximum tip width, a throat width, a first tip length, a first throat length, and the like.

Figure 18A:
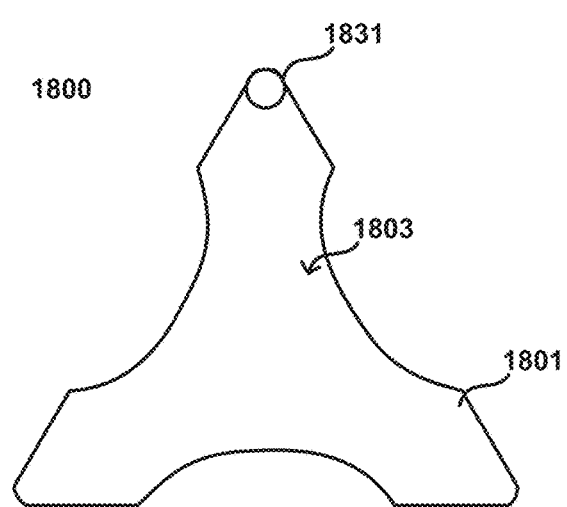
FIG. 18A includes a top view of a shaped abrasive particle according to an embodiment.

The shaped abrasive particles of the embodiments herein may be formed using any of the processes described herein. FIG. 18A includes a top view of a shaped abrasive particle 1800 according to an embodiment. Notably, the body 1801 may be formed such that it has a particular interrelationship of at least three grain features, including a predetermined strength, a predetermined tip sharpness, and a predetermined Shape Index. It will be appreciated that while reference is made to FIG. 18A, the grain features apply to all shaped abrasive particles of the embodiments herein. The tip sharpness of a shaped abrasive particle, which may be an average tip sharpness, may be measured by determining the radius of a best fit circle on an external corner of the body 1801. For example, turning to FIG. 18A, a top view of the upper major surface 1803 of the body 1801 is provided. At an external corner 1831, a best fit circle is overlaid on the image of the body 1801 of the shaped abrasive particle 1800, and the radius of the best fit circle relative to the curvature of the external corner 1831 defines the value of tip sharpness for the external corner 1831. The measurement may be recreated for each external corner of the body 1801 to determine the average individual tip sharpness for a single shaped abrasive particle 1800. Moreover, the measurement may be recreated on a suitable sample size of shaped abrasive particles of a batch of shaped abrasive particles to derive the average batch tip sharpness. Any suitable computer program, such as ImageJ may be used in conjunction with an image (e.g., SEM image or light microscope image) of suitable magnification to accurately measure the best fit circle and the tip sharpness.

The shaped abrasive particles of the embodiments herein may have a particular tip sharpness that facilitates formation of shaped abrasive particles with a particular sharpness, strength and Shape Index factor (i.e., 3SF). For example, the body of a shaped abrasive particle, according to an embodiment, can have a tip sharpness within a range between not greater than about 80 microns and at least about 1 micron. Moreover, in certain instances, the body can have a tip sharpness of not greater than about 78 microns, such as not greater than about 76 microns, not greater than about 74 microns, not greater than about 72 microns, not greater than about 70 microns, not greater than about 68 microns, not greater than about 66 microns, not greater than about 64 microns, not greater than about 62 microns, not greater than about 60 microns, not greater than about 58 microns, not greater than about 56 microns, not greater than about 54 microns, not greater than about 52 microns, not greater than about 50 microns, not greater than about 48 microns, not greater than about 46 microns, not greater than about 44 microns, not greater than about 42 microns, not greater than about 40 microns, not greater than about 38 microns, not greater than about 36 microns, not greater than about 34 microns, not greater than about 32 microns, not greater than about 30 microns, not greater than about 38 microns, not greater than about 36 microns, not greater than about 34 microns, not greater than about 32 microns, not greater than about 30 microns, not greater than about 28 microns, not greater than about 26 microns, not greater than about 24 microns, not greater than about 22 microns, not greater than about 20 microns, not greater than about 18 microns, not greater than about 16 microns, not greater than about 14 microns, not greater than about 12 microns, not greater than about 10 microns. In yet another non-limiting embodiment, the tip sharpness can be at least about 2 microns, such as at least about 4 microns, at least about 6 microns, at least about 8 microns, at least about 10 microns, at least about 12 microns, at least about 14 microns, at least about 16 microns, at least about 18 microns, at least about 20 microns, at least about 22 microns, at least about 24 microns, at least about 26 microns, at least about 28 microns, at least about 30 microns, at least about 32 microns, at least about 34 microns, at least about 36 microns, at least about 38 microns, at least about 40 microns, at least about 42 microns, at least about 44 microns, at least about 46 microns, at least about 48 microns, at least about 50 microns, at least about 52 microns, at least about 54 microns, at least about 56 microns, at least about 58 microns, at least about 60 microns, at least about 62 microns, at least about 64 microns, at least about 66 microns, at least about 68 microns, at least about 70 microns.

It will be appreciated that the body can have a tip sharpness within a range between any of the minimum and maximum values noted above.

As noted above, another grain feature is the Shape Index. The Shape Index of the body 1801 can be described as a value of an outer radius of a best-fit outer circle superimposed on the body, as viewed in two dimensions of a plane of length and width of the body 1801 (e.g., the upper major surface or the bottom major surface), compared to an inner radius of the largest best-fit inner circle that fits entirely within the body 1801, as viewed in the same plane of length and width. For example, turning to FIG. 18B, the shaped abrasive particle 1800 is provided with two circles superimposed on the illustration to demonstrate the calculation of Shape Index. A first circle is superimposed on the body 1801, which is a best-fit outer circle representing the smallest circle that can be used to fit the entire perimeter of the body 1801 within its boundaries. The outer circle has a radius (Ro). For shapes such as that illustrated in FIG. 18B, the outer circle may intersect the perimeter of the body at each of the three external corners. However, it will be appreciated that for certain irregular or complex shapes, the body may not fit uniformly within the circle such that each of the corners intersect the circle at equal intervals, but a best-fit, outer circle still may be formed. Any suitable computer program, such as ImageJ may be used in conjunction with an image of suitable magnification (e.g., SEM image or light microscope image) to create the outer circle and measure the radius (Ro).

Figure 18B:
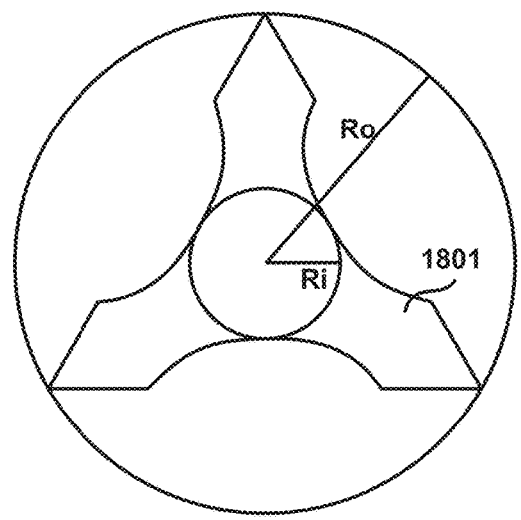
FIG. 18B includes a top view of a shaped abrasive particle according to an embodiment.

A second, inner circle can be superimposed on the body 1801, as illustrated in FIG. 18B, which circle is a best fit circle representing the largest circle that can be placed entirely within the perimeter of the body 1801 as viewed in the plane of the length and width of the body 1801. The inner circle can have a radius (Ri). It will be appreciated that for certain irregular or complex shapes, the inner circle may not fit uniformly within the body such that the perimeter of the circle contacts portions of the body at equal intervals, such as shown for the shape of FIG. 18B. However, a best-fit, inner circle still may be formed. Any suitable computer program, such as ImageJ may be used in conjunction with an image of suitable magnification (e.g., SEM image or light microscope image) to create the inner circle and measure the radius (Ri).

The Shape Index can be calculated by dividing the outer radius by the inner radius (i.e., Shape Index=Ri/Ro). For example, the body 1801 of the shaped abrasive particle 1800 has a Shape Index of approximately 0.35.

The shaped abrasive particles of the embodiments herein may have a particular Shape Index that facilitates formation of shaped abrasive particles with a particular 3SF. For example, the body 1801 may have a Shape Index within a range between at least about 0.01 and not greater than about 0.49. More particularly, in one non-limiting embodiment, the body 1801 of the shaped abrasive particle can have a Shape Index of at least about 0.02, such as at least about 0.03, at least about 0.04, at least about 0.05, at least about 0.06, at least about 0.07, at least about 0.08, at least about 0.09, at least about 0.10, at least about 0.11, at least about 0.12, at least about 0.13, at least about 0.14, at least about 0.15, at least about 0.16, at least about 0.17, at least about 0.18, at least about 0.19, at least about 0.20, at least about 0.21, at least about 0.22, at least about 0.23, at least about 0.24, at least about 0.25, at least about 0.26, at least about 0.27, at least about 0.28, at least about 0.29, at least about 0.30, at least about 0.31, at least about 0.32, at least about 0.33, at least about 0.34, at least about 0.35, at least about 0.36, at least about 0.37, at least about 0.38, at least about 0.39, at least about 0.40, at least about 0.41, at least about 0.42, at least about 0.43, at least about 0.44, at least about 0.45, at least about 0.46, or even at least about 0.47. In still another non-limiting embodiment, the body 1801 can have a Shape Index of not greater than about 0.48, such as not greater than about 0.47, not greater than about 0.46, not greater than about 0.45, not greater than about 0.44, not greater than about 0.43, not greater than about 0.42, not greater than about 0.41, not greater than about 0.40, not greater than about 0.39, not greater than about 0.38, not greater than about 0.37, not greater than about 0.36, not greater than about 0.35, not greater than about 0.34, not greater than about 0.33, not greater than about 0.32, not greater than about 0.31, not greater than about 0.30, not greater than about 0.29, not greater than about 0.28, not greater than about 0.27, not greater than about 0.26, not greater than about 0.25, not greater than about 0.24, not greater than about 0.23, not greater than about 0.22, not greater than about 0.21, not greater than about 0.20, not greater than about 0.19, not greater than about 0.18, not greater than about 0.17, not greater than about 0.16, not greater than about 0.15, not greater than about 0.14, not greater than about 0.13, not greater than about 0.12, not greater than about 0.11, not greater than about 0.10, not greater than about 0.09, not greater than about 0.08, not greater than about 0.07, not greater than about 0.06, not greater than about 0.05, or even not greater than about 0.04. It will be appreciated that the body 1801 can have a Shape Index within a range between any of the minimum and maximum values noted above.

Moreover, as noted herein, the body 1801 may be formed to have a particular strength. The strength of the body may be measured via Hertzian indentation. In this method the abrasive grains are glued on a slotted aluminum SEM sample mounting stub. The slots are approximately 250 μm deep and wide enough to accommodate the grains in a row. The grains are polished in an automatic polisher using a series of diamond pastes, with the finest paste of 1 μm to achieve a final mirror finish. At the final step, the polished grains are flat and flush with the aluminum surface. The height of the polished grains is therefore approximately 250 μm. The metal stub is fixed in a metal support holder and indented with a steel spherical indenter using an MTS universal test frame. The crosshead speed during the test is 2 μm/s. The steel ball used as the indenter is 3.2 mm in diameter. The maximum indentation load is the same for all grains, and the load at first fracture is determined from the load displacement curve as a load drop. After indentation, the grains are imaged optically to document the existence of the cracks and the crack pattern.

Using the first load drop as the pop-in load of the first ring crack, the Hertzian strength can be calculated. The Hertzian stress field is well defined and axisymmetrical. The stresses are compressive right under the indenter and tensile outside a region defined by the radius of the contact area. At low loads, the field is completely elastic. For a sphere of radius R and an applied normal load of P, the solutions for the stress field are readily found following the original Hertzian assumption that the contact is friction free.

The radius of the contact area a is given by:

$$a^3 = \frac{3PR}{4E^*} \qquad (1)$$

Where $$E^* = \left(\frac{1-v_1^2}{E_1} + \frac{1-v_2^2}{E_2}\right)^{-1} \quad (2)$$

and E* is a combination of the Elastic modulus E and the Poisson's ratio ν for the indenter and sample material, respectively.

The maximum contact pressure is given by:

$$p_0 = \left(\frac{3P}{2\pi a^2}\right) = \left(\frac{6PE^{*2}}{\pi^3 R^2}\right)^{\frac{1}{3}} \quad (3)$$

The maximum shear stress is given by (assuming ν=0.3): $\tau_1$=0.31, $p_0$, at R=0 and z=0.48 a The Hertzian strength is the maximum tensile stress at the onset of cracking and is calculated according to: $\sigma_r$=⅓ (1−2ν) $p_0$, at R=a and z=0.

Using the first load drop as the load P in Eq. (3) the maximum tensile stress is calculated following the equation above, which is the value of the Hertzian strength for the specimen. In total, between 20 and 30 individual shaped abrasive particle samples are tested for each grit type, and a range of Hertzian fracture stress is obtained. Following Weibull analysis procedures (as outlined in ASTM C1239), a Weibull probability plot is generated, and the Weibull Characteristic strength (the scale value) and the Weibull modulus (the shape parameter) are calculated for the distribution using the maximum likelihood procedure.

The shaped abrasive particles of the embodiments herein may have a particular strength that facilitates formation of shaped abrasive particles with a particular 3SF. This may be achieved using any of the compositions described in the embodiments herein, including but not limited to, a single ceramic composition, a doped ceramic composition, or a composite composition. For example, the body 1801 of the shaped abrasive particle of the embodiments herein can have a strength within a range between at least about 350 MPa and not greater than about 1500 MPa. For example, in one embodiment, the body 1801 can have a strength of not greater than about 1490 MPa, such as not greater than about 1480 MPa, not greater than about 1470 MPa, not greater than about 1460 MPa, not greater than about 1450 MPa, not greater than about 1440 MPa, not greater than about 1430 MPa, not greater than about 1420 MPa, not greater than about 1410 MPa, not greater than about 1400 MPa, not greater than about 1390 MPa, not greater than about 1380 MPa, not greater than about 1370 MPa, not greater than about 1360 MPa, not greater than about 1350 MPa, not greater than about 1340 MPa, not greater than about 1330 MPa, not greater than about 1320 MPa, not greater than about 1310 MPa, not greater than about 1300 MPa, not greater than about 1290 MPa, not greater than about 1280 MPa, not greater than about 1270 MPa, not greater than about 1260 MPa, not greater than about 1250 MPa, not greater than about 1240 MPa, not greater than about 1230 MPa, not greater than about 1220 MPa, not greater than about 1210 MPa, not greater than about 1200 MPa, not greater than about 1190 MPa, not greater than about 1180 MPa, not greater than about 1170 MPa, not greater than about 1160 MPa, not greater than about 1150 MPa, not greater than about 1140 MPa, not greater than about 1130 MPa, not greater than about 1120 MPa, not greater than about 1110 MPa, not greater than about 1100 MPa, not greater than about 1090 MPa, not greater than about 1080 MPa, not greater than about 1070 MPa, not greater than about 1060 MPa, not greater than about 1050 MPa, not greater than about 1040 MPa, not greater than about 1030 MPa, not greater than about 1020 MPa, not greater than about 1010 MPa, not greater than about 1000 MPa, not greater than about 990 MPa, not greater than about 980 MPa, not greater than about 970 MPa, not greater than about 960 MPa, not greater than about 950 MPa, not greater than about 940 MPa, not greater than about 930 MPa, not greater than about 920 MPa, not greater than about 910 MPa, not greater than about 900 MPa, not greater than about 890 MPa, not greater than about 880 MPa, not greater than about 870 MPa, not greater than about 860 MPa, not greater than about 850 MPa, not greater than about 840 MPa, not greater than about 830 MPa, not greater than about 820 MPa, not greater than about 810 MPa, not greater than about 800 MPa, not greater than about 790 MPa, not greater than about 780 MPa, not greater than about 770 MPa, not greater than about 760 MPa, not greater than about 750 MPa, not greater than about 740 MPa, not greater than about 730 MPa, not greater than about 720 MPa, not greater than about 710 MPa, not greater than about 700 MPa, not greater than about 690 MPa, not greater than about 680 MPa, not greater than about 670 MPa, not greater than about 660 MPa, not greater than about 650 MPa, not greater than about 640 MPa, not greater than about 630 MPa, not greater than about 620 MPa, not greater than about 610 MPa, not greater than about 600 MPa, not greater than about 590 MPa, not greater than about 580 MPa, not greater than about 570 MPa, not greater than about 560 MPa, not greater than about 550 MPa, not greater than about 540 MPa, not greater than about 530 MPa, not greater than about 520 MPa, not greater than about 510 MPa, not greater than about 500 MPa, not greater than about 490 MPa, not greater than about 480 MPa, not greater than about 470 MPa, not greater than about 460 MPa, not greater than about 450 MPa, not greater than about 440 MPa, not greater than about 430 MPa, not greater than about 420 MPa, not greater than about 410 MPa, or even not greater than about 400 MPa. Still, in another non-limiting embodiment, the body 1801 can have a strength of at least about 360 MPa, such as at least about 370 MPa, at least about 380 MPa, at least about 390 MPa, at least about 400 MPa, at least about 410 MPa, at least about 420 MPa, at least about 430 MPa, at least about 440 MPa, at least about 450 MPa, at least about 460 MPa, at least about 470 MPa, at least about 480 MPa, at least about 490 MPa, at least about 500 MPa, at least about 510 MPa, such as at least about 520 MPa, at least about 530 MPa, at least about 540 MPa, at least about 550 MPa, at least about 560 MPa, at least about 570 MPa, at least about 580 MPa, at least about 590 MPa, at least about 600 MPa, at least about 610 MPa, at least about 620 MPa, at least about 630 MPa, at least about 640 MPa, at least about 650 MPa, at least about 660 MPa, at least about 670 MPa, at least about 680 MPa, at least about 690 MPa, at least about 700 MPa, at least about 710 MPa, at least about 720 MPa, at least about 730 MPa, at least about 740 MPa, at least about 750 MPa, at least about 760 MPa, at least about 770 MPa, at least about 780 MPa, at least about 790 MPa, at least about 800 MPa, at least about 810 MPa, at least about 820 MPa, at least about 830 MPa, at least about 840 MPa, at least about 850 MPa, at least about 860 MPa, at least about 870 MPa, at least about 880 MPa, at least about 890 MPa, at least about 900 MPa, at least about 910 MPa, at least about 920 MPa, at least about 930 MPa, at least about 940 MPa, at least about 950 MPa, at least about 960 MPa, at least about 970 MPa, at least about 980 MPa, at least about 990 MPa, at least about 1000 MPa, at least about 1010 MPa, at least about 1020 MPa, at least about 1030 MPa, at least about 1040 MPa, at least about 1050 MPa, at least about 1060 MPa, at least about 1070 MPa, at least about 1080 MPa, at least about 1090 MPa, at least about 1100 MPa, at least about 1110 MPa, at least about 1120 MPa, at least about 1130 MPa, at least about 1140 MPa, at least about 1150 MPa, at least about 1160 MPa, at least about 1170 MPa, at least about 1180 MPa, at least about 1190 MPa, at least about 1200 MPa, at least about 1210 MPa, at least about 1220 MPa, at least about 1230 MPa, at least about 1240 MPa, at least about 1250 MPa, at least about 1260 MPa, at least about 1270 MPa, at least about 1280 MPa, at least about 1290 MPa, or even at least about 1300 MPa. It will be appreciated that the strength of the body 1801 may be within a range between any of the minimum and maximum values noted above.

According to one aspect, empirical studies of shaped abrasive particles have indicated that by controlling particular grain features of tip sharpness, strength, and Shape Index with respect to each other, the grinding behavior (e.g., the self-sharpening behavior) of the shaped abrasive particles can be modified. Notably, the forming process can be undertaken in a manner such that the interrelationship of the grain features of tip sharpness, Shape Index, and strength of the body are selected and controlled in a predetermined manner to influence the grinding performance (e.g., self-sharpening behavior) of the shaped abrasive particle. For example, in one embodiment, the method of forming the shaped abrasive particle can include selecting a material having a predetermined strength and forming the body of the shaped abrasive particle with a predetermined tip sharpness and predetermined Shape Index based upon the predetermined strength. That is, a material for forming the shaped abrasive particle may first be selected, such that the body will have a predetermined strength, and thereafter the grain features of a predetermined tip sharpness and predetermined Shape Index may be selected and controlled based on the predetermined strength, such that the shaped abrasive particle may have improved performance over conventional shaped abrasive particles.

In still another embodiment, the method of forming the shaped abrasive particle can include selecting a material having a predetermined Shape Index and forming the body of the shaped abrasive particle with a predetermined tip sharpness and predetermined strength based upon the predetermined Shape Index. That is, a shape of the body of the shaped abrasive particle may first be selected, and thereafter the grain features of a predetermined tip sharpness and predetermined strength of the body may be selected and controlled based on the predetermined Shape Index, such that the shaped abrasive particle can have improved performance over conventional shaped abrasive particles.

In yet another approach, a method of forming a shaped abrasive particle can include selecting a predetermined tip sharpness of a body of the shaped abrasive particle. After predetermining the tip sharpness of the body, the Shape Index and the strength of the body may be selected and controlled based upon the predetermined tip sharpness. Such a process may facilitate formation of a shaped abrasive particle having improved performance over conventional shaped abrasive particles.

In yet another embodiment, the method of forming the shaped abrasive particle can include selecting a material having a predetermined height, which may be an average height, an interior height, or height at an edge or tip of the body, and forming the body of the shaped abrasive particle with a predetermined tip sharpness, predetermined strength, and predetermined Shape Index based on the predetermined height. That is, a height of the body of the shaped abrasive particle may first be selected, and thereafter the grain features of a predetermined tip sharpness, strength, and Shape Index of the body may be selected and controlled based on the predetermined height, such that the shaped abrasive particle can have improved performance over conventional shaped abrasive particles.

Moreover, through empirical studies, it has been found that the performance of the shaped abrasive particle may be initially predicted by the interrelationship of the tip sharpness, strength, and Shape Index, which may be evaluated based upon a sharpness-shape-strength factor (3SF) according to the formula: $3SF=[(S*R*B^2)/2500]$, wherein "S" represents the strength of the body (in MPa), R represents the tip sharpness of the body (in microns), and "B" represents the Shape Index of the body. The 3SF formula is intended to provide an initial prediction of the effectiveness of grinding behavior of the particle based upon the interrelationship of the grain features. It should be noted that other factors, such as aspects of the abrasive article in which the shaped abrasive particle is integrated, may also influence the behavior of the particle.

In accordance with one embodiment, the body of the shaped abrasive particle may have a particular 3SF value within a range between at least about 0.7 and not greater than about 1.7. In at least one embodiment, the body can have a 3SF of at least about 0.72, such as at least about 0.75, at least about 0.78, at least about 0.8, at least about 0.82, at least about 0.85, at least about 0.88, at least about 0.90, at least about 0.92, at least about 0.95, or even at least about 0.98. In yet another instance, the body can have a 3SF of not greater than about 1.68, such as not greater than about 1.65, not greater than about 1.62, not greater than about 1.6, not greater than about 1.58, not greater than about 1.55, not greater than about 1.52, not greater than about 1.5, not greater than about 1.48, not greater than about 1.45, not greater than about 1.42, not greater than about 1.4, not greater than about 1.38, not greater than about 1.35, not greater than about 1.32, not greater than about 1.3, not greater than about 1.28, not greater than about 1.25, not greater than about 1.22, not greater than about 1.2, not greater than about 1.18, not greater than about 1.15, not greater than about 1.12, not greater than about 1.1. It will be appreciated that the body can have a 3SF value within a range between any of the minimum and maximum values noted above.

In addition to the foregoing grain features and 3SF values of the embodiments herein, in certain instances, the height of the grain may be an additional or alternative grain feature that may be interrelated to certain grain features described herein. In particular, the height of the grain may be controlled with respect to any of the grain features (e.g., strength and tip sharpness) to facilitate improved grinding performance of the shaped abrasive particles and abrasive articles using such shaped abrasive particles. Notably, the shaped abrasive particles of the embodiments herein can have a particular height, which may be interrelated to certain grain features, such that stresses encountered during grinding may be distributed throughout the body in a manner to facilitate improved self-sharpening behavior. According to one embodiment, the body of the shaped abrasive particles can have a height (h) within a range between about 70 microns and about 500 microns, such as within a range between about 175 microns to about 350 microns, such as between about 175 microns and about 300 microns, or even within a range between about 200 microns and about 300 microns.

The shaped abrasive particles of the embodiments herein having the particular grain features and 3SF can have any of the other features of the embodiments described herein. In one aspect, the body 1701 of the shaped abrasive particle can have a particular composition. For example, the body 1701 may include a ceramic material, such as a polycrystalline ceramic material, and more particularly an oxide. The oxide may include, for example alumina. In certain instances, the body may include a majority content of alumina, such as at least about 95 wt % alumina for the total weight of the body, or such as at least about 95.1 wt %, at least about 95.2 wt %, at least about 95.3 wt %, at least about 95.4 wt %, at least about 95.5 wt %, at least about 95.6 wt %, at least about 95.7 wt %, at least about 95.8 wt %, at least about 95.9 wt %, at least about 96 wt %, at least about 96.1 wt %, at least about 96.2 wt %, at least about 96.3 wt %, at least about 96.4 wt %, at least about 96.5 wt %, at least about 96.6 wt %, at least about 96.7 wt %, at least about 96.8 wt %, at least about 96.9 wt %, at least about 97 wt %, at least about 97.1 wt %, at least about 97.2 wt %, at least about 975.3 wt %, at least about 97.4 wt %, or even at least about 97.5 wt % alumina for the total weight of the body. Still, in another non-limiting embodiment, the body 1701 may include a content of alumina not greater than about 99.5 wt %, such as not greater than about 99.4 wt %, not greater than about 99.3 wt %, not greater than about 99.2 wt %, not greater than about 99.1 wt %, not greater than about 99 wt %, not greater than about 98.9 wt %, not greater than about 98.8 wt %, not greater than about 98.7 wt %, not greater than about 98.6 wt %, not greater than about 98.5 wt %, not greater than about 98.4 wt %, not greater than about 98.3 wt %, not greater than about 98.2 wt %, not greater than about 98.1 wt %, not greater than about 98 wt %, not greater than about 97.9 wt %, not greater than about 97.8 wt %, not greater than about 97.7 wt %, not greater than about 97.6 wt %, or even not greater than about 97.5 wt % alumina for the total weight of the body 1201. It will be appreciated that the body 1701 may include a content of alumina within a range between any of the minimum and maximum values noted above. Moreover, in at least one embodiment, the body 1701 may consist essentially of alumina.

In a particular instance, the shaped abrasive particles of the embodiments herein can have a particular draft angle at the intersection of the smallest major surface and the side surface, which may be indicative of a particular aspect of forming and/or may facilitate improved performance of the abrasive particle. In one particular instance, the shaped abrasive particles herein can have an average draft angle, which can be an average measure of draft angle for a statistically relevant and random sample size of shaped abrasive particles (e.g., at least 20 particles). In a particular instance, the average draft angle can be not greater than 95°, such as not greater than 94° or no greater than 93° or not greater than 92° or not greater than 91° or even not greater than 90°. In at least one non-limiting embodiment, the shaped abrasive particles of the embodiments herein can have an average draft angle of at least 80° such as at least 82° or at least 84° or at least 85° or at least 86° or at least 87°. It will be appreciated that the shaped abrasive particles of the embodiments herein can have an average draft angle within a range including any of the minimum and maximum values noted above, including but not limited to, within a range of at least 80° and not greater than 95° or within a range including at least 80° and not greater than 94° or within a range including at least 82° and not greater than 93° or within a range including at least 84° and not greater than 93°.

Figure 18C:
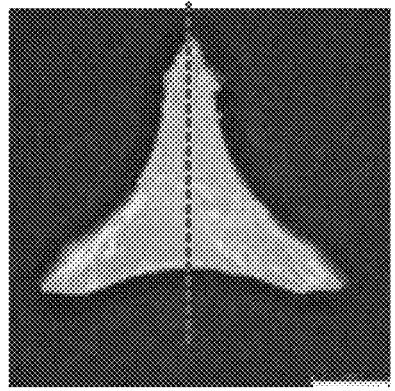
FIG. 18C includes a top-down image of a shaped abrasive particle with a line of sectioning for measurement of draft angle according to an embodiment.
Figure 18D:
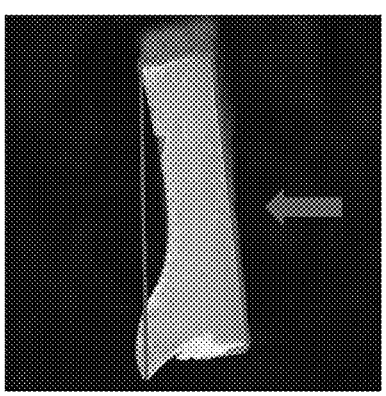
FIG. 18D includes a cross-sectional image of a shaped abrasive particle for measurement of a draft angle according to an embodiment.

The draft angle can be measured by cutting the shaped abrasive particle in half at an approximately 90° angle with respect to the major surface and at a perpendicular angle to one of the side surfaces, such as shown by the dotted line in FIG. 18C. As best as possible, the sectioning line should extend perpendicular to the side surface and through the midpoint of a major surface of the particle. The portion of the shaped abrasive particle is then mounted and viewed via SEM in a manner that is similar to that provided in FIG. 18D. A suitable program for such includes ImageJ software. Using the image of the body, the smallest major surface is determined by identifying the largest major surface and selecting the surface opposite thereof. Certain shaped abrasive particles may have a generally square cross-sectional shape. To identify the smallest major surface, the largest major surface must first be determined. The smallest major surface is that surface opposite the largest major surface. The imaging software, such as ImageJ may be utilized to assist with the determination of the smallest major surface. Using a suitable image processing software (e.g., ImageJ) draw a straight line along both of the major surfaces between the corners adjoining the major surfaces and the sidewall as provided by the lines below in FIG. 18D. Using the image analysis software, measure the line that longer. The shorter of the two lines is presumed to be the smaller of the two major surfaces. In the case provided in FIG. 18D, the line on the right of the image is shorter and the draft angle should be measured at the corner identified at the upper right-hand corner, which is also illustrated in FIG. 18E.

Figure 18E:
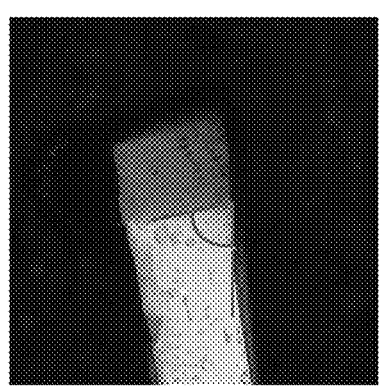
FIG. 18E includes a cross-sectional image of a shaped abrasive particle for measurement of a draft angle according to an embodiment.

To measure the draft angle, lines can be drawn along the smallest major surface and the side surface to form an intersecting angle as provided in FIG. 18E. The lines are drawn taking into consideration the shape of the surfaces as a whole and ignoring imperfections or other non-representative surface undulations at the corner of the particle (e.g., cracks or chips due to mounting procedures, etc.). Moreover, the line representing the smaller major surface is drawn to represent the portion of the major surface that connects the sidewall at the draft angle. The draft angle (i.e., the angle of the body as measured at the intersection) is determined by the interior angle formed at the intersection of the lines.

As noted in embodiments herein, the body of the shaped abrasive particles may be formed to include certain additives. The additives can be non-organic species, including but not limited to an oxide, a metal element, a rare-earth element, and a combination thereof. In one particular instance, the additive may be a dopant material, which may be present in a particular minor amount sufficient to affect the microstructure of the material, but not necessarily present in a trace amount or less. The dopant material may include an element selected from the group consisting of an alkali element, an alkaline earth element, a rare earth element, a transition metal element, and a combination thereof. More particularly, the dopant material can be an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof. In still a more particular embodiment, the dopant material may include a magnesium-containing species, including but not limited to, magnesium oxide (MgO).

Certain compositions of the shaped abrasive particles of the embodiments herein can include a particular content of magnesium oxide. For example, the body 1701 may include a content of the magnesium-containing species of at least about 0.5 wt %, such as at least about 0.6 wt %, at least about 0.7 wt %, at least about 0.8 wt %, at least about 0.9 wt %, at least about 1 wt %, at least about 1.1 wt %, at least about 1.2 wt %, at least about 1.3 wt %, at least about 1.4 wt %, at least about 1.5 wt %, at least about 1.6 wt %, at least about 1.7 wt %, at least about 1.8 wt %, at least about 1.9 wt %, at least about 2 wt %, at least about 2.1 wt %, at least about 2.2 wt %, at least about 2.3 wt %, at least about 2.4 wt %, or even at least about 2.5 wt % for the total weight of the body 1701. In still another non-limiting embodiment, the body 1701 may include a content of the magnesium-containing species of not greater than about 8 wt %, not greater than about 7 wt %, not greater than about 6 wt %, not greater than about 5 wt %, not greater than about 4.9 wt %, not greater than about 4.8 wt %, not greater than about 4.7 wt %, not greater than about 4.6 wt %, not greater than about 4.5 wt %, not greater than about 4.4 wt %, not greater than about 4.3 wt %, not greater than about 4.2 wt %, not greater than about 4.1 wt %, not greater than about 4 wt %, not greater than about 3.9 wt %, not greater than about 3.8 wt %, not greater than about 3.7 wt %, not greater than about 3.6 wt %, not greater than about 3.5 wt %, not greater than about 3.4 wt %, not greater than about 3.3 wt %, not greater than about 3.2 wt %, not greater than about 3.1 wt %, not greater than about 3 wt %, not greater than about 2.9 wt %, not greater than about 2.8 wt %, not greater than about 2.7 wt %, not greater than about 2.6 wt %, not greater than about 2.5 wt %. It will be appreciated that the content of the magnesium-containing species within the body may be within a range between any of the minimum and maximum values noted above. Furthermore, in at least one embodiment, the body 1701 may consist essentially of alumina ($Al_2O_3$) and the magnesium-containing species (e.g., MgO and/or a magnesium aluminate).

Moreover, as noted herein, the body of a shaped abrasive particle of any of the embodiments herein may be formed of a polycrystalline material including grains, which may be made of materials such as nitrides, oxides, carbides, borides, oxynitrides, diamond, and a combination thereof. Further, the body 1701 can be essentially free of an organic material, essentially free of rare earth elements, and essentially free of iron. Being essentially free is understood to mean that the body is formed in a manner to exclude such materials, but the body may not necessarily be completely free of such materials as they may be present in trace amounts or less.

A Fixed Abrasive Article

After forming or sourcing the shaped abrasive particles, the particles can be combined with other materials to form a fixed abrasive article. In a fixed abrasive, the shaped abrasive particles can be coupled to a matrix or substrate and used for material removal operations. Some suitable exemplary fixed abrasive articles can include bonded abrasive articles wherein the shaped abrasive particles are contained in a three dimensional matrix of bond material. In other instances, the fixed abrasive article may be a coated abrasive article, wherein the shaped abrasive particles may be dispersed in a single layer overlying a backing (e.g., a substrate) and bonded to the backing using one or more adhesive layers.

Figure 5A:
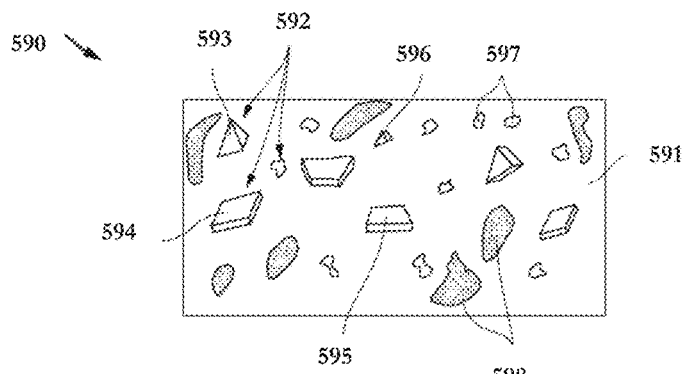
FIG. 5A includes an illustration of a bonded abrasive article incorporating shaped abrasive particles in accordance with an embodiment.

FIG. 5A includes an illustration of a bonded abrasive article incorporating the abrasive particulate material in accordance with an embodiment. As illustrated, the bonded abrasive 590 can include a bond material 591, abrasive particulate material 592 contained in the bond material, and porosity 598 within the bond material 591. In particular instances, the bond material 591 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

In some instances, the abrasive particulate material 592 of the bonded abrasive 590 can include shaped abrasive particles 593, 594, 595, and 596. In particular instances, the shaped abrasive particles 593, 594, 595, and 596 can be different types of particles, which can differ from each other in composition, two-dimensional shape, three-dimensional shape, size, and a combination thereof as described in the embodiments herein. Alternatively, the bonded abrasive article can include a single type of shaped abrasive particle.

The bonded abrasive 590 can include a type of abrasive particulate material 597 representing diluent abrasive particles, which can differ from the shaped abrasive particles 593, 594, 595, and 596 in composition, two-dimensional shape, three-dimensional shape, size, and a combination thereof.

The porosity 598 of the bonded abrasive 590 can be open porosity, closed porosity, and a combination thereof. The porosity 598 may be present in a majority amount (vol %) based on the total volume of the body of the bonded abrasive 590. Alternatively, the porosity 598 can be present in a minor amount (vol %) based on the total volume of the body of the bonded abrasive 590. The bond material 591 may be present in a majority amount (vol %) based on the total volume of the body of the bonded abrasive 590. Alternatively, the bond material 591 can be present in a minor amount (vol %) based on the total volume of the body of the bonded abrasive 590. Additionally, abrasive particulate material 592 can be present in a majority amount (vol %) based on the total volume of the body of the bonded abrasive 590. Alternatively, the abrasive particulate material 592 can be present in a minor amount (vol %) based on the total volume of the body of the bonded abrasive 590.

Figure 5B:
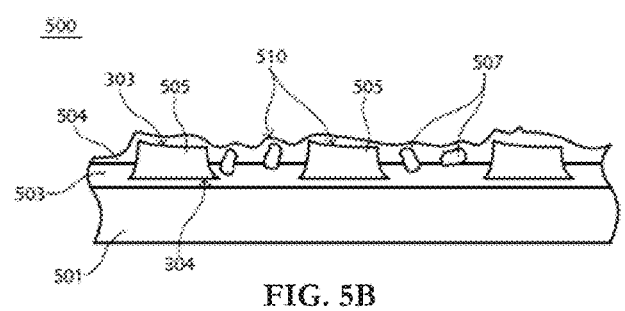
FIG. 5B includes a cross-sectional illustration of a portion of a coated abrasive article according to an embodiment.

FIG. 5B includes a cross-sectional illustration of a coated abrasive article in accordance with an embodiment. In particular, the coated abrasive article 500 can include a substrate 501 (e.g., a backing) and at least one adhesive layer overlying a surface of the substrate 501. The adhesive layer can include a make coat 503 and/or a size coat 504. The coated abrasive article 500 can include abrasive particulate material 510, which can include shaped abrasive particles 505 of any of the embodiments herein and a second type of abrasive particulate material 507 in the form of diluent abrasive particles having a random shape, which may not necessarily be shaped abrasive particles. The shaped abrasive particles 505 of FIG. 5B are illustrated generally for purposes or discussion, and it will be appreciated that the coated abrasive article can include any shaped abrasive particles of the embodiments herein. The make coat 503 can be overlying the surface of the substrate 501 and surrounding at least a portion of the shaped abrasive particles 505 and second type of abrasive particulate material 507. The size coat 504 can be overlying and bonded to the shaped abrasive particles 505 and second type of abrasive particulate material 507 and the make coat 503.

According to one embodiment, the substrate 501 can include an organic material, inorganic material, and a combination thereof. In certain instances, the substrate 501 can include a woven material. However, the substrate 501 may be made of a non-woven material. Particularly suitable substrate materials can include organic materials, including polymers such as polyester, polyurethane, polypropylene, and/or polyimides such as KAPTON from DuPont, and paper. Some suitable inorganic materials can include metals, metal alloys, and particularly, foils of copper, aluminum, steel, and a combination thereof. The backing can include one or more additives selected from the group of catalysts, coupling agents, curants, anti-static agents, suspending agents, anti-loading agents, lubricants, wetting agents, dyes, fillers, viscosity modifiers, dispersants, defoamers, and grinding agents.

A polymer formulation may be used to form any of a variety of layers of the coated abrasive article 500 such as, for example, a frontfill, a pre-size, the make coat, the size coat, and/or a supersize coat. When used to form the frontfill, the polymer formulation generally includes a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a nonreactive thermoplastic resin binder which can enhance the self-sharpening characteristics of the deposited abrasive particles by enhancing the erodability. Examples of such thermoplastic resin include polypropylene glycol, polyethylene glycol, and polyoxypropylene-polyoxyethene block copolymer, etc. Use of a frontfill on the substrate 501 can improve the uniformity of the surface, for suitable application of the make coat 503 and improved application and orientation of shaped abrasive particles 505 in a predetermined orientation.

The make coat 503 can be applied to the surface of the substrate 501 in a single process, or alternatively, the abrasive particulate material 510 can be combined with a make coat 503 material and applied as a mixture to the surface of the substrate 501. Suitable materials of the make coat 503 can include organic materials, particularly polymeric materials, including for example, polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and mixtures thereof. In one embodiment, the make coat 503 can include a polyester resin. The coated substrate can then be heated in order to cure the resin and the abrasive particulate material to the substrate. In general, the coated substrate 501 can be heated to a temperature of between about 100° C. to less than about 250° C. during this curing process.

The abrasive particulate material 510 can include shaped abrasive particles 505 according to embodiments herein. In particular instances, the abrasive particulate material 510 may include different types of shaped abrasive particles 505. The different types of shaped abrasive particles can differ from each other in composition, in two-dimensional shape, in three-dimensional shape, in size, and a combination thereof as described in the embodiments herein. As illustrated, the coated abrasive 500 can include a shaped abrasive particle 505 which may have any of the shapes of the shaped abrasive particles of the embodiments herein.

The other type of abrasive particles 507 can be diluent particles different than the shaped abrasive particles 505. For example, the diluent particles can differ from the shaped abrasive particles 505 in composition, in two-dimensional shape, in three-dimensional shape, in size, and a combination thereof. For example, the abrasive particles 507 can represent conventional, crushed abrasive grit having random shapes. The abrasive particles 507 may have a median particle size less than the median particle size of the shaped abrasive particles 505.

After sufficiently forming the make coat 503 with the abrasive particulate material 510, the size coat 504 can be formed to overlie and bond the abrasive particulate material 510 in place. The size coat 504 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

According to one embodiment, the shaped abrasive particles 505 can be oriented in a predetermined orientation relative to each other and/or the substrate 501. While not completely understood, it is thought that one or a combination of dimensional features may be responsible for improved orientation of the shaped abrasive particles 505. According to one embodiment, the shaped abrasive particles 505 can be oriented in a flat orientation relative to the substrate 501, such as that shown in FIG. 5B. In the flat orientation, the bottom surface 304 of the shaped abrasive particles can be closest to a surface of the substrate 501 and the upper surface 303 of the shaped abrasive particles 505 can be directed away from the substrate 501 and configured to conduct initial engagement with a workpiece.

Figure 6:
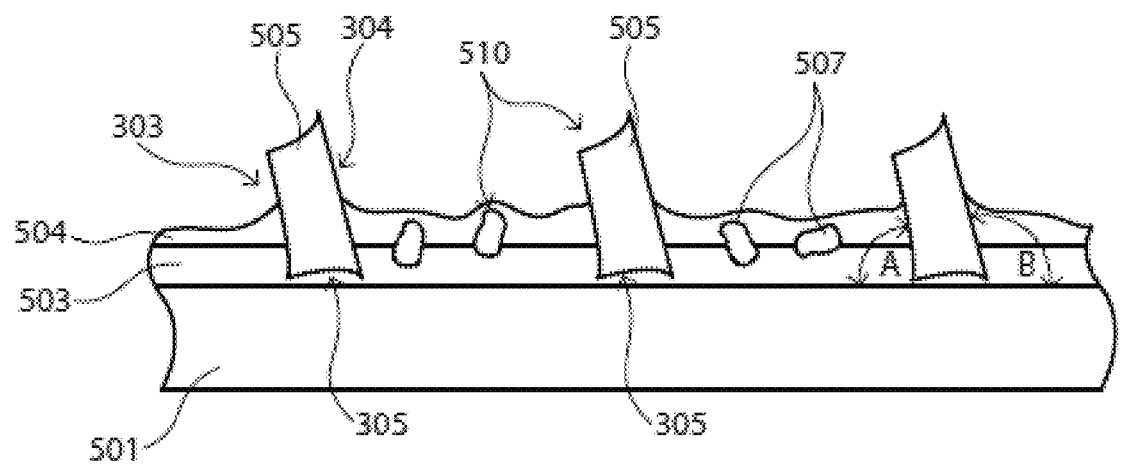
FIG. 6 includes a cross-sectional illustration of a portion of a coated abrasive article according to an embodiment.

According to another embodiment, the shaped abrasive particles 505 can be placed on a substrate 501 in a predetermined side orientation, such as that shown in FIG. 6. In particular instances, a majority of the shaped abrasive particles 505 of the total content of shaped abrasive particles 505 on the abrasive article 500 can have a predetermined side orientation. In the side orientation, the bottom surface 304 of the shaped abrasive particles 505 can be spaced away from and angled relative to the surface of the substrate 501. In particular instances, the bottom surface 304 can form an obtuse angle (B) relative to the surface of the substrate 501. Moreover, the upper surface 303 is spaced away and angled relative to the surface of the substrate 501, which in particular instances, may define a generally acute angle (A). In a side orientation, a side surface 305 can be closest to the surface of the substrate 501, and more particularly, may be in direct contact with a surface of the substrate 501.

For certain other abrasive articles herein, at least about 55% of the plurality of shaped abrasive particles 505 on the abrasive article 500 can be coupled to the backing in a predetermined side orientation. Still, the percentage may be greater, such as at least about 60%, at least about 65%, at least about 70%, at least about 75%, at least about 77%, at least about 80%, at least about 81%, or even at least about 82%. And for one non-limiting embodiment, an abrasive article 500 may be formed using the shaped abrasive particles 505 herein, wherein not greater than about 99% of the total content of shaped abrasive particles have a predetermined side orientation.

To determine the percentage of particles in a predetermined orientation, a 2D microfocus x-ray image of the abrasive article 500 is obtained using a CT scan machine run in the conditions of Table 1 below. The X-ray 2D imaging is conducted on shaped abrasive particles on a backing with Quality Assurance software. A specimen mounting fixture utilizes a plastic frame with a 4"×4" window and an Ø0.5" solid metallic rod, the top part of which is half flattened with two screws to fix the frame. Prior to imaging, a specimen is clipped over one side of the frame where the screw heads face the incidence direction of the X-rays. Then five regions within the 4"×4" window area are selected for imaging at 120 kV/80 μA. Each 2D projection is recorded with the X-ray off-set/gain corrections and at a magnification of 15 times.

TABLE 1

| Voltage (kV) | Current (μA) | Magnification | Field of view per image (mm × mm) | Exposure time |
|---|---|---|---|---|
| 120 | 80 | 15X | 16.2 × 13.0 | 500 ms/2.0 fps |

Figure 11:
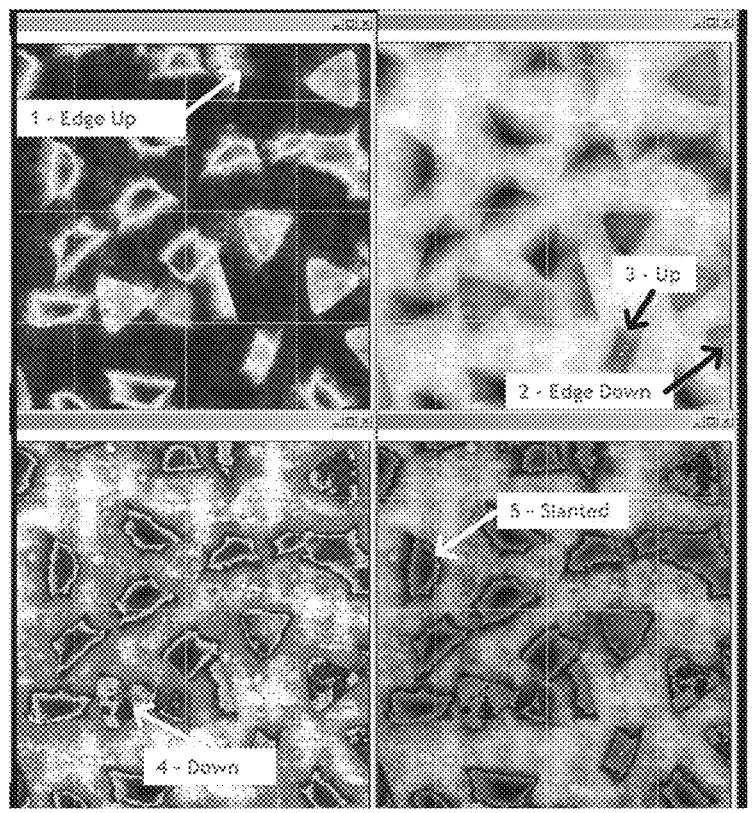
FIG. 11 includes images representative of portions of a coated abrasive according to an embodiment and used to analyze the orientation of shaped abrasive particles on the backing.

The image is then imported and analyzed using the ImageJ program, wherein different orientations are assigned values according to Table 2 below. FIG. 11 includes images representative of portions of a coated abrasive article according to an embodiment, which images can be used to analyze the orientation of shaped abrasive particles on the backing.

TABLE 2

| Cell marker type | Comments |
|---|---|
| 1 | Grains on the perimeter of the image, partially exposed - standing up |
| 2 | Grains on the perimeter of the image, partially exposed - down |
| 3 | Grains on the image, completely exposed - standing vertical |
| 4 | Grains on the image, completely exposed - down |
| 5 | Grains on the image, completely exposed - standing slanted (between standing vertical and down) |

Three calculations are then performed as provided below in Table 3. After conducting the calculations, the percentage of grains in a particular orientation (e.g., side orientation) per square centimeter can be derived.

TABLE 3

| 5) Parameter | Protocol* |
|---|---|
| % grains up | ((0.5 × 1) + 3 + 5)/(1 + 2 + 3 + 4 + 5) |
| Total # of grains per $cm^2$ | (1 + 2 + 3 + 4 + 5) |
| # of grains up per $cm^2$ | (% grains up × Total # of grains per $cm^2$ |

– These are all normalized with respect to the representative area of the image.
+– A scale factor of 0.5 was applied to account for the fact that they are not completely present in the image.

Furthermore, the abrasive articles made with the shaped abrasive particles can utilize various contents of the shaped abrasive particles. For example, the abrasive articles can be coated abrasive articles including a single layer of a plurality of shaped abrasive particles in an open-coat configuration or a closed-coat configuration. For example, the plurality of shaped abrasive particles can define an open-coat abrasive article having a coating density of shaped abrasive particles of not greater than about 70 particles/$cm^2$. In other instances, the open-coat density of shaped abrasive particles per square centimeter of abrasive article may be not greater than about 65 particles/$cm^2$, such as not greater than about 60 particles/$cm^2$, not greater than about 55 particles/$cm^2$, or even not greater than about 50 particles/$cm^2$. Still, in one non-limiting embodiment, the density of the open-coat abrasive article using the shaped abrasive particle herein can be at least about 5 particles/$cm^2$, or even at least about 10 particles/$cm^2$. It will be appreciated that the open-coat density of the coated abrasive article can be within a range between any of the above minimum and maximum values.

In an alternative embodiment, the plurality of shaped abrasive particles can define a closed-coat abrasive article having a coating density of shaped abrasive particles of at least about 75 particles/$cm^2$, such as at least about 80 particles/$cm^2$, at least about 85 particles/$cm^2$, at least about 90 particles/$cm^2$, at least about 100 particles/$cm^2$. Still, in one non-limiting embodiment, the closed-coat density of the coated abrasive article using the shaped abrasive particle herein can be not greater than about 500 particles/$cm^2$. It will be appreciated that the closed coat density of the coated abrasive article can be within a range between any of the above minimum and maximum values.

In certain instances, the abrasive article can have an open-coat density of a coating not greater than about 50% of abrasive particulate material covering the exterior abrasive surface of the article. In other embodiments, the percentage coating of the abrasive particulate material relative to the total area of the abrasive surface can be not greater than about 40%, not greater than about 30%, not greater than about 25%, or even not greater than about 20%. Still, in one non-limiting embodiment, the percentage coating of the abrasive particulate material relative to the total area of the abrasive surface can be at least about 5%, such as at least about 10%, at least about 15%, at least about 20%, at least about 25%, at least about 30%, at least about 35%, or even at least about 40%. It will be appreciated that the percent coverage of shaped abrasive particles for the total area of abrasive surface can be within a range between any of the above minimum and maximum values.

Some abrasive articles may have a particular content of abrasive particles for a length (e.g., ream) of the backing or the substrate 501. For example, in one embodiment, the abrasive article may utilize a normalized weight of shaped abrasive particles of at least about 20 lbs/ream, such as at least about 25 lbs/ream, or even at least about 30 lbs/ream. Still, in one non-limiting embodiment, the abrasive articles can include a normalized weight of shaped abrasive particles of not greater than about 60 lbs/ream, such as not greater than about 50 lbs/ream, or even not greater than about 45 lbs/ream. It will be appreciated that the abrasive articles of the embodiments herein can utilize a normalized weight of shaped abrasive particles within a range between any of the above minimum and maximum values.

The plurality of shaped abrasive particles on an abrasive article as described herein can define a first portion of a batch of abrasive particles, and the features described in the embodiments herein can represent features that are present in at least a first portion of a batch of shaped abrasive particles. Moreover, according to an embodiment, control of one or more process parameters as already described herein also can control the prevalence of one or more features of the shaped abrasive particles of the embodiments herein. The provision of one or more features of any shaped abrasive particle of a batch may facilitate alternative or improved deployment of the particles in an abrasive article and may further facilitate improved performance or use of the abrasive article. The batch may also include a second portion of abrasive particles. The second portion of abrasive particles can include diluent particles.

In accordance with one aspect of the embodiments herein, a fixed abrasive article can include a blend of abrasive particles. The blend of abrasive particles can include a first type of shaped abrasive particle and a second type of shaped abrasive particle. The first type of shaped abrasive particle can include any features of the shaped abrasive particles of the embodiments herein. The second type of shaped abrasive particle can include any features of the shaped abrasive particles of the embodiments herein. Moreover, it will be appreciated in light of the present disclosure that one or more different types of abrasive particles, including abrasive particles of the embodiments herein and/or conventional abrasive particles may be combined in a fixed abrasive to improve the overall performance of the abrasive article. This may include the use of blends of different types of abrasive particles, wherein the different types of abrasive particles may differ in size, shape, hardness, fracture toughness, strength, tip sharpness, Shape Index, composition, type and/or content of dopants, and a combination thereof.

The blend of abrasive particles can include a first type of shaped abrasive particle present in a first content (C1), which may be expressed as a percentage (e.g., a weight percent) of the first type of shaped abrasive particles as compared to the total content of particles of the blend. Furthermore, the blend of abrasive particles may include a second content (C2) of the second type of shaped abrasive particles, expressed as a percentage (e.g., a weight percent) of the second type of shaped abrasive particles relative to the total weight of the blend. The first content can be the same as or different from the second content. For example, in certain instances, the blend can be formed such that the first content (C1) can be not greater than about 90% of the total content of the blend. In another embodiment, the first content may be less, such as not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, not greater than about 15%, not greater than about 10%, or even not greater than about 5%. Still, in one non-limiting embodiment, the first content of the first type of shaped abrasive particles may be present in at least about 1% of the total content of abrasive particles of the blend. In yet other instances, the first content (C1) may be at least about 5%, such as at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or even at least about 95%. It will be appreciated that the first content (C1) may be present within a range between any of the minimum and maximum percentages noted above.

The blend of abrasive particles may include a particular content of the second type of shaped abrasive particle. For example, the second content (C2) may be not greater than about 98% of the total content of the blend. In other embodiments, the second content may be not greater than about 95%, such as not greater than about 90%, not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, not greater than about 15%, not greater than about 10%, or even not greater than about 5%. Still, in one non-limiting embodiment, the second content (C2) may be present in an amount of at least about 1% of the total content of the blend. For example, the second content may be at least about 5%, such as at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or even at least about 95%. It will be appreciated that the second content (C2) can be within a range between any of the minimum and maximum percentages noted above.

In accordance with another embodiment, the blend of abrasive particles may have a blend ratio (C1/C2) that may define a ratio between the first content (C1) and the second content (C2). For example, in one embodiment, the blend ratio (C1/C2) may be not greater than about 10. In yet another embodiment, the blend ratio (C1/C2) may be not greater than about 8, such as not greater than about 6, not greater than about 5, not greater than about 4, not greater than about 3, not greater than about 2, not greater than about 1.8, not greater than about 1.5, not greater than about 1.2, not greater than about 1, not greater than about 0.9, not greater than about 0.8, not greater than about 0.7, not greater than about 0.6, not greater than about 0.5, not greater than about 0.4, not greater than about 0.3, or even not greater than about 0.2. Still, in another non-limiting embodiment, the blend ratio (C1/C2) may be at least about 0.1, such as at least about 0.15, at least about 0.2, at least about 0.22, at least about 0.25, at least about 0.28, at least about 0.3, at least about 0.32, at least about 0.3, at least about 0.4, at least about 0.45, at least about 0.5, at least about 0.55, at least about 0.6, at least about 0.65, at least about 0.7, at least about 0.75, at least about 0.8, at least about 0.9, at least about 0.95, at least about 1, at least about 1.5, at least about 2, at least about 3, at least about 4, or even at least about 5. It will be appreciated that the blend ratio (C1/C2) may be within a range between any of the minimum and maximum values noted above.

In at least one embodiment, the blend of abrasive particles can include a majority content of shaped abrasive particles. That is, the blend can be formed primarily of shaped abrasive particles, including, but not limited to, a first type of shaped abrasive particle and a second type of shaped abrasive particle. In at least one particular embodiment, the blend of abrasive particles can consist essentially of the first type of shaped abrasive particle and the second type of shaped abrasive particle. However, in other non-limiting embodiments, the blend may include other types of abrasive particles. For example, the blend may include a third type of abrasive particle that may include a conventional abrasive particle or a shaped abrasive particle. The third type of abrasive particle may include a diluent type of abrasive particle having an irregular shape, which may be achieved through conventional crushing and comminution techniques.

According to another embodiment, the blend of abrasive particles can include a plurality of shaped abrasive particles and each of the shaped abrasive particles of the plurality may be arranged in a controlled orientation relative to a backing, such as a substrate of a coated abrasive article. Suitable exemplary controlled orientations can include at least one of a predetermined rotational orientation, a predetermined lateral orientation, and a predetermined longitudinal orientation. In at least one embodiment, the plurality of shaped abrasive particles having a controlled orientation can include at least a portion of the first type of shaped abrasive particles of the blend, at least a portion of the second type of shaped abrasive particles of the blend, and a combination thereof. More particularly, the plurality of shaped abrasive particles having a controlled orientation can include all of the first type of shaped abrasive particles. In still another embodiment, the plurality of shaped abrasive particles arranged in a controlled orientation relative to the backing may include all of the second type of shaped abrasive particles within the blend of abrasive particles.

Figure 7:
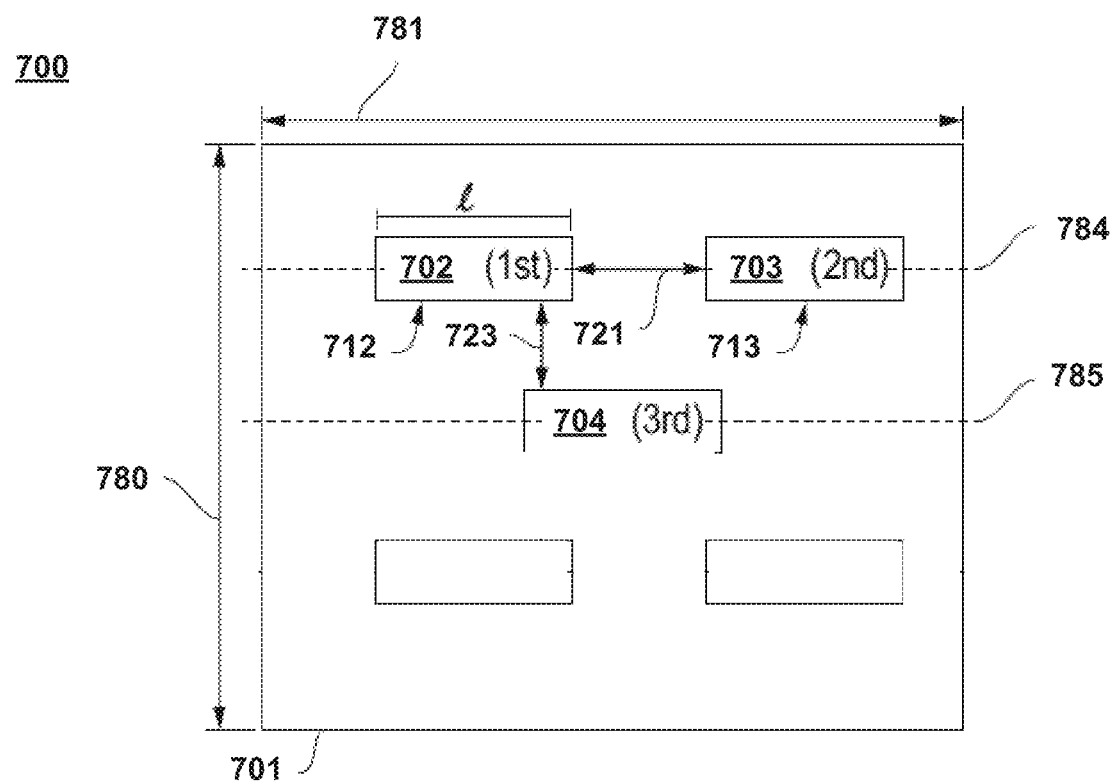
FIG. 7 includes a top-down illustration of a portion of a coated abrasive article according to an embodiment.

FIG. 7 includes a top view illustration of a portion of a coated abrasive article including shaped abrasive particles having controlled orientation. As illustrated, the coated abrasive article 700 includes a backing 701 that can be defined by a longitudinal axis 780 that extends along and defines a length of the backing 701 and a lateral axis 781 that extends along and defines a width of the backing 701. In accordance with an embodiment, a shaped abrasive particle 702 can be located in a first, predetermined position 712 defined by a particular first lateral position relative to the lateral axis of 781 of the backing 701 and a first longitudinal position relative to the longitudinal axis 780 of the backing 701. Furthermore, a shaped abrasive particle 703 may have a second, predetermined position 713 defined by a second lateral position relative to the lateral axis 781 of the backing 701, and a first longitudinal position relative to the longitudinal axis 780 of the backing 701 that is substantially the same as the first longitudinal position of the shaped abrasive particle 702. Notably, the shaped abrasive particles 702 and 703 may be spaced apart from each other by a lateral space 721, defined as a smallest distance between the two adjacent shaped abrasive particles 702 and 703 as measured along a lateral plane 784 parallel to the lateral axis 781 of the backing 701. In accordance with an embodiment, the lateral space 721 can be greater than zero, such that some distance exists between the shaped abrasive particles 702 and 703. However, while not illustrated, it will be appreciated that the lateral space 721 can be zero, allowing for contact and even overlap between portions of adjacent shaped abrasive particles.

As further illustrated, the coated abrasive article 700 can include a shaped abrasive particle 704 located at a third, predetermined position 714 defined by a second longitudinal position relative to the longitudinal axis 780 of the backing 701 and also defined by a third lateral position relative to a lateral plane 785 parallel to the lateral axis 781 of the backing 701 and spaced apart from the lateral axis 784. Further, as illustrated, a longitudinal space 723 may exist between the shaped abrasive particles 702 and 704, which can be defined as a smallest distance between the two adjacent shaped abrasive particles 702 and 704 as measured in a direction parallel to the longitudinal axis 780. In accordance with an embodiment, the longitudinal space 723 can be greater than zero. Still, while not illustrated, it will be appreciated that the longitudinal space 723 can be zero, such that the adjacent shaped abrasive particles are touching, or even overlapping each other.

Figure 8A:
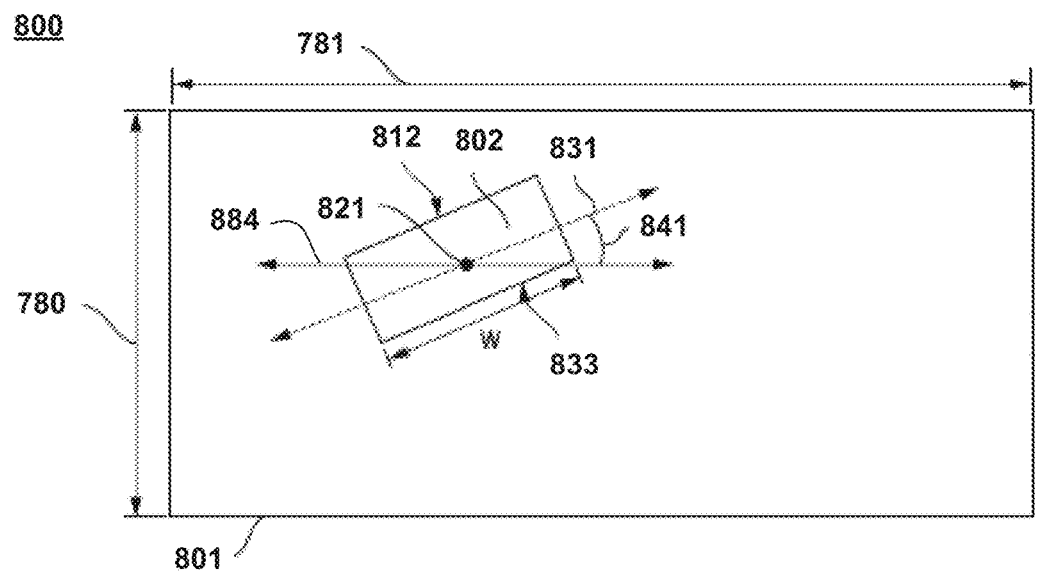
FIG. 8A includes a top-down illustration of a portion of a coated abrasive article according to an embodiment.

FIG. 8A includes a top view illustration of a portion of an abrasive article including shaped abrasive particles in accordance with an embodiment. As illustrated, the abrasive article 800 can include a shaped abrasive particle 802 overlying a backing 801 in a first position having a first rotational orientation relative to a lateral axis 781 defining the width of the backing 801. In particular, the shaped abrasive particle 802 can have a predetermined rotational orientation defined by a first rotational angle between a lateral plane 884 parallel to the lateral axis 781 and a dimension of the shaped abrasive particle 802. Notably, reference herein to a dimension of the shaped abrasive particle 802 can include reference to a bisecting axis 831 of the shaped abrasive particle 802, such bisecting axis 831 extending through a center point 821 of the shaped abrasive particle 802 along a surface (e.g., a side or an edge) connected to (directly or indirectly) the backing 801. Accordingly, in the context of a shaped abrasive particle positioned in a side orientation, (see, e.g., FIG. 6), the bisecting axis 831 can extend through a center point 821 and in the direction of the width (w) of a side 833 closest to the surface of the backing 801.

In certain embodiments, the predetermined rotational orientation of the shaped abrasive particle 802 can be defined by a predetermined rotational angle 841 that defines the smallest angle between the bisecting axis 831 and the lateral plane 884, both of which extend through the center point 821 as viewed from the top down in FIG. 8A. In accordance with an embodiment, the predetermined rotational angle 841, and thus the predetermined rotational orientation, can be 0°. In other embodiments, the predetermined rotational angle defining the predetermined rotational orientation can be greater, such as at least about 2°, at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the predetermined rotational orientation as defined by the rotational angle 841 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the predetermined rotational orientation can be within a range between any of the above minimum and maximum angles.

Figure 8B:
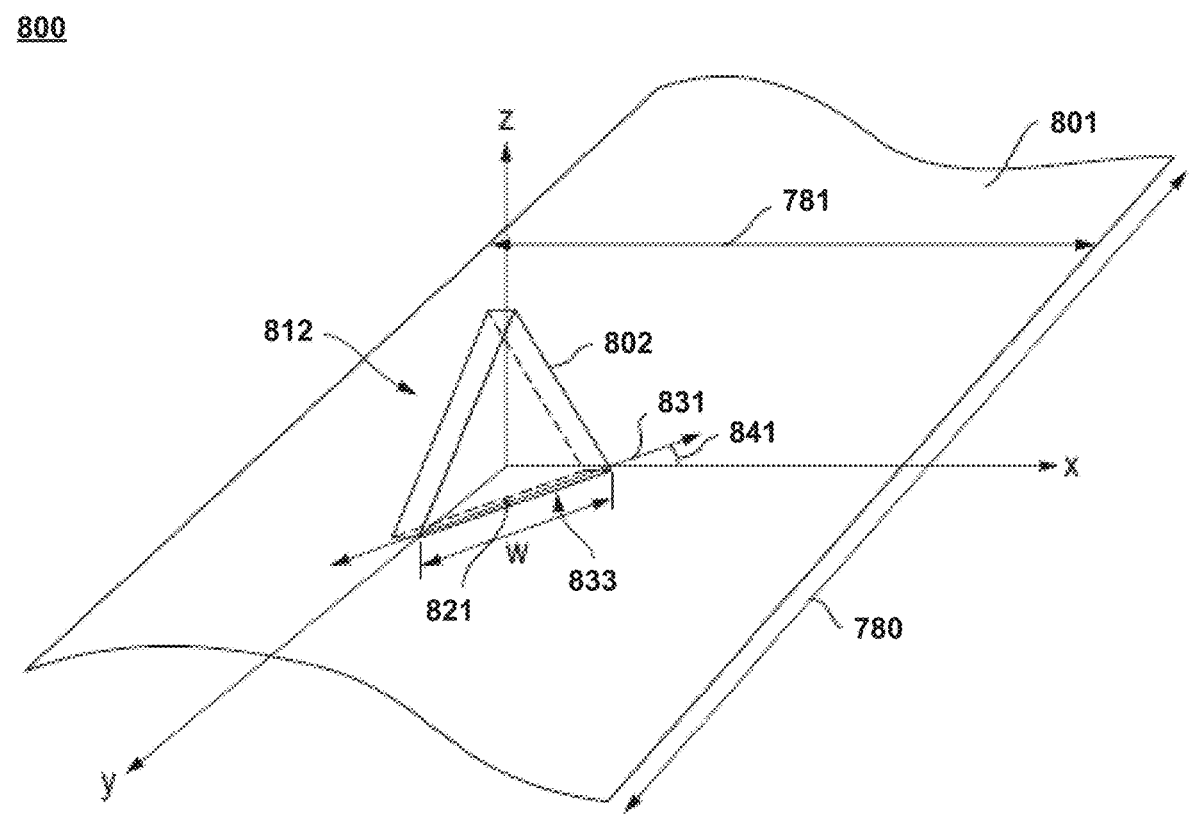
FIG. 8B includes a perspective view illustration of a portion of a coated abrasive article according to an embodiment.

FIG. 8B includes a perspective view illustration of a portion of the abrasive article 800 including the shaped abrasive particle 802 having a triangular two-dimensional shape. The referenced shaped abrasive particle having a triangular two-dimensional shape is merely illustrative, and it will be appreciated that any shaped abrasive particle having any of the shapes of the embodiments herein can be substituted for the triangular shaped abrasive particle of FIG. 8B. As illustrated, the abrasive article 800 can include the shaped abrasive particle 802 overlying the backing 801 in a first position 812 such that the shaped abrasive particle 802 includes a first rotational orientation relative to the lateral axis 781 defining the width of the backing 801. Certain aspects of the predetermined orientation of a shaped abrasive particle may be described by reference to a x, y, z three-dimensional axis as illustrated. For example, the predetermined longitudinal orientation of the shaped abrasive particle 802 may be described by reference to the position of the shaped abrasive particle 802 relative to the y-axis, which extends parallel to the longitudinal axis 780 of the backing 801. Moreover, the predetermined lateral orientation of the shaped abrasive particle 802 may be described by reference to the position of the shaped abrasive particle on the x-axis, which extends parallel to the lateral axis 781 of the backing 801. Furthermore, the predetermined rotational orientation of the shaped abrasive particle 802 may be defined with reference to a bisecting axis 831 that extends through the center point 821 of the side 833 of the shaped abrasive particle 802. Notably, the side 833 of the shaped abrasive particle 802 may be connected either directly or indirectly to the backing 801. In a particular embodiment, the bisecting axis 831 may form an angle with any suitable reference axis including, for example, the x-axis that extends parallel to the lateral axis 781. The predetermined rotational orientation of the shaped abrasive particle 802 may be described as a rotational angle formed between the x-axis and the bisecting axis 831, which rotational angle is depicted in FIG. 8B as angle 841. Notably, the controlled placement of a plurality of shaped abrasive particles on the backing of the abrasive article may facilitate improved performance of the abrasive article.

Figure 9:
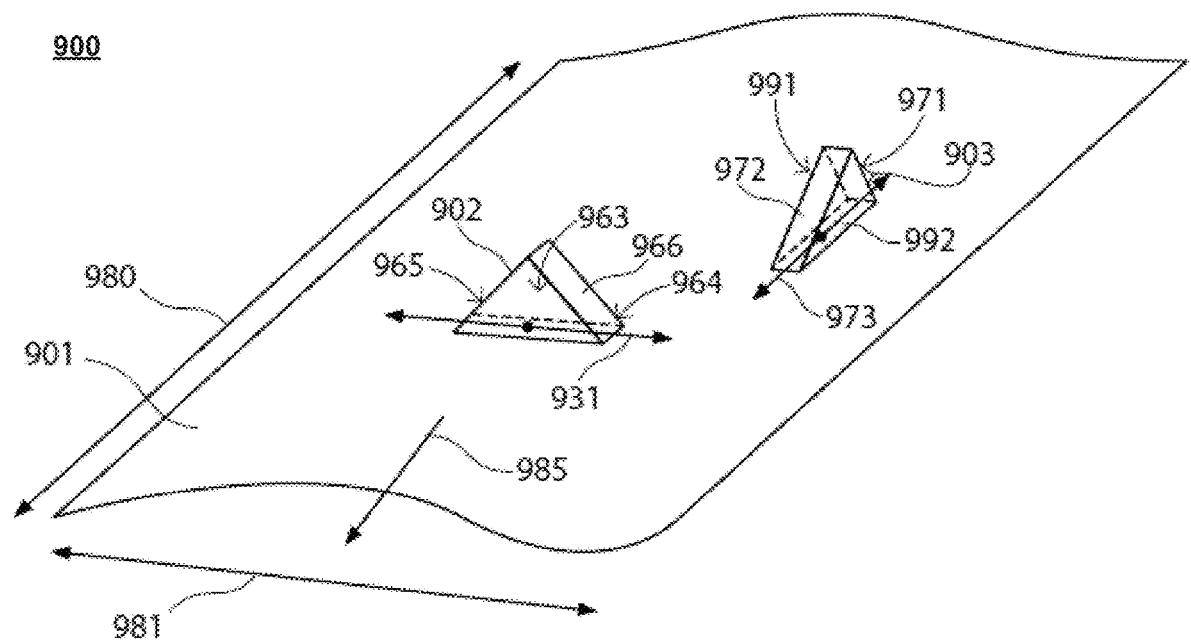
FIG. 9 includes a perspective view illustration of a portion of a coated abrasive article according to an embodiment.

FIG. 9 includes a perspective view illustration of a portion of an abrasive article including shaped abrasive particles having predetermined orientation characteristics relative to a grinding direction in accordance with an embodiment. Notably, as with FIG. 8B, the shaped abrasive particles have a triangular two-dimensional shape, which is done merely for illustration and discussion of certain features of the abrasive article. It will be appreciated that any of shaped abrasive particles of the embodiments herein can be substituted for the shaped abrasive particles illustrated in FIG. 9. In one embodiment, the abrasive article 900 can include a shaped abrasive particle 902 having a predetermined orientation relative to another shaped abrasive particle 903 and/or relative to a grinding direction 985. The grinding direction 985 may be an intended direction of movement of the abrasive article relative to a workpiece in a material removal operation. In particular instances, the grinding direction 985 may be defined relative to the dimensions of the backing 901. For example, in one embodiment, the grinding direction 985 may be substantially perpendicular to the lateral axis 981 of the backing and substantially parallel to the longitudinal axis 980 of the backing 901. The predetermined orientation characteristics of the shaped abrasive particle 902 may define an initial contact surface of the shaped abrasive particle 902 with a workpiece. For example, the shaped abrasive particle 902 can include major surfaces 963 and 964 and side surfaces 965 and 966, each of which can extend between the major surfaces 963 and 964. The predetermined orientation characteristics of the shaped abrasive particle 902 can position the particle 902 such that the major surface 963 is configured to make initial contact with a workpiece before the other surfaces of the shaped abrasive particle 902 during a material removal operation. Such an orientation may be considered a major surface orientation relative to the grinding direction 985. More particularly, the shaped abrasive particle 902 can have a bisecting axis 931 having a particular orientation relative to the grinding direction 985. For example, as illustrated, the vector of the grinding direction 985 and the bisecting axis 931 are substantially perpendicular to each other. It will be appreciated that, just as any range of predetermined rotational orientations relative to the backing are contemplated for a shaped abrasive particle, any range of orientations of the shaped abrasive particle relative to the grinding direction 985 are contemplated and can be utilized.

The shaped abrasive particle 903 can have one or more different predetermined orientation characteristics as compared to the shaped abrasive particle 902 and the grinding direction 985. As illustrated, the shaped abrasive particle 903 can include major surfaces 991 and 992, each of which can be joined by side surfaces 971 and 972. Moreover, as illustrated, the shaped abrasive particle 903 can have a bisecting axis 973 forming a particular angle relative to the vector of the grinding direction 985. As illustrated, the bisecting axis 973 of the shaped abrasive particle 903 can have a substantially parallel orientation with the grinding direction 985 such that the angle between the bisecting axis 973 and the grinding direction 985 is essentially 0 degrees. Accordingly, the predetermined orientation characteristics of the shaped abrasive particle 903 facilitate initial contact of the side surface 972 with a workpiece before any of the other surfaces of the shaped abrasive particle 903. Such an orientation of the shaped abrasive particle 903 may be considered a side surface orientation relative to the grinding direction 985.

Still, in one non-limiting embodiment, it will be appreciated that an abrasive article can include one or more groups of shaped abrasive particles that can be arranged in one or more predetermined distributions relative to the backing, a grinding direction, and/or each other. For example, one or more groups of shaped abrasive particles, as described herein, can have a predetermined orientation relative to a grinding direction. Moreover, the abrasive articles herein can have one or more groups of shaped abrasive particles, each of the groups having a different predetermined orientation relative to a grinding direction. Utilization of groups of shaped abrasive particles having different predetermined orientations relative to a grinding direction may facilitate improved performance of the abrasive article.

Figure 10:
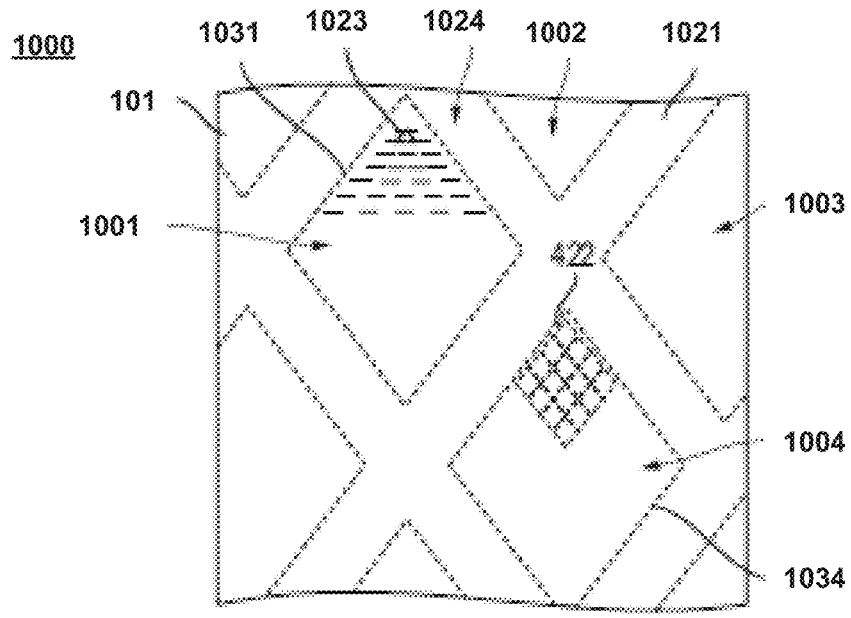
FIG. 10 includes a top view illustration of a portion of an abrasive article in accordance with an embodiment.

FIG. 10 includes a top view illustration of a portion of an abrasive article in accordance with an embodiment. In particular, the abrasive article 1000 can include a first group 1001 including a plurality of shaped abrasive particles. As illustrated, the shaped abrasive particles can be arranged relative to each other one the backing 101 to define a predetermined distribution. More particularly, the predetermined distribution can be in the form of a pattern 1023 as viewed top-down, and more particularly defining a triangular shaped two-dimensional array. As further illustrated, the first group 1001 can be arranged on the abrasive article 1000 defining a predetermined macro-shape 1031 overlying the backing 101. In accordance with an embodiment, the macro-shape 1031 can have a particular two-dimensional shape as viewed top-down. Some exemplary two-dimensional shapes can include polygons, ellipsoids, numerals, Greek alphabet characters, Latin alphabet characters, Russian alphabet characters, Arabic alphabet characters, Kanji characters, complex shapes, irregular shapes, designs, any a combination thereof. In particular instances, the formation of a group having a particular macro-shape may facilitate improved performance of the abrasive article.

As further illustrated, the abrasive article 1000 can include a group 1004 including a plurality of shaped abrasive particles which can be arranged on the surface of the backing 101 relative to each other to define a predetermined distribution. Notably, the predetermined distribution can include an arrangement of the plurality of the shaped abrasive particles that define a pattern 422, and more particularly, a generally quadrilateral pattern. As illustrated, the group 1004 can define a macro-shape 1034 on the surface of the abrasive article 1000. In one embodiment, the macro-shape 1034 of the group 1004 can have a two-dimensional shape as viewed top down, including for example a polygonal shape, and more particularly, a generally quadrilateral (diamond) shape as viewed top down on the surface of the abrasive article 1000. In the illustrated embodiment of FIG. 10, the group 1001 can have a macro-shape 1031 that is substantially the same as the macro-shape 1034 of the group 1004. However, it will be appreciated that in other embodiments, various different groups can be used on the surface of the abrasive article, and more particularly wherein each of the different groups has a different macro-shape relative to each other.

As further illustrated, the abrasive article can include groups 1001, 1002, 1003, and 1004 which can be separated by channel regions 1021 and 1024 extending between the groups 1001-1004. In particular instances, the channel regions 1021 and 1024 can be substantially free of shaped abrasive particles. Moreover, the channel regions 1021 and 1024 may be configured to move liquid between the groups 1001-1004 and further improve swarf removal and grinding performance of the abrasive article. Furthermore, in a certain embodiment, the abrasive article 1000 can include channel regions 1021 and 1024 extending between groups 1001-1004, wherein the channel regions 1021 and 1024 can be patterned on the surface of the abrasive article 1000. In particular instances, the channel regions 1021 and 1024 can represent a regular and repeating array of features extending along a surface of the abrasive article.

The fixed abrasive articles of the embodiments herein can be utilized in various material removal operations. For example, fixed abrasive articles herein can be used in methods of removing material from a workpiece by moving the fixed abrasive article relative to the workpiece. The relative movement between the fixed abrasive and the workpiece can facilitate removal of the material from the surface of the workpiece. Various workpieces can be modified using the fixed abrasive articles of the embodiments herein, including but not limited to, workpieces comprising inorganic materials, organic materials, and a combination thereof. In a particular embodiment, the workpiece may include a metal, such as a metal alloy. In one particular instance, the workpiece can consist essentially of a metal or metal alloy, such as stainless steel.

Figure 19:
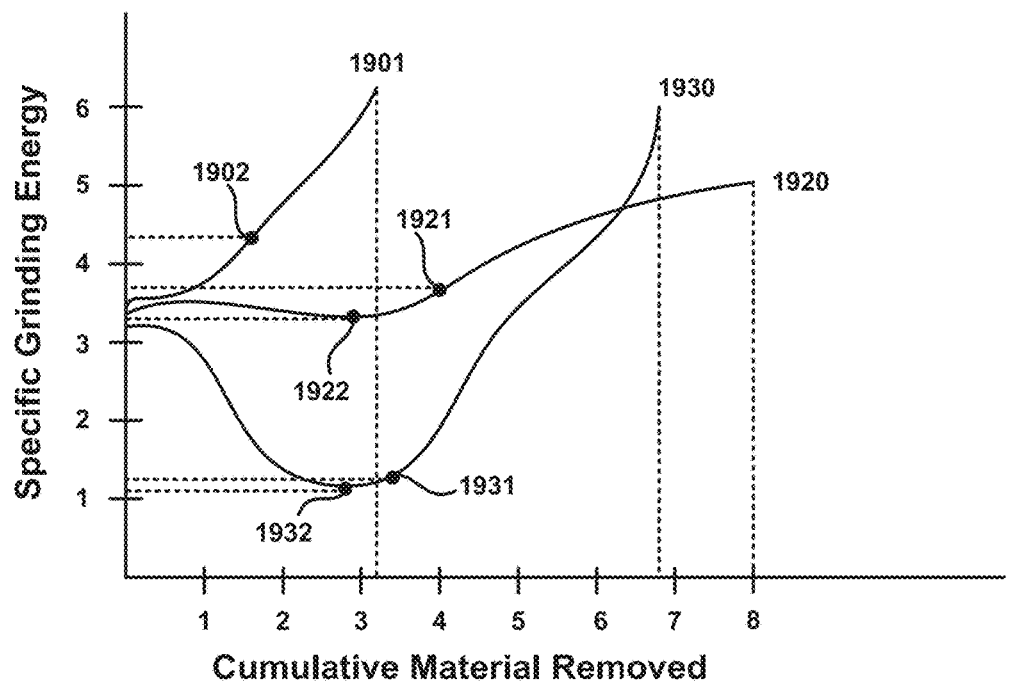
FIG. 19 includes a generalized plot of specific grinding energy versus cumulative material removed for three coated abrasive articles.

According to another embodiment, the shaped abrasive particles of the embodiments herein can be incorporated into a fixed abrasive article, which may facilitate improved performance of the fixed abrasive article. In at least one embodiment, a coated abrasive article can include the shaped abrasive particles of the embodiments herein and can have a particularly improved performance. FIG. 19 includes a generalized plot of specific grinding energy versus cumulative material removed for three coated abrasive articles. In particular, FIG. 19 includes a plot 1901 defining an initial specific grinding energy at the intersection of the plot 1901 with the Y-axis (i.e., specific grinding energy). The plot 1901 further has a full life value, defined by the greatest value of cumulative material removed on the plot 1901 (i.e., the cumulative material removed value at the end of the plot 1901). The plot 1901 further defines a half-life point 1902 defining the point on the curve that is half of the full life value. The half-life point 1902 can have a corresponding specific grinding energy value given by the intersection of the dotted line at the Y-axis.

FIG. 19 further includes a plot 1920 having an initial specific grinding energy at the intersection of the plot 1920 with the Y-axis (i.e., specific grinding energy). The plot 1920 further has a full life value, defined by the greatest value of cumulative material removed on the plot 1920 (i.e., the cumulative material removed value at the end of the plot 1920). The plot 1920 further defines a half-life point 1921 defining the point on the curve that is half of the full life value. The half-life point 1921 can have a corresponding specific grinding energy value given by the intersection of the dotted line at the Y-axis. Moreover, the plot 1920 can have a minimum point 1922 defined by the lowest value of specific grinding energy on the plot 1920. For certain plots, such as plot 1901, the minimum point is the same as the initial grinding energy at the intersection of the plot 1901 with the Y-axis.

FIG. 19 further includes a plot 1930 having an initial specific grinding energy at the intersection of the plot 1930 with the Y-axis (i.e., specific grinding energy). The plot 1930 further has a full life value, defined by the greatest value of cumulative material removed on the plot 1930 (i.e., the cumulative material removed value at the end of the plot 1930). The plot 1930 further defines a half-life point 1931 defining the point on the curve that is half of the full life value. The half-life point 1931 can have a corresponding specific grinding energy value given by the intersection of the dotted line at the Y-axis. Moreover, the plot 1930 can have a minimum point 1932 defined by the lowest value of specific grinding energy on the plot 1930. Unlike the plots 1901 and 1920, the plot 1930 demonstrates a significant decrease in the specific grinding energy in the initial stages of grinding. This may facilitate more efficient grinding in the initial stages defined by a lower minimum point 1932 and half-life point 1931 compared to those of the plots 1901 and 1920.

According to one embodiment, a fixed abrasive article can include abrasive particles, such as the shaped abrasive particles of the embodiments herein, wherein the fixed abrasive article can have a half-life/initial energy factor of not greater than 1. The half-life/initial energy factor is calculated by dividing the specific grinding energy at the half-life point of the plot by the initial specific grinding energy of the fixed abrasive (i.e., the point at which the plot intersects the Y-axis). For example, for the plot 1901 of FIG. 19, the half-life/initial energy factor would be greater than 1, since the specific grinding energy at the half-life point 1902 is greater than the initial specific grinding energy. Moreover, for plot 1920, the half-life/initial energy factor would be greater than 1 because the specific grinding energy at the half-life point 1921 is greater than the initial specific grinding energy of the plot 1920. However, the half-life/initial energy factor for plot 1930 would be less than 1, as the specific grinding energy at the half-life point 1931 is significantly less than the initial specific grinding energy of the plot 1930.

In more particular terms, the embodiments herein may include a fixed abrasive article having a half-life/initial energy factor of not greater than 1.2, such as not greater than 1.18 or not greater than 1.16 or not greater than 1.14 or not greater than 1.12 or not greater than 1.10 or not greater than 1.08 or not greater than 1.06 or not greater than 1.05 or not greater than 1.04 or not greater than 1.03 or not greater than 1.02 or not greater than 1.01 or not greater than 1.00, or not greater than 0.99 or not greater than 0.98 or not greater than 0.97 or not greater than 0.96 or not greater than 0.95 or not greater than 0.94 or not greater than 0.93 or not greater than 0.92 or not greater than 0.91 or not greater than 0.9 or not greater than 0.89 or not greater than 0.88 or not greater than 0.87 or not greater than 0.86 or not greater than 0.85 or not greater than 0.84 or not greater than 0.83 or not greater than 0.82 or not greater than 0.81 or not greater than 0.8 or not greater than 0.79 or not greater than 0.78 or not greater than 0.77 or not greater than 0.76 or not greater than 0.75 or not greater than 0.74 or not greater than 0.73 or not greater than 0.72 or not greater than 0.71 or not greater than 0.7 or not greater than 0.69 or not greater than 0.68 or not greater than 0.67 or not greater than 0.66 or not greater than 0.65 or not greater than 0.64 or not greater than 0.63 or not greater than 0.62 or not greater than 0.61 or not greater than 0.6 or not greater than 0.55 or even not greater than 0.5. Still, in another embodiment, the fixed abrasive articles herein (e.g., a coated abrasive article) can have a half-life/initial energy factor of at least 0.01 or at least 0.1 or at least 0.15 or at least 0.2 or at least 0.25 or at least 0.3 or at least 0.35 or at least 0.4 or at least 0.45 or at least 0.5 or at least 0.55 or at least 0.6 or at least 0.65 or at least 0.7 or at least 0.75 or at least 0.8 or at least 0.85 or at least 0.9. It will be appreciated that the half-life/initial energy factor can be within a range including any of the minimum and maximum values noted above. Moreover, the method of analyzing the half-life/initial energy factor can be conducted according to a standardized material removal test as provided in the Examples herein.

In yet another embodiment, a fixed abrasive article can include one or more shaped abrasive particle of the embodiments herein and have a particular minimum specific grinding energy according to the standardized material removal test. For example, the fixed abrasive can have a minimum specific grinding energy factor of at least 5%, wherein the minimum specific grinding energy factor is calculated by the equation $[(E_i-E_m)/E_i] \times 100\%$, wherein $E_i$ represents the initial specific grinding energy of the fixed abrasive as it intersects the Y-axis, and $E_m$ represents the specific grinding energy at the minimum point on the plot. According to one embodiment, the fixed abrasive can have a minimum specific grinding energy factor of at least 5.5% or at least 6% or at least 6.5% or at least 7% or at least 7.5% or at least 8% or at least 8.5% or at least 9% or at least 9.5% or at least 10% or at least 10.5% or at least 11% or at least 11.5% or at least 12% or at least 12.5% or at least 13% or at least 13.5% or at least 14% or at least 14.5%. Still, in another embodiment, the minimum specific grinding energy factor can be not greater than 60% or not greater than 50% or not greater than 40% or not greater than 30% or not greater than 25% or not greater than 20% or not greater than 18% or not greater than 15%. It will be appreciated that the minimum specific grinding energy factor can be within a range between any of the minimum and maximum percentages noted above. It will be appreciated that those samples having a specific grinding energy at the minimum point that is the same as the initial grinding energy (e.g., plot 1901) the value of the minimum specific grinding energy factor is 0%.

The fixed abrasive articles of the embodiments herein, having the particular features of minimum specific grinding energy factor and half-life/initial energy factor can include any one or combination of features described in the other embodiments herein.

EXAMPLES

Example 1

Six samples of shaped abrasive particles were created and tested for comparison of performance. A first sample, Sample S1, was initially formed from a mixture including approximately 45-50 wt % boehmite. The boehmite was obtained from Sasol Corp. as Catapal B and modified by autoclaving a 30% by weight mixture of the Catapal B with deionized water and nitric acid. The nitric acid-to-boehmite ratio was approximately 0.025 in the autoclave and treated at 100° C. to 250° C. for a time ranging from 5 minutes to 24 hours. The autoclaved Catapal B sol was then dried by conventional means. One may also use an alternative boehmite, commercially available as Disperal from Sasol Corp. The boehmite was mixed and seeded with 1% alpha alumina seeds relative to the total alumina content of the mixture. The alpha alumina seeds were made by milling of corundum using conventional techniques, described for example in U.S. Pat. No. 4,623,364. The mixture also included 45-50 wt % water and 2.5-7 wt % additional nitric acid depending on the desired viscosity of the mixture, which were used to form the gel mixture. The ingredients were mixed in a planetary mixer of conventional design and mixed under reduced pressure to remove gaseous elements from the mixture (e.g., bubbles).

After gelling, the mixture was deposited by hand into openings of a production tool made of stainless steel. The openings in the production tool were open to both sides of the production tool, such that they were apertures extending through the entire thickness of the production tool. The cavities or openings of the production tool had a shape approximately the same as the shape of the particles provided herein. All samples were made with a production tool made of stainless steel. The surfaces of the openings in the production tool were coated with a lubricant of olive oil to facilitate removal of the precursor shaped abrasive particles from the production tool. The gel was placed in the openings of the screen and dried at room temperature for at least 12 hours. After drying, the precursor shaped abrasive particles were removed from the screen and sintered between 1250-1400° C. for approximately 10 minutes.

Figure 20:
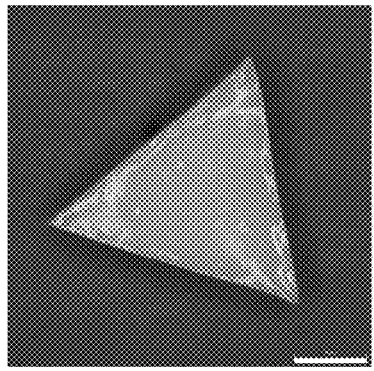
FIG. 20 includes an image of a shaped abrasive particle according to an Example.

The shaped abrasive particles of Sample S1 had a two-dimensional shape of an equilateral triangle as provided in the image of FIG. 20, having an average width of 1400 microns and a height of approximately 300 microns. The body was formed essentially of a seeded sol-gel alumina material having an average grain size of less than 1 micron. The shaped abrasive particles of Sample S1 had an average strength of approximately 847 MPa, an average tip sharpness of approximately 20 microns, a Shape Index of approximately 0.5, and a 3SF of approximately 1.7.

Figure 21:
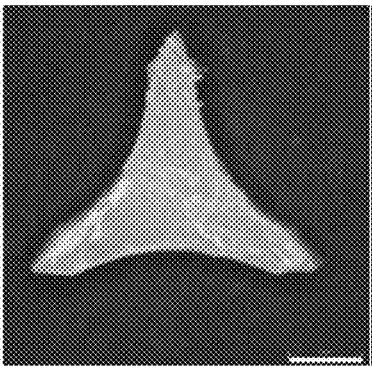
FIG. 21 includes an image of a shaped abrasive particle according to an Example.

A second sample, Sample S2, was formed using the same process used to form the shaped abrasive particles of Sample S1. Sample S2 included shaped abrasive particles having a two-dimensional shape as provided in the image of FIG. 21, which includes a body having a partially-concave shape according to the embodiments herein. The body had an average width of 1500 microns and a height of approximately 300 microns. The body was formed essentially of a seeded sol-gel alumina material having an average grain size of less than 1 micron. The shaped abrasive particles of Sample S2 had an average strength of approximately 847 MPa, an average tip sharpness of approximately 20 microns, a Shape Index of approximately 0.35, and a 3SF of approximately 0.8.

Figure 22:
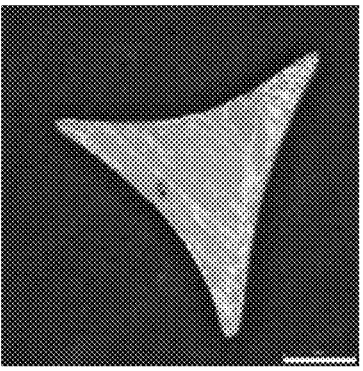
FIG. 22 includes an image of a shaped abrasive particle according to an Example.

A third sample, Sample S3, which may represent a conventional shaped abrasive particle, was formed using the same process used to form the shaped abrasive particles of Sample S1. Sample S3 includes shaped abrasive particles having a two-dimensional shape as provided in the image of FIG. 22, which is a completely concave triangular shape. The body was formed essentially of a seeded sol-gel alumina material having an average grain size of less than 1 micron. The body had an average width of 1500 microns and a height of approximately 300 microns. The shaped abrasive particles of Sample S3 had an average strength of approximately 847 MPa, an average tip sharpness of 20 microns, a Shape Index of approximately 0.38, and a 3SF of approximately 1.0.

Figure 23:
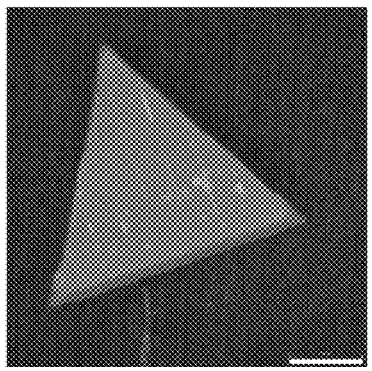
FIG. 23 includes an image of a conventional shaped abrasive particle.

A fourth sample, Sample CS4, was a conventional shaped abrasive particle commercially available as 3M984F from 3M Corporation. The body had an average width of 1400 microns and a height of approximately 300 microns. The shaped abrasive particles of Sample CS4 had a rare-earth element doped alpha-alumina composition, an average tip sharpness of approximately 20 microns, an average strength of approximately 606 MPa, a Shape Index of 0.5, and a 3SF of approximately 1.2. FIG. 23 includes an image of a shaped abrasive particle from Sample CS4.

Figure 24:
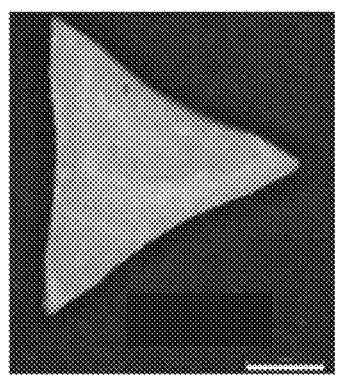
FIG. 24 includes an image of a shaped abrasive particle according to an Example.

A fifth sample, Sample S5, was formed using the same process used to form the shaped abrasive particles of Sample S1. Sample S5 included shaped abrasive particles having a two-dimensional shape as provided in the image of FIG. 24, which includes a body having a partially-concave shape according to the embodiments herein. The body had an average width of 1500 microns and a height of approximately 330 microns. The body was formed essentially of a seeded sol-gel alumina material having an average grain size of less than 1 micron. The shaped abrasive particles of Sample S5 had an average strength of approximately 847 MPa, an average tip sharpness of approximately 20 microns, a Shape Index of approximately 0.43, and a 3SF of approximately 1.25.

Figure 25:
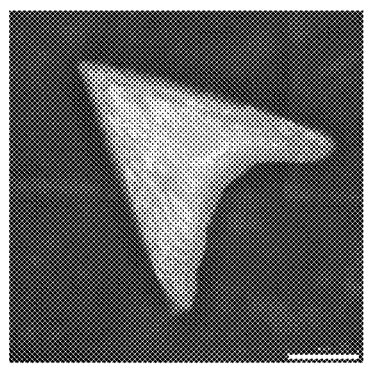
FIG. 25 includes an image of a shaped abrasive particle.

A sixth sample, Sample S6 included shaped abrasive particles having a generally arrowhead shape as illustrated in FIG. 25. The shaped abrasive particles of Sample S6 were sourced from a group of shaped abrasive particles having a generally triangular shape and represent grains where the opening of the production tool was not completely filled, thus producing the shaped abrasive particles illustrated. The particles were generally formed from the gel as provided in Sample S1, but were not formed by hand. The body had an average width of 1500 microns and a height of approximately 330 microns. The body was formed essentially of a seeded sol-gel alumina material having an average grain size of less than 1 micron. The shaped abrasive particles of Sample S6 had an average strength of approximately 847 MPa estimated from the microstructure, an average tip sharpness of approximately 20 microns, a Shape Index of approximately 0.42, and a 3SF of approximately 1.2. Note that Sample S6 was tested in two different side orientations. In the first side orientation ("Side-C"), the curved, oblique side section of the side surface defined the leading edge of the corner during the grinding test. In the second side orientation ("Side-S"), a linear surface section of the side surface was the leading edge of the external corner during the grinding test.

All samples were tested according to a single grit grinding test (SGGT) in a major surface orientation and side orientation. In conducting the SGGT, one single shaped abrasive particle is held in a grit holder by a bonding material of epoxy. The shaped abrasive particle is secured in the desired orientation (i.e., major surface orientation or side surface orientation) and moved across a workpiece of 304 stainless steel for a scratch length of 8 inches using a wheel speed of 22 m/s and an initial scratch depth of 30 microns. The shaped abrasive particle produces a groove in the workpiece having a cross-sectional area (AR). For each sample set, each shaped abrasive particle completes 15 passes across the 8 inch length, 10 individual particles are tested for each of the orientation and the results are analyzed. The test measures the tangential force exerted by the grit on the workpiece, in the direction that is parallel to the surface of the workpiece and the direction of the groove, and the net change in the cross-sectional area of the groove from beginning to the end of the scratch length is measured to determine the shaped abrasive particle wear. The net change in the cross-sectional area of the groove for each pass can be measured. For the SGGT, the net cross-sectional area of the groove is defined as the difference between the cross-sectional area of the groove below the surface and the cross sectional area of the material displaced above the surface. Performance (Ft/A) is defined as the ratio of the tangential force to the net cross-sectional area of the groove.

The SGGT is conducted using two different orientations of the shaped abrasive particles relative to the workpiece. The SGGT is conducted with a first sample set of shaped abrasive particles in a major surface orientation (i.e., "front" in FIG. 9), wherein a major surface of each shaped abrasive particle is oriented perpendicular to the grinding direction such that the major surface initiates grinding on the workpiece. The results of the SGGT using the sample set of shaped abrasive particles in a major surface orientation allows for measurement of the grinding efficiency of the shaped abrasive particles in a major surface orientation.

The SGGT is also conducted with a second sample set of shaped abrasive particles in a side surface orientation (i.e., "side" in FIG. 9), wherein a side surface of each shaped abrasive particle is oriented perpendicular to the grinding direction such that the side surface initiates grinding of the workpiece. The results of the SGGT test using the sample set of shaped abrasive particles in a side orientation allows for measurement of the grinding efficiency of the shaped abrasive particles in a side orientation.

FIG. 26 includes a plot of median force per total area removed from the workpiece, which is representative of data derived from the SGGT for all of the samples. The median force per total area is averaged for the front (i.e., major surface orientation) and side (i.e., side surface orientation) orientations. The force per total area removed is a measure of the grinding efficiency of the shaped abrasive particles, with a lower force per total area removed indicating more efficient grinding performance. As illustrated, Sample S2 demonstrated the best performance of all samples tested. Without wishing to be tied to a particular theory it is noted that the combination of strength, tip sharpness, and Shape Index of the shaped abrasive particles of Sample S2 is superior over all other samples. Unexpectedly and quite remarkably, Sample S2 demonstrated a 15% improvement in grinding efficiency over the shaped abrasive particles of Sample CS4, a 40% improvement in grinding efficiency compared to the shaped abrasive particles of Sample S3, and nearly a 60% improvement compared to the shaped abrasive particles of Sample S1.

Example 2

Abrasive particles having the shape and microstructure as outlined in Samples S1 and S2 were formed using a machine including a die to extrude the gel mixture into openings of a production tool being translated under the die. These grains were used to form coated abrasive samples having the construction outlined below and designated CAS1 and CAS2, respectively. A comparative belt commercially available from 3M as CII 984F and designated CACS4. The samples CAS1 and CAS2 had the same construction, which is provided below. A backing of finished cloth of 47 pounds per ream was obtained and coated with a make formulation including a phenol formaldehyde resin as provided in Table 4. Using an electrostatic deposition process, 41 pounds per ream of abrasive particles having substantially the same shape and microstructure as outlined for Samples S1 or S2 were applied to the backing with the make coat. The structure was dried in an oven for two hours at 80° C. It will be appreciated that the make coat was created such that sum of the components provided in Table 4 equals 100%.

TABLE 4

Make Coat Formulation

| Make Formulation Component | Percentage |
|---|---|
| Filler NYAD Wollastonite 400 | 45-50 wt % |
| Wet Witcona 1260 | 0.10-.2 wt % |
| Resin, SI | 45-50 wt % |
| Solmod Silane A1100 | 0.1-3 wt % |
| Water | 0.1-1 wt % |

The coated abrasive structures were then coated with a size coat having the formulation presented in Table 5. The construction was heat treated in an oven set for a final soak temperature of 100-120° C., in which the sample was held for approximately 20-30 minutes. It will be appreciated that the size coat was created such that sum of the components provided in Table 5 equals 100%.

TABLE 5

Size Coat Formulation

| Size Formulation Component | Percentage |
|---|---|
| Dye | 2-4 wt % |
| Solmod Tamol 165A | 0.5-2 wt % |
| Filler Syn Cryolite K | 40-45 wt % |
| Resin Single Comp 94-908 | 50-55 wt % |
| DF70 Defoamer | 0.1-0.2 wt % |
| Water | 2-4 wt % |

The coated abrasive sample was then placed into an oven to undergo heat treatment. The oven temperature was set for a final soak temperature of approximately 110-120° C., in which the sample was held for approximately 10-12 hours.

A supersize coat having the formulation provided below in Table 6 was then applied to the Samples CAS1 and CAS2 and processed in the same manner as the size coat. It will be appreciated that the supersize coat was created such that sum of the components provided in Table 6 equals 100%.

TABLE 6

Supersize Coat Formulation

| Supersize Formulation Component | Percentage |
|---|---|
| Dye | 1-3 wt % |
| Solmod Cabosil | 0.05-3 wt % |
| Solmod DAXAD 11 | 1-4 wt % |
| Filler Type A | 63-67 wt % |
| Resin PF Prefere 80-5080A | 20-25 wt % |
| DF70 Defoamer | 0.1-0.2 wt % |
| Water | 6-10 wt % |

Each of the three different coated abrasive samples CACS4, CAS1, and CAS2 was tested according to a standardized grinding test using the conditions summarized in Table 7. Notably, two sample coated abrasives were tested in each case to derive the results.

TABLE 7

| | |
|---|---|
| Test mode: | Dry, straight plunge |
| Test conditions: | Constant MRR' = 4 inch$^3$/min/inch |
| | Belt speed (Vs) = 7500 sfpm (38 m/s) |
| | Work material: 304 ss |
| | Hardness: 96-104 HRB |
| | Size: 0.5 × 0.5 × 12 inches |
| | Contact width: 0.5 in |
| | Contact Wheel: Steel |
| Measurements: | Power, Grinding Forces, MRR' and SGE |
| | Cum MR compared at SGE = 2.4 Hp.min/inch$^3$ |

FIG. 27 includes a plot of specific grinding energy versus cumulative material removed (at a material removal rate of 4 inch$^3$/min inch) for each of the samples. It is notable and quite remarkable that the coated abrasive utilizing the abrasive particles of Sample S2 had a significantly lower specific grinding energy for the initial phase of the grinding test. CAS2 demonstrated a significantly lower specific grinding energy for a significant portion of the life of the abrasive article compared to CACS4 and CAS1. In particular, CAS2 demonstrated a minimum specific grinding energy factor of approximately 6% and a half-life initial energy factor of approximately 1.05. Sample CACS4 demonstrated a minimum specific grinding energy factor of 0% and a half-life initial energy factor of approximately 1.1. Sample CAS1 demonstrated a minimum specific grinding energy factor of 0% and a half-life initial energy factor of approximately 1.2.

The present application represents a departure from the state of the art. Conventional shaped abrasive particles have previously focused on making triangular shaped grains having the sharpest possible corners and edges. However, through empirical studies of shaped abrasive particles having various shapes and microstructures, it has been discovered that certain grain features (e.g., tip sharpness, strength, and Shape Index) appear to be interrelated and may be controlled with respect to each other to provide improved performance of a shaped abrasive particle. Additionally, as noted herein, the height may be related as well. Notably, in the present application, it is noted that one may not necessarily need to create a shaped abrasive particle with the sharpest features, but instead may control one or more of a combination of grain features, including tip sharpness, strength, Shape Index, and height relative to each other to improve the grinding performance of a shaped abrasive particle beyond conventional shaped abrasive particles. In particular, it is noted that the Shape Index may define an overall shape of the body and how stress is distributed throughout the body during grinding, which when combined with a suitable tip sharpness and strength, may provide improved results over conventional triangular shaped abrasive particles having sharp tips. Moreover, while not completely understood and without wishing to be tied to a particular theory, it is thought that one or a combination of these features of the embodiments described herein facilitate the remarkable and unexpected performance of these particles in fixed abrasives, such as coated abrasive and bonded abrasives.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

Items:

Item 1. A shaped abrasive particle comprising a body comprising a first major surface, a second major surface, and a side surface extending between the first major surface and the second major surface, wherein the body comprises a sharpness-shape-strength factor (3SF) within a range between about 0.7 and about 1.7 and a Shape Index within a range between at least about 0.01 and not greater than about 0.47.

Item 2. A shaped abrasive particle comprising a body comprising a first major surface, a second major surface, and a side surface extending between the first major surface and the second major surface, wherein the body comprises a Shape Index within a range between at least about 0.01 and not greater than about 0.47 and a strength within a range between at least about 350 MPa and not greater than about 1500 MPa.

Item 3. A shaped abrasive particle comprising a body comprising a first major surface, a second major surface, and a side surface extending between the first major surface and the second major surface, wherein the body comprises an average tip sharpness within a range between not greater than about 80 microns and at least about 1 micron, a Shape Index within a range between at least about 0.01 and not greater than about 0.47, and the body comprises a strength of at least about 350 MPa and not greater than about 1500 MPa.

Item 4. A shaped abrasive particle comprising a body comprising a first major surface, a second major surface, and a side surface extending between the first major surface and the second major surface, wherein a first portion of the side surface has a partially-concave shape.

Item 5. A shaped abrasive particle comprising a body comprising a first major surface, a second major surface, and a side surface extending between the first major surface and the second major surface, wherein a first portion of the side surface extends between a first corner and second corner of the body that are adjacent to each other, and wherein the first portion of the side surface comprises a first curved section joined to a first linear section.

Item 6. A shaped abrasive particle comprising a body comprising a first major surface, a second major surface, and a side surface extending between the first major surface and the second major surface, wherein a first portion of the side surface comprises a first curved section joined to a first linear section and defining an interior corner defining an obtuse angle.

Item 7. A shaped abrasive particle comprising a body comprising a first major surface, a second major surface, and a side surface extending between the first major surface and the second major surface, wherein the body is a hybrid polygonal shape having a sum of the external corners of substantially 180 degrees, and further comprising a first portion of the side surface having a first curved section.

Item 8. A shaped abrasive particle comprising a body comprising a first major surface, a second major surface, and a side surface extending between the first major surface and the second major surface, wherein the body comprises a first maximum tip width (Wt1) that defines a maximum width of a first arm of the body, and wherein the first maximum tip width (Wt1) is disposed a distance from a first terminal end of the first arm and between a midpoint of the body and the first terminal end.

Item 9. The shaped abrasive particle of any one of items 4, 5, 6, 7, 8, wherein the body comprises a Shape Index within a range between at least about 0.01 and not greater than about 0.47.

Item 10. The shaped abrasive particle of any one of items 1, 2, 3, and 9, wherein the body comprises a Shape Index of at least about 0.02, at least about 0.03, at least about 0.04, at least about 0.05, at least about 0.06, at least about 0.07, at least about 0.08, at least about 0.09, at least about 0.10, at least about 0.11, at least about 0.12, at least about 0.13, at least about 0.14, at least about 0.15, at least about 0.16, at least about 0.17, at least about 0.18, at least about 0.19, at least about 0.20, at least about 0.21, at least about 0.22, at least about 0.23, at least about 0.24, at least about 0.25, at least about 0.26, at least about 0.27, at least about 0.28, at least about 0.29, at least about 0.30, at least about 0.31, at least about 0.32, at least about 0.33, at least about 0.34, at least about 0.35, at least about 0.36, at least about 0.37, at least about 0.38, at least about 0.39, at least about 0.40, at least about 0.41, at least about 0.42, at least about 0.43, at least about 0.44, at least about 0.45, at least about 0.46.

Item 11. The shaped abrasive particle of any one of items 1, 2, 3, and 9, wherein the body comprises a Shape Index of not greater than about 0.46, not greater than about 0.45, not greater than about 0.44, not greater than about 0.43, not greater than about 0.42, not greater than about 0.41, not greater than about 0.40, not greater than about 0.39, not greater than about 0.38, not greater than about 0.37, not greater than about 0.36, not greater than about 0.35, not greater than about 0.34, not greater than about 0.33, not greater than about 0.32, not greater than about 0.31, not greater than about 0.30, not greater than about 0.29, not greater than about 0.28, not greater than about 0.27, not greater than about 0.26, not greater than about 0.25, not greater than about 0.24, not greater than about 0.23, not greater than about 0.22, not greater than about 0.21, not greater than about 0.20, not greater than about 0.19, not greater than about 0.18, not greater than about 0.17, not greater than about 0.16, not greater than about 0.15, not greater than about 0.14, not greater than about 0.13, not greater than about 0.12, not greater than about 0.11, not greater than about 0.10, not greater than about 0.09, not greater than about 0.08, not greater than about 0.07, not greater than about 0.06, not greater than about 0.05, not greater than about 0.04.

Item 12. The shaped abrasive particle of any one of items 2, 3, 4, 5, 6, 7, and 8, wherein the body comprises a sharpness-shape-strength factor (3SF) within a range between about 0.7 and about 1.7.

Item 13. The shaped abrasive particle of any one of items 1 and 12, wherein the body has a 3SF of at least about 0.72, at least about 0.75, at least about 0.78, at least about 0.8, at least about 0.82, at least about 0.85, at least about 0.88, at least about 0.90, at least about 0.92, at least about 0.95, at least about 0.98.

Item 14. The shaped abrasive particle of any one of items 1 and 12, the body has a 3SF of not greater than about 1.68, not greater than about 1.65, not greater than about 1.62, not greater than about 1.6, not greater than about 1.58, not greater than about 1.55, not greater than about 1.52, not greater than about 1.5, not greater than about 1.48, not greater than about 1.45, not greater than about 1.42, not greater than about 1.4, not greater than about 1.38, not greater than about 1.35, not greater than about 1.32, not greater than about 1.3, not greater than about 1.28, not greater than about 1.25, not greater than about 1.22, not greater than about 1.2, not greater than about 1.18, not greater than about 1.15, not greater than about 1.12, not greater than about 1.1.

Item 15. The shaped abrasive particle of any one of items 1, 4, 5, 6, 7, and 8, wherein the body comprises a strength within a range between at least about 350 MPa and not greater than about 1500 MPa.

Item 16. The shaped abrasive particle of any one of items 3, 4, and 15, wherein the body comprises a strength of not greater than about 1490 MPa, not greater than about 1480 MPa, not greater than about 1470 MPa, not greater than about 1460 MPa, not greater than about 1450 MPa, not greater than about 1440 MPa, not greater than about 1430 MPa, not greater than about 1420 MPa, not greater than about 1410 MPa, not greater than about 1400 MPa, not greater than about 1390 MPa, not greater than about 1380 MPa, not greater than about 1370 MPa, not greater than about 1360 MPa, not greater than about 1350 MPa, not greater than about 1340 MPa, not greater than about 1330 MPa, not greater than about 1320 MPa, not greater than about 1310 MPa, not greater than about 1300 MPa, not greater than about 1290 MPa, not greater than about 1280 MPa, not greater than about 1270 MPa, not greater than about 1260 MPa, not greater than about 1250 MPa, not greater than about 1240 MPa, not greater than about 1230 MPa, not greater than about 1220 MPa, not greater than about 1210 MPa, not greater than about 1200 MPa, not greater than about 1190 MPa, not greater than about 1180 MPa, not greater than about 1170 MPa, not greater than about 1160 MPa, not greater than about 1150 MPa, not greater than about 1140 MPa, not greater than about 1130 MPa, not greater than about 1120 MPa, not greater than about 1110 MPa, not greater than about 1100 MPa, not greater than about 1090 MPa, not greater than about 1080 MPa, not greater than about 1070 MPa, not greater than about 1060 MPa, not greater than about 1050 MPa, not greater than about 1040 MPa, not greater than about 1030 MPa, not greater than about 1020 MPa, not greater than about 1010 MPa, not greater than about 1000 MPa, not greater than about 990 MPa, not greater than about 980 MPa, not greater than about 970 MPa, not greater than about 960 MPa, not greater than about 950 MPa, not greater than about 940 MPa, not greater than about 930 MPa, not greater than about 920 MPa, not greater than about 910 MPa, not greater than about 900 MPa, not greater than about 890 MPa, not greater than about 880 MPa, not greater than about 870 MPa, not greater than about 860 MPa, not greater than about 850 MPa, not greater than about 840 MPa, not greater than about 830 MPa, not greater than about 820 MPa, not greater than about 810 MPa, not greater than about 800 MPa, not greater than about 790 MPa, not greater than about 780 MPa, not greater than about 770 MPa, not greater than about 760 MPa, not greater than about 750 MPa, not greater than about 740 MPa, not greater than about 730 MPa, not greater than about 720 MPa, not greater than about 710 MPa, not greater than about 700 MPa, not greater than about 690 MPa, not greater than about 680 MPa, not greater than about 670 MPa, not greater than about 660 MPa, not greater than about 650 MPa, not greater than about 640 MPa, not greater than about 630 MPa, not greater than about 620 MPa, not greater than about 610 MPa, not greater than about 600 MPa, not greater than about 590 MPa, not greater than about 580 MPa, not greater than about 570 MPa, not greater than about 560 MPa, not greater than about 550 MPa, not greater than about 540 MPa, not greater than about 530 MPa, not greater than about 520 MPa, not greater than about 510 MPa, not greater than about 500 MPa, not greater than about 490 MPa, not greater than about 480 MPa, not greater than about 470 MPa, not greater than about 460 MPa, not greater than about 450 MPa, not greater than about 440 MPa, not greater than about 430 MPa, not greater than about 420 MPa, not greater than about 410 MPa, not greater than about 400 MPa.

Item 17. The shaped abrasive particle of any one of items 3, 4, and 15, wherein the body comprises a strength of at least about 360 MPa, at least about 370 MPa, at least about 380 MPa, at least about 390 MPa, at least about 400 MPa, at least about 410 MPa, at least about 420 MPa, at least about 430 MPa, at least about 440 MPa, at least about 450 MPa, at least about 460 MPa, at least about 470 MPa, at least about 480 MPa, at least about 490 MPa, at least about 500 MPa, at least about 510 MPa, at least about 520 MPa, at least about 530 MPa, at least about 540 MPa, at least about 550 MPa, at least about 560 MPa, at least about 570 MPa, at least about 580 MPa, at least about 590 MPa, at least about 600 MPa, at least about 610 MPa, at least about 620 MPa, at least about 630 MPa, at least about 640 MPa, at least about 650 MPa, at least about 660 MPa, at least about 670 MPa, at least about 680 MPa, at least about 690 MPa, at least about 700 MPa, at least about 710 MPa, at least about 720 MPa, at least about 730 MPa, at least about 740 MPa, at least about 750 MPa, at least about 760 MPa, at least about 770 MPa, at least about 780 MPa, at least about 790 MPa, at least about 800 MPa, at least about 810 MPa, at least about 820 MPa, at least about 830 MPa, at least about 840 MPa, at least about 850 MPa, at least about 860 MPa, at least about 870 MPa, at least about 880 MPa, at least about 890 MPa, at least about 900 MPa, at least about 910 MPa, at least about 920 MPa, at least about 930 MPa, at least about 940 MPa, at least about 950 MPa, at least about 960 MPa, at least about 970 MPa, at least about 980 MPa, at least about 990 MPa, at least about 1000 MPa, at least about 1010 MPa, at least about 1020 MPa, at least about 1030 MPa, at least about 1040 MPa, at least about 1050 MPa, at least about 1060 MPa, at least about 1070 MPa, at least about 1080 MPa, at least about 1090 MPa, at least about 1100 MPa, at least about 1110 MPa, at least about 1120 MPa, at least about 1130 MPa, at least about 1140 MPa, at least about 1150 MPa, at least about 1160 MPa, at least about 1170 MPa, at least about 1180 MPa, at least about 1190 MPa, at least about 1200 MPa, at least about 1210 MPa, at least about 1220 MPa, at least about 1230 MPa, at least about 1240 MPa, at least about 1250 MPa, at least about 1260 MPa, at least about 1270 MPa, at least about 1280 MPa, at least about 1290 MPa, at least about 1300 MPa.

Item 18. The shaped abrasive particle of any one of items 1, 2, 4, 5, 6, 7, and 8, wherein the body comprises a tip sharpness within a range between not greater than about 80 microns and at least about 1 micron.

Item 19. The shaped abrasive particle of any one of items 3 and 18, wherein the body comprises a tip sharpness of not greater than about 78 microns, not greater than about 76 microns, not greater than about 74 microns, not greater than about 72 microns, not greater than about 70 microns, not greater than about 68 microns, not greater than about 66 microns, not greater than about 64 microns, not greater than about 62 microns, not greater than about 60 microns, not greater than about 58 microns, not greater than about 56 microns, not greater than about 54 microns, not greater than about 52 microns, not greater than about 50 microns, not greater than about 48 microns, not greater than about 46 microns, not greater than about 44 microns, not greater than about 42 microns, not greater than about 40 microns, not greater than about 38 microns, not greater than about 36 microns, not greater than about 34 microns, not greater than about 32 microns, not greater than about 30 microns, not greater than about 38 microns, not greater than about 36 microns, not greater than about 34 microns, not greater than about 32 microns, not greater than about 30 microns, not greater than about 28 microns, not greater than about 26 microns, not greater than about 24 microns, not greater than about 22 microns, not greater than about 20 microns, not greater than about 18 microns, not greater than about 16 microns, not greater than about 14 microns, not greater than about 12 microns, not greater than about 10 microns.

Item 20. The shaped abrasive particle of any one of items 3 and 18, wherein the body comprises a tip sharpness of at least about 2 microns, at least about 4 microns, at least about 6 microns, at least about 8 microns, at least about 10 microns, at least about 12 microns, at least about 14 microns, at least about 16 microns, at least about 18 microns, at least about 20 microns, at least about 22 microns, at least about 24 microns, at least about 26 microns, at least about 28 microns, at least about 30 microns, at least about 32 microns, at least about 34 microns, at least about 36 microns, at least about 38 microns, at least about 40 microns, at least about 42 microns, at least about 44 microns, at least about 46 microns, at least about 48 microns, at least about 50 microns, at least about 52 microns, at least about 54 microns, at least about 56 microns, at least about 58 microns, at least about 60 microns, at least about 62 microns, at least about 64 microns, at least about 66 microns, at least about 68 microns, at least about 70 microns.

Item 21. The shaped abrasive particle of any one of items 1, 2, 3, 4, 5, 6, 7, and 8, wherein the body comprises an additive, wherein the additive comprises an oxide, wherein the additive comprises a metal element, wherein the additive comprises a rare-earth element.

Item 22. The shaped abrasive article of item 21, wherein the additive comprises a dopant material, wherein the dopant material includes an element selected from the group consisting of an alkali element, an alkaline earth element, a rare earth element, a transition metal element, and a combination thereof, wherein the dopant material comprises an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

Item 23. The shaped abrasive particle of any one of items 1 2, 3, 4, 5, 6, 7, and 8, wherein the body comprises at least about 95 wt % alumina for the total weight of the body, at least about 95.1 wt %, at least about 95.2 wt %, at least about 95.3 wt %, at least about 95.4 wt %, at least about 95.5 wt %, at least about 95.6 wt %, at least about 95.7 wt %, at least about 95.8 wt %, at least about 95.9 wt %, at least about 96 wt %, at least about 96.1 wt %, at least about 96.2 wt %, at least about 96.3 wt %, at least about 96.4 wt %, at least about 96.5 wt %, at least about 96.6 wt %, at least about 96.7 wt %, at least about 96.8 wt %, at least about 96.9 wt %, at least about 97 wt %, at least about 97.1 wt %, at least about 97.2 wt %, at least about 975.3 wt %, at least about 97.4 wt %, at least about 97.5 wt %.

Item 24. The shaped abrasive particle of any one of items 1 2, 3, 4, 5, 6, 7, and 8, wherein body comprises not greater than about 99.5 wt % alumina for the total weight of the body, not greater than about 99.4 wt %, not greater than about 99.3 wt %, not greater than about 99.2 wt %, not greater than about 99.1 wt %, not greater than about 99 wt %, not greater than about 98.9 wt %, not greater than about 98.8 wt %, not greater than about 98.7 wt %, not greater than about 98.6 wt %, not greater than about 98.5 wt %, not greater than about 98.4 wt %, not greater than about 98.3 wt %, not greater than about 98.2 wt %, not greater than about 98.1 wt %, not greater than about 98 wt %, not greater than about 97.9 wt %, not greater than about 97.8 wt %, not greater than about 97.7 wt %, not greater than about 97.6 wt %, not greater than about 97.5 wt %.

Item 25. The shaped abrasive particle of any one of items 1 2, 3, 4, 5, 6, 7, and 8, wherein the body consists essentially of alumina.

Item 26. The shaped abrasive particle of any one of items 1 2, 3, 4, 5, 6, 7, and 8, wherein the body comprises a polycrystalline material including crystalline grains, wherein the average grain size is not greater than about 1 micron, not greater than about 0.9 microns, not greater than about 0.8 microns, not greater than about 0.7 microns, not greater than about 0.6 microns.

Item 27. The shaped abrasive particle of item 26, wherein the average grain size is at least about 0.01 microns, at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns.

Item 28. The shaped abrasive particle of any one of items 1 2, 3, 4, 5, 6, 7, and 8, wherein the body is essentially free of a binder, wherein the body is essentially free of an organic material, wherein the body is essentially free of rare earth elements, wherein the body is essentially free of iron.

Item 29. The shaped abrasive particle of any one of items 1 2, 3, 4, 5, 6, 7, and 8, wherein the body is formed from a seeded sol gel.

Item 30. The shaped abrasive particle of any one of items 1 2, 3, 4, 5, 6, 7, and 8, wherein the body comprises a primary aspect ratio of width:length of at least about 1:1 and not greater than about 10:1.

Item 31. The shaped abrasive particle of any one of items 1 2, 3, 4, 5, 6, 7, and 8, wherein the body comprises a secondary aspect ratio defined by a ratio of width:height within a range between about 5:1 and about 1:1.

Item 32. The shaped abrasive particle of any one of items 1 2, 3, 4, 5, 6, 7, and 8, wherein the body comprises a tertiary aspect ratio defined by a ratio of length:height within a range between about 6:1 and about 1:1.

Item 33. The shaped abrasive particle of any one of items 1 2, 3, 4, 5, 6, 7, and 8, wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 34. The shaped abrasive particle of any one of items 1 2, 3, 4, 5, 6, 7, and 8, wherein the body comprises a two-dimensional polygonal shape as viewed in a plane defined by a length and width, wherein the body comprises a two dimensional shape having at least 3 exterior points, at least 4 exterior points, at least 5 exterior points, at least 6 exterior points, at least 7 exterior points, at least 8 exterior points, at least 9 exterior points.

Item 35. The shaped abrasive particle of any one of items 1 2, 3, 4, 5, 6, 7, and 8, wherein the body is coupled to a substrate as part of a fixed abrasive, wherein the fixed abrasive article is selected from the group consisting of a bonded abrasive article, a coated abrasive article, and a combination thereof.

Item 36. The shaped abrasive particle of item 35, wherein the substrate is a backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof.

Item 37. The shaped abrasive particle of item 36, wherein the backing comprises an additive selected from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 38. The shaped abrasive particle of item 36, further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 39. The shaped abrasive particle of item 38, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

Item 40. The shaped abrasive particle of item 36, wherein the shaped abrasive particle is part of a plurality of a first type of shaped abrasive particles, wherein a majority of the first type of shaped abrasive particles are coupled to the backing in an open coat, wherein the open coat comprises a coating density of not greater than about 70 particles/cm$^2$, not greater than about 65 particles/cm$^2$, not greater than about 60 particles/cm$^2$, not greater than about 55 particles/cm$^2$, not greater than about 50 particles/cm$^2$, at least about 5 particles/cm$^2$, at least about 10 particles/cm$^2$.

Item 41. The shaped abrasive particle of item 36, wherein the shaped abrasive particle is part of a plurality of a first type of shaped abrasive particles, wherein a majority of the first type of shaped abrasive particles are coupled to the backing in a closed coat, wherein having a closed coat of the blend of shaped abrasive particles on a backing, wherein the closed coat comprises a coating density of at least about 75 particles/cm$^2$, at least about 80 particles/cm$^2$, at least about 85 particles/cm$^2$, at least about 90 particles/cm$^2$, at least about 100 particles/cm$^2$.

Item 42. The shaped abrasive particle of item 36, wherein the shaped abrasive particle is part of a blend including a plurality of a first type of shaped abrasive particles and a third type of abrasive particle, wherein the third type of abrasive particle comprises a shaped abrasive particle, wherein the third type of abrasive particle comprises a diluent type of abrasive particle, wherein the diluent type of abrasive particle comprises an irregular shape.

Item 43. The shaped abrasive particle of item 42, wherein the blend of abrasive particles comprises a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

Item 44. The shaped abrasive particle of any one of items 1 2, 3, 4, 5, 6, 7, and 8, wherein the body comprises a length (l), a width (w), and a height (hi), wherein the length>width, the length>height, and the width>height.

Item 45. The shaped abrasive particle of item 44, wherein the height (h) is at least about 70 microns, at least about 80 microns, such as at least about 90 microns, at least about 100 microns, at least about 100 microns, at least about 120 microns, at least about 150 microns, at least about 175 microns, at least about 200 microns, at least about 225 microns, at least about 250 microns, at least about 275 microns at least about 300 microns, and not greater than about 3 mm, not greater than about 2 mm, not greater than about 1.5 mm, not greater than about 1 mm, not greater than about 800 microns, not greater than about 600 microns, not greater than about 500 microns, not greater than about 475 microns, not greater than about 450 microns, not greater than about 425 microns, not greater than about 400 microns, not greater than about 375 microns, not greater than about 350 microns, not greater than about 325 microns, not greater than about 300 microns, not greater than about 275 microns, not greater than about 250 microns.

Item 46. The shaped abrasive particle of item 44, wherein the width is at least about 200 microns, at least about 250 microns, at least about 300 microns, at least about 350 microns, at least about 400 microns, at least about 450 microns, at least about 500 microns, at least about 550 microns, at least about 600 microns, at least about 700 microns, at least about 800 microns, at least about 900 microns, and not greater than about 4 mm, not greater than about 3 mm, not greater than about 2.5 mm, not greater than about 2 mm.

Item 47. The shaped abrasive particle of any one of items 1 2, 3, 4, 5, 6, 7, and 8, wherein the body comprises a percent flashing of not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, not greater than about 4%.

Item 48. The shaped abrasive particle of any one of items 1 2, 3, 4, 5, 6, 7, and 8, wherein the body comprises a dishing value (d) of not greater than about 2, not greater than about 1.9, not greater than about 1.8, not greater than about 1.7, not greater than about 1.6, not greater than about 1.5, not greater than about 1.2, and at least about 0.9, at least about 1.0.

Item 49. The shaped abrasive particle of any one of items 1 2, 3, 4, 5, 6, 7, and 8, wherein the shaped abrasive particle is part of a plurality of a first type of shaped abrasive particles, wherein a majority of the first type of shaped abrasive particles are coupled to the backing in a side orientation, wherein at least about 55% of the shaped abrasive particles of the plurality of shaped abrasive particles are coupled to the backing in a side orientation, at least about 60%, at least about 65%, at least about 70%, at least about 75%, at least about 77%, at least about 80%, and not greater than about 99%, not greater than about 95%, not greater than about 90%, not greater than about 85%.

Item 50. The shaped abrasive particle of any one of items 1 2, 3, 5, 6, 7, and 8, wherein at least one side surface of the body has a partially-concave shape.

Item 51. The shaped abrasive particle of any one of items 1 2, 3, 4, 7, and 8, wherein a first portion of the side surface extends between a first corner and a second corner of the body that are adjacent to each other, and wherein the first portion of the side surface comprises a first curved section joined to a first linear section.

Item 52. The shaped abrasive particle of any one of items 4, 5, and 51, wherein the first linear section comprises a first linear section length (Ll1) and the first curved section comprises a first curved section length (Lc1).

Item 53. The shaped abrasive particle of item 52, wherein Lc1>Ll1.

Item 54. The shaped abrasive particle of item 52, wherein Ll1>Lc1.

Item 55. The shaped abrasive particle of item 52, further comprising a length factor (Ll1/Lc1) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 56. The shaped abrasive particle of item 55, wherein the length factor (Ll1/Lc1) is at least about 0.05, at least about 0.1, at least about 0.15, at least about 0.2.

Item 57. The shaped abrasive particle of item 52, further comprising a length factor (Lc1/Ll1) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 58. The shaped abrasive particle of item 57, wherein the length factor (Lc1/Ll1) is at least about 0.05, at least about 0.1, at least about 0.15, at least about 0.2.

Item 59. The shaped abrasive particle of any one of items 4, 5, and 51, wherein the first portion of the side surface further comprises a second linear section joined to the first curved section.

Item 60. The shaped abrasive particle of item 59, wherein the second linear section comprises a length (Ll2), and wherein Ll1 is substantially equal to Ll2.

Item 61. The shaped abrasive particle of item 59, wherein Lc1>Ll2.

Item 62. The shaped abrasive particle of item 59, further comprising a length factor (Ll2/Lc1) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 63. The shaped abrasive particle of item 62, wherein the length factor (Ll2/Lc1) is at least about 0.05, at least about 0.1, at least about 0.15, at least about 0.2.

Item 64. The shaped abrasive particle of item 59, further comprising a length factor (Lc1/Ll2) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 65. The shaped abrasive particle of item 59, wherein the length factor (Lc1/Ll2) is at least about 0.05, at least about 0.1, at least about 0.15, at least about 0.2.

Item 66. The shaped abrasive particle of item 59, further comprising a linear sum factor ((Ll1+Ll2)/Lc1) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 67. The shaped abrasive particle of item 66, wherein the linear sum factor ((Ll1+Ll2)/Lc1) is at least about 0.05, at least about 0.1, at least about 0.15, at least about 0.2.

Item 68. The shaped abrasive particle of item 59, further comprising an inverse linear sum factor (Lc1/(Ll1+Ll2)) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 69. The shaped abrasive particle of item 68, wherein the inverse linear sum factor (Lc1/(Ll1+Ll2)) is at least about 0.05, at least about 0.1, at least about 0.15, at least about 0.2.

Item 70. The shaped abrasive particle of any one of items 1 2, 3, 4, 5, 7, and 8, wherein a first portion of the side surface comprises a first curved section joined to a first linear section and defining an interior corner defining an obtuse angle.

Item 71. The shaped abrasive particle of any one of items 6 and 70, wherein the obtuse angle has a value between at least about 92 degrees and not greater than about 178 degrees, wherein the obtuse angle is at least about 94 degrees, at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, at least about 140 degrees.

Item 72. The shaped abrasive particle of item 71, wherein the obtuse angle is not greater than about 176 degrees, not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, not greater than about 140 degrees.

Item 73. The shaped abrasive particle of any one of items 6 and 70, wherein the first portion of the side surface comprises a first interior corner and a second interior corner, wherein the first interior corner and the second interior corner are spaced apart from each other at opposite ends of the first curved section, wherein the first interior corner is disposed at the edge between the first linear section and the first curved section, and wherein the second interior corner is disposed at an edge between the first curved section and a second linear section.

Item 74. The shaped abrasive particle of any one of items 1 2, 3, 5, 6, 7, and 8, wherein the body comprises a first portion of the side surface having a partially-concave shape.

Item 75. The shaped abrasive particle of any one of items 4 and 74, wherein the partially-concave shape comprises a first curved section having a first curved section length (Lc1) that is a fraction of a total length of the first portion (Lfp1) of the side surface.

Item 76. The shaped abrasive particle of item 75, further comprising a length factor (Lc1/Lfp) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 77. The shaped abrasive particle of any one of items 4 and 74, wherein the first curved section has at least two distinct curvatures.

Item 78. The shaped abrasive particle of any one of items 4 and 74, wherein the first curved section defines an arc having a single distinct curvature.

Item 79. The shaped abrasive particle of any one of items 4 and 74, wherein the first curved section defines a concave shape.

Item 80. The shaped abrasive particle of any one of items 4 and 74, wherein the first curved section is disposed between a first linear section and a second linear section, wherein the first linear section terminates at a first end at a first external corner of the body, extends along the first portion of the side surface for a length (Ll1), and terminates at a second end at the first curved section and defines a first internal corner, wherein the second linear section terminates at first end at a second external corner of the body, extends along the first portion of the side surface for a length (Ll2), and terminates at a second end at the first curved section and defines a second internal corner.

Item 81. The shaped abrasive particle of any one of items 4 and 74, wherein the length of the first linear section (Ll1) is a fraction of a total length of the first portion of the side surface (Lfp), further comprising a length factor (Ll1/Lfp) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 82. The shaped abrasive particle of any one of items 4 and 74, wherein the length of the second linear section (Ll2) is a fraction of a total length of the first portion of the side surface (Lfp), further comprising a length factor (Ll2/Lfp) of not greater than about 1, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05.

Item 83. The shaped abrasive particle of any one of items 4 and 74, wherein the first curved section has a radius of curvature (Rc1) and the body comprises a width (w), and wherein the radius of curvature (Rc1) is at least half the width of the body, at least about 0.8 times the width of the body, at least 1.5 times the width of the body, at least 2 times the width of the body, and wherein the radius of curvature (Rc1) is not greater than about 50 times the width.

Item 84. The shaped abrasive particle of any one of items 4 and 74, wherein the first curved section has a first end spaced apart from a first external corner of the body.

Item 85. The shaped abrasive particle of any one of items 4 and 74, wherein the first curved section has a second end spaced apart from a second external corner of the body.

Item 86. The shaped abrasive particle of any one of items 4 and 74, wherein the body further comprises a second curved section Item 87. The shaped abrasive particle of any one of items 1, 2, 3, 4, 5, 6, 7, and 8, wherein the body comprises:
a second portion of the side surface extending between a second corner and a third corner of the body that are adjacent to each other, and wherein the second portion of the side surface comprises a second curved section joined to a third linear section.

Item 88. The shaped abrasive particle of any one of items 1, 2, 3, 4, 5, 6, 7, and 8, wherein
a third portion of the side surface extending between a first corner and a third corner of the body that are adjacent to each other, and wherein the third portion of the side surface comprises a third curved section joined to a fifth linear section.

Item 89. The shaped abrasive particle of any one of items 1, 2, 3, 4, 5, 6, 7, and 8, wherein the body comprises at least a first portion of the side surface having at least a first curved section, a second portion of the side surface separated from the first portion of the side surface by at least one external corner, the second portion comprising at least a second curved section, and a third portion of the side surface separated from the first portion of the side surface by at least one external corner and further separated from the second portion of the side surface by at least one external corner, wherein the third portion comprises at least a third curved section.

Item 90. The shaped abrasive particle of any one of items 1, 2, 3, 4, 5, 6, and 8, wherein the body is a hybrid polygonal shape having a sum of the external corners of substantially 180 degrees, and further comprising a first portion of the side surface having a first curved section.

Item 91. The shaped abrasive particle of any one of items 1, 2, 3, 4, 5, 6, and 7, wherein the body comprises a first maximum tip width (Wt1) that defines a maximum width of a first arm of the body, and wherein the first maximum tip width (Wt1) is disposed a distance from a first terminal end of the first arm and between a midpoint of the body and the first terminal end.

Item 92. The shaped abrasive particle of any one of items 8 and 91, wherein the first maximum tip width (Wt1) defines a maximum tip width location along an axis of the first arm, and wherein the first arm comprises a first tip length (Ltip1) extending bewteen the terminal end of the arm and the maximum tip width location, wherein the first tip length (Ltip1) is a fraction of a total length of the first arm (Larm1)

defined as a distance between the terminal end of the arm and the midpoint of the body, wherein the first tip length (Ltip1) is at least about 0.01(Larm1), at least about 0.02 (Larm1), at least about 0.03(Larm1), at least about 0.04 (Larm1), at least about 0.05(Larm1), at least about 0.06 (Larm1), at least about 0.07(Larm1), at least about 0.08 (Larm1), at least about 0.09(Larm1), at least about 0.1 (Larm1), at least about 0.12(Larm1), at least about 0.15 (Larm1), at least about 0.18(Larm1), at least about 0.2 (Larm1), at least about 0.22(Larm1), at least about 0.25 (Larm1), at least about 0.28(Larm1), at least about 0.3 (Larm1), at least about 0.32(Larm1), at least about 0.35 (Larm1), at least about 0.38(Larm1), at least about 0.4 (Larm1).

Item 93. The shaped abrasive particle of item 92, wherein the first tip length (Ltip1) is not greater than about 0.95 (Larm1), not greater than about 0.9(Larm1), not greater than about 0.85(Larm1), not greater than about 0.8(Larm1), not greater than about 0.75(Larm1), not greater than about 0.7(Larm1), not greater than about 0.65(Larm1), not greater than about 0.6(Larm1), not greater than about 0.55(Larm1), not greater than about 0.5(Larm1), not greater than about 0.45(Larm1).

Item 94. The shaped abrasive particle of any one of items 8 and 91, wherein the body further comprises a first throat width (Wth1) defining the narrowest portion of the first arm between a first maximum tip width location of the first arm and the midpoint, wherein the first throat width (Wth1) defines a first throat width location along an axis of the first arm, wherein the first throat location is closer to the midpoint than the first maximum tip width location.

Item 95. The shaped abrasive particle of item 94, wherein the first throat location defines a first throat length (Lth1) extending between the first throat location and the first maximum tip width location, wherein the first throat length (Lth1) is a fraction of a total length of the first arm (Larm1), wherein the first throat length (Lth1) is at least about 0.01(Larm1), at least about 0.02(Larm1), at least about 0.03(Larm1), at least about 0.04(Larm1), at least about 0.05(Larm1), at least about 0.06(Larm1), at least about 0.07(Larm1), at least about 0.08(Larm1), at least about 0.09(Larm1), at least about 0.1(Larm1), at least about 0.12 (Larm1), at least about 0.15(Larm1), at least about 0.18 (Larm1), at least about 0.2(Larm1), at least about 0.22 (Larm1), at least about 0.25(Larm1), at least about 0.28 (Larm1), at least about 0.3(Larm1), at least about 0.32 (Larm1), at least about 0.35(Larm1), at least about 0.38 (Larm1), at least about 0.4(Larm1).

Item 96. The shaped abrasive particle of item 95, wherein the first throat length (Lth1) is not greater than about 0.95(Larm1), not greater than about 0.9(Larm1), not greater than about 0.85(Larm1), not greater than about 0.8(Larm1), not greater than about 0.75(Larm1), not greater than about 0.7(Larm1), not greater than about 0.65(Larm1), not greater than about 0.6(Larm1), not greater than about 0.55(Larm1), not greater than about 0.5(Larm1), not greater than about 0.45(Larm1).

Item 97. The shaped abrasive particle of item 94, wherein the first throat width (Wth1) is less than the first maximum tip width (Wt1).

Item 98. The shaped abrasive particle of item 97, wherein the first throat width (Wth1) is not greater than about 0.95(Wt1), not greater than about 0.9(Wt1), not greater than about 0.85(Wt1), not greater than about 0.8(Wt1), not greater than about 0.75(Wt1), not greater than about 0.7 (Wt1), not greater than about 0.65(Wt1), not greater than about 0.6(Wt1), not greater than about 0.55(Wt1), not greater than about 0.5(Wt1), not greater than about 0.45 (Wt1).

Item 99. The shaped abrasive particle of item 98, wherein the first throat width (Wth1) is at least about 0.01(Wt1), at least about 0.05(Wt1), at least about 0.08(Wt1), at least about 0.1(Wt1), at least about 0.12(Wt1), at least about 0.15(Wt1), at least about 0.18(Wt1), at least about 0.2(Wt1), at least about 0.22(Wt1), at least about 0.25(Wt1), at least about 0.28(Wt1), at least about 0.3(Wt1), at least about 0.32(Wt1), at least about 0.35(Wt1), at least about 0.38 (Wt1), at least about 0.4(Wt1), at least about 0.42(Wt1), at least about 0.45(Wt1), at least about 0.48(Wt1), at least about 0.5(Wt1).

Item 100. The shaped abrasive particle of any one of items 8 and 91, further comprising:

a second maximum tip width (Wt2) that defines a maximum width of a second arm of the body, and wherein the second maximum tip width (Wt2) is disposed between a second terminal end of the second arm and the midpoint of the body; and a third maximum tip width (Wt3) that defines a maximum width of a third arm of the body, and wherein the third maximum tip width (Wt3) is disposed between a third terminal end of the third arm and the midpoint of the body.

Item 101. The shaped abrasive particle of item 100, further comprising:

wherein the body further comprises a second throat width (Wth2) defining the narrowest portion of the second arm between a second maximum tip width location of the second arm and the midpoint, wherein the second throat width (Wth2) defines a second throat width location along an axis of the second arm and wherein the second throat location is closer to the midpoint than the second maximum tip width location; and wherein the body further comprises a third throat width (Wth3) defining the narrowest portion of the third arm between the third maximum width location of the third arm and the midpoint, wherein the third throat width (Wth3) defines a third throat width location along an axis of the third arm and wherein the third throat location is closer to the midpoint than the third maximum tip width location.

Item 102. A method of making a shaped abrasive particle comprising forming a body of a shaped abrasive comprising at least one of:

i) selecting a material having a predetermined strength within a range between at least about 350 MPa and not greater than about 1500 MPa and forming the body of the shaped abrasive particle with a predetermined tip sharpness and predetermined Shape Index based upon the predetermined strength;

ii) selecting a predetermined Shape Index of the body of the shaped abrasive particle within a range between at least about 0.01 and not greater than about 0.49 and forming the body with the predetermined tip sharpness and the predetermined strength based upon the predetermined Shape Index; and iii) selecting a predetermined tip sharpness of a body of the shaped abrasive particle within a range between at least about 1 micron and not greater than about 80 microns, and forming the body of a shaped abrasive particle with a predetermined Shape Index and a predetermined strength based upon the predetermined tip sharpness.

Item 103. The method of item 102, wherein forming comprises controlling the interrelationship of grain features selected from the group of predetermined tip sharpness, predetermined Shape Index, and predetermined strength of the body of the shaped abrasive particle to influence a self-sharpening behavior of the shaped abrasive particle.

Item 104. The method of item 102, wherein controlling the interrelationship of grain features comprises forming the body with a sharpness-shape-strength factor (3SF) within a range between about 0.7 and about 1.7.

Item 105. The method of item 102, wherein forming comprises a method selected from the group consisting of depositing, printing, extruding, molding, casting, pressing, punching, sectioning, and a combination thereof.

Item 106. The method of item 102, wherein the body comprises a first major surface, a second major surface, and a side surface extending between the first major surface and the second major surface, and wherein the body comprises at least one of:

a first portion of the side surface having a partially-concave shape;

a first portion of the side surface extending between a first corner and second corner of the body that are adjacent to each other, and wherein the first portion of the side surface comprises a first curved section joined to a first linear section;

a first portion of the side surface comprising a first curved section joined to a first linear section and defining an interior corner defining an obtuse angle;

a hybrid polygonal shape having a sum of the external corners of substantially 180 degrees, and further comprising a first portion of the side surface having a first curved section;

a first maximum tip width (Wt1) that defines a maximum width of a first arm of the body, and wherein the first maximum tip width (Wt1) is disposed between a first terminal end of the first arm and a midpoint of the body; and a combination thereof.

Item 107. A fixed abrasive comprising abrasive particles overlying a substrate, wherein the fixed abrasive comprises a half-life/initial energy factor of not greater than 1.

Item 108. A fixed abrasive comprising abrasive particles overlying a substrate, wherein the fixed abrasive comprises a minimum specific grinding energy factor of at least 5%.

Item 109. The fixed abrasive article of item 108, wherein the fixed abrasive comprises a half-life/initial energy factor of not greater than 1.

Item 110. The fixed abrasive article of any one of items 107 and 109, wherein the fixed abrasive comprises a half-life/initial energy factor of not greater than 1.20 or not greater than 1.16 or not greater than 1.10 or not greater than 1.06 or not greater than 1.00 or not greater than 0.99 or not greater than 0.98 or not greater than 0.97 or not greater than 0.96 or not greater than 0.95 or not greater than 0.94 or not greater than 0.93 or not greater than 0.92 or not greater than 0.91 or not greater than 0.9 or not greater than 0.89 or not greater than 0.88 or not greater than 0.87 or not greater than 0.86 or not greater than 0.85 or not greater than 0.84 or not greater than 0.83 or not greater than 0.82 or not greater than 0.81 or not greater than 0.8 or not greater than 0.79 or not greater than 0.78 or not greater than 0.77 or not greater than 0.76 or not greater than 0.75 or not greater than 0.74 or not greater than 0.73 or not greater than 0.72 or not greater than 0.71 or not greater than 0.7 or not greater than 0.69 or not greater than 0.68 or not greater than 0.67 or not greater than 0.66 or not greater than 0.65 or not greater than 0.64 or not greater than 0.63 or not greater than 0.62 or not greater than 0.61 or not greater than 0.6 or not greater than 0.55 or not greater than 0.5.

Item 111. The fixed abrasive article of item 110, wherein the fixed abrasive comprises a half-life/initial energy factor of at least 0.01 or at least 0.1 or at least 0.15 or at least 0.2 or at least 0.25 or at least 0.3 or at least 0.35 or at least 0.4 or at least 0.45 or at least 0.5 or at least 0.55 or at least 0.6 or at least 0.65 or at least 0.7 or at least 0.75 or at least 0.8 or at least 0.85 or at least 0.9 or at least 0.95 or at least 0.99 or at least 1 or at least 1.01.

Item 112. The fixed abrasive article of item 107, wherein the fixed abrasive comprises a minimum specific grinding energy factor of at least 5%.

Item 113. The fixed abrasive article of any one of items 108 and 112, wherein the fixed abrasive comprises a minimum specific grinding energy factor of at least 5.5% or at least 6% or at least 6.5% or at least 7% or at least 7.5% or at least 8% or at least 8.5% or at least 9% or at least 9.5% or at least 10% or at least 10.5% or at least 11% or at least 11.5% or at least 12% or at least 12.5% or at least 13% or at least 13.5% or at least 14% or at least 14.5%.

Item 114. The fixed abrasive article of item 113, wherein the fixed abrasive comprises a minimum specific grinding energy factor of not greater than 60% or not greater than 50% or not greater than 40% or not greater than 30% or not greater than 25% or not greater than 20% or not greater than 18% or not greater than 15%.

Item 115. The fixed abrasive article of any one of items 107 and 108, further comprising a coated abrasive article defining a single layer of the abrasive particles coupled to a major surface of the substrate.

Item 116. The fixed abrasive article of any one of items 107 and 108, wherein the substrate is a backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof.

Item 117. The fixed abrasive article of item 116, wherein the backing comprises an additive selected from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 118. The fixed abrasive article of item 116, further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 119. The fixed abrasive article of item 118, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

Item 120. The fixed abrasive article of any one of items 107 and 108, wherein the abrasive particles include shaped abrasive particles.

Item 121. The fixed abrasive article of any one of items 107 and 108, wherein the abrasive particles include a plurality of a first type of shaped abrasive particles, wherein a majority of the first type of shaped abrasive particles are coupled to the backing in an open coat, wherein the open coat comprises a coating density of not greater than about 70 particles/cm$^2$.

Item 122. The fixed abrasive article of any one of items 107 and 108, wherein the abrasive particles include a plurality of a first type of shaped abrasive particles, wherein a majority of the first type of shaped abrasive particles are coupled to the backing in a closed coat, wherein having a closed coat of the blend of shaped abrasive particles on a backing, wherein the closed coat comprises a coating density of at least about 75 particles/cm$^2$.

Item 123. The fixed abrasive article of any one of items 107 and 108, wherein the abrasive particles include a blend including a plurality of a first type of shaped abrasive particles and a second type of abrasive particle, wherein the second type of abrasive particle comprises a shaped abrasive particle, wherein the second type of abrasive particle comprises a diluent type of abrasive particle, wherein the diluent type of abrasive particle comprises an irregular shape.

Item 124. The fixed abrasive article of item 123, wherein the blend of abrasive particles comprises a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

Item 125. The fixed abrasive article of any one of items 107 and 108, wherein the abrasive particles include a shaped abrasive particle having a body comprising a first major surface, a second major surface, and a side surface extending between the first major surface and the second major surface, wherein the body comprises an average tip sharpness within a range between not greater than about 80 microns and at least about 1 micron, a Shape Index within a range between at least about 0.01 and not greater than about 0.47, and the body comprises a strength of at least about 350 MPa and not greater than about 1500 MPa.

Item 126. The fixed abrasive article of any one of items 107 and 108, wherein the abrasive particles include a shaped abrasive particle having a body comprising a first major surface, a second major surface, and a side surface extending between the first major surface and the second major surface, wherein a first portion of the side surface has a partially-concave shape.

Item 127. The fixed abrasive article of any one of items 107 and 108, wherein the abrasive particles include a shaped abrasive particle having a body comprising a first major surface, a second major surface, and a side surface extending between the first major surface and the second major surface, wherein a first portion of the side surface extends between a first corner and second corner of the body that are adjacent to each other, and wherein the first portion of the side surface comprises a first curved section joined to a first linear section.

Item 128. The fixed abrasive article of any one of items 107 and 108, wherein the abrasive particles include a shaped abrasive particle having a body comprising a first major surface, a second major surface, and a side surface extending between the first major surface and the second major surface, wherein a first portion of the side surface comprises a first curved section joined to a first linear section and defining an interior corner defining an obtuse angle.

Item 129. The fixed abrasive article of any one of items 107 and 108, wherein the abrasive particles include a shaped abrasive particle having a body comprising a first major surface, a second major surface, and a side surface extending between the first major surface and the second major surface, wherein the body is a hybrid polygonal shape having a sum of the external corners of substantially 180 degrees, and further comprising a first portion of the side surface having a first curved section.

Item 130. The fixed abrasive article of any one of items 107 and 108, wherein the abrasive particles include a shaped abrasive particle having a body comprising a first major surface, a second major surface, and a side surface extending between the first major surface and the second major surface, wherein the body comprises a first maximum tip width (Wt1) that defines a maximum width of a first arm of the body, and wherein the first maximum tip width (Wt1) is disposed a distance from a first terminal end of the first arm and between a midpoint of the body and the first terminal end.

Item 131. The fixed abrasive article of any one of items 107 and 108, wherein at least a majority of the abrasive particles include shaped abrasive particles.

Item 132. The fixed abrasive article of any one of items 107 and 108, wherein the abrasive particles include a shaped abrasive particle having a body including a first portion of the side surface having a partially-concave shape.

Item 133. The fixed abrasive article of item 132, wherein the partially-concave shape comprises a first curved section having a first curved section length (Lc1) that is a fraction of a total length of a first portion (Lfp1) of the side surface.

Item 134. The fixed abrasive article of item 133, further comprising a length factor (Lc1/Lfp) of not greater than about 1 or not greater than about 0.95 or not greater than about 0.9 or not greater than about 0.85 or not greater than about 0.8 or not greater than about 0.75 or not greater than about 0.7 or not greater than about 0.65 or not greater than about 0.6 or not greater than about 0.55 or not greater than about 0.5 or not greater than about 0.45 or not greater than about 0.4 or not great not greater than about 0.35 or not greater than about 0.3 or not greater than about 0.35 or not greater than about 0.3 or not greater than about 0.25 or not greater than about 0.2 or not greater than about 0.15 or not greater than about 0.1 or not greater than about 0.05.

Item 135. The fixed abrasive article of item 133, wherein the first curved section has at least two distinct curvatures.

Item 136. The fixed abrasive article of item 133, wherein the first curved section defines an arc having a single distinct curvature.

Item 137. The fixed abrasive article of item 133, wherein the first curved section defines a concave shape.

Item 138. The fixed abrasive article of item 133, wherein the first curved section is disposed between a first linear section and a second linear section, wherein the first linear section terminates at a first end at a first external corner of the body, extends along the first portion of the side surface for a length (Ll1), and terminates at a second end at the first curved section and defines a first internal corner, wherein the second linear section terminates at first end at a second external corner of the body, extends along the first portion of the side surface for a length (Ll2), and terminates at a second end at the first curved section and defines a second internal corner.

Item 139. The fixed abrasive article of item 133, wherein the first curved section has a radius of curvature (Rc1) and the body comprises a width (w), and wherein the radius of curvature (Rc1) is at least half the width of the body or at least about 0.8 times the width of the body or at least 1.5 times the width of the body or at least 2 times the width of the body, and wherein the radius of curvature (Rc1) is not greater than about 50 times the width.

Item 140. The fixed abrasive article of item 133, wherein the first curved section has a radius of curvature (Rc1) that is not greater than 4 mm or not greater than 3 mm or not greater than 2.5 mm or at least 0.01 mm or at least 0.1 mm or at least 0.5 mm or at least 0.8 mm or at least 1 mm or at least 1.1 mm or at least 1.5 mm.

Item 141. The fixed abrasive article of any one of items 107 and 108, wherein the abrasive particles include a shaped abrasive particle having a body comprising a first maximum tip width (Wt1) that defines a maximum width of a first arm of the body, and wherein the first maximum tip width (Wt1) is disposed a distance from a first terminal end of the first arm and between a midpoint of the body and the first terminal end.

Item 142. The fixed abrasive article of item 141, wherein the first maximum tip width (Wt1) defines a maximum tip width location along an axis of the first arm, and wherein the first arm comprises a first tip length (Ltip1) extending between the terminal end of the arm and the maximum tip width location.

Item 143. The fixed abrasive article of item 141, wherein the first tip length (Ltip1) is a fraction of a total length of the first arm (Larm1) defined as a distance between the terminal end of the arm and the midpoint of the body, wherein the first tip length (Ltip1) is at least about 0.01(Larm1).

Item 144. The fixed abrasive article of item 141, wherein the first tip length (Ltip1) is not greater than about 0.95 (Larm1).

Item 145. The fixed abrasive article of any one of items 107 and 108, wherein the body further comprises a first throat width (Wth1) defining the narrowest portion of a first arm between a first maximum tip width location of the first arm and a midpoint, wherein the first throat width (Wth1) defines a first throat width location along an axis of the first arm, and wherein the first throat location is closer to the midpoint than the first maximum tip width location.

Item 146. The fixed abrasive article of item 145, wherein the first throat location defines a first throat length (Lth1) extending between the first throat location and the first maximum tip width location, and wherein the first throat length (Lth1) is a fraction of a total length of the first arm (Larm1), and wherein the first throat length (Lth1) is at least about 0.01(Larm1).

Item 147. The fixed abrasive article of item 145, wherein the first throat length (Lth1) is not greater than about 0.95(Larm1).

Item 148. The fixed abrasive article of item 145, wherein the first throat width (Wth1) is less than the first maximum tip width (Wt1), wherein the first throat width (Wth1) is not greater than about 0.95(Wt1).

Item 149. The fixed abrasive article of item 148, wherein the first throat width (Wth1) is at least about 0.01(Wt1).

What is claimed is:

1. A shaped abrasive particle comprising a body comprising a first major surface, a second major surface, and a side surface extending between the first major surface and the second major surface, wherein the body comprises a two-dimensional shape as viewed in a plane parallel to the first major surface includes a first portion of the side surface having a first curved section between a first linear section and a second linear section, wherein the first linear section terminates at a first external corner of the body and the second linear section terminates at a second external corner of the body, and wherein the first curved section has a first curved section length (Lc1) that is a fraction of a total length of the first portion (Lfp1) of the side surface, further comprising a length factor (Lc1/Lfp1) of not greater than 0.95.

2. The shaped abrasive particle of claim 1, wherein the first curved section has at least two distinct curvatures.

3. The shaped abrasive particle of claim 2, wherein the first linear section comprises a first linear section length (Ll1) and wherein Ll1 is different compared to Lc1.

4. The shaped abrasive particle of claim 3, further comprising a length factor (Ll1/Lc1) of not greater than about 1 and at least about 0.05.

5. The shaped abrasive particle of claim 1, wherein the first curved section and the first linear section define an interior corner defining an obtuse angle.

6. The shaped abrasive particle of claim 1, wherein the first portion of the side surface comprises a first interior corner and a second interior corner, wherein the first interior corner and the second interior corner are spaced apart from each other at opposite ends of the first curved section, wherein the first interior corner is disposed at a first edge between the first linear section and the first curved section, and wherein the second interior corner is disposed at a second edge between the first curved section and the second linear section.

7. The shaped abrasive particle of claim 1, wherein the first curved section defines a concave shape.

8. The shaped abrasive particle of claim 1, wherein the first curved section has a radius of curvature (Rc1) and the body comprises a width (w), and wherein the radius of curvature (Rc1) is at least half the width (w) of the body.

9. The shaped abrasive particle of claim 1, wherein the body comprises a second portion of the side surface separated from the first portion of the side surface by the first external corner of the body, the second portion comprising at least a second curved section, and a third portion of the side surface separated from the first portion of the side surface by the second external corner of the body and further separated from the second portion of the side surface by a third external corner of the body, wherein the third portion comprises at least a third curved section.

10. The shaped abrasive particle of claim 1, wherein the body comprises a first maximum tip width (Wt1) that defines a maximum width of a first arm of the body, and wherein the first maximum tip width (Wt1) is disposed a distance from a first terminal end of the first arm and between a midpoint of the body and the first terminal end.

11. The shaped abrasive particle of claim 10, wherein the body further comprises a first throat width (Wth1) defining a narrowest portion of the first arm between a first maximum tip width location of the first arm and the midpoint of the body, wherein the first throat width (Wth1) defines a first throat width location along an axis of the first arm, wherein the first throat width location is closer to the midpoint than the first maximum tip width location.

12. The shaped abrasive particle of claim 11, wherein the first throat width location defines a first throat length (Lth1) extending between the first throat location and the first maximum tip width location, wherein the first throat length (Lth1) is a fraction of a first arm length (Larm1), wherein the first throat length (Lth1) is at least 0.05×(Larm1) and not greater than 0.9×(Larm1).

13. The shaped abrasive particle of claim 12, wherein the first throat width (Wth1) is at least 0.05×(Wt1) and not greater than 0.95×(Wt1).

14. The shaped abrasive particle of claim 13, wherein the body further comprises a second throat width (Wth2) defining a narrowest portion of a second arm between a second maximum tip width location of the second arm and the midpoint of the body, wherein the second throat width (Wth2) defines a second throat width location along an axis of the second arm and wherein the second throat width location is closer to the midpoint than is the second maximum tip width location; and wherein the body further comprises a third throat width (Wth3) defining a narrowest portion of a third arm between a third maximum tip width location of the third arm and the midpoint of the body, wherein the third throat width (Wth3) defines a third throat width location along an axis of the third arm and wherein the third throat width location is closer to the midpoint of the body than is the third maximum tip width location.

15. The shaped abrasive particle of claim 4, wherein the length factor (Ll1/Lc1) is at least 0.2 and not greater than 0.8.

16. The shaped abrasive particle of claim 3, wherein the second linear section comprises a length (Ll2), and wherein Ll1 is substantially equal to Ll2.

17. The shaped abrasive particle of claim 16, wherein the shaped abrasive particle has a linear sum factor ((Ll1+Ll2)/Lc1) of at least 0.05 and not greater than 1.

18. The shaped abrasive particle of claim 1, wherein the first curved section defines an arc having a single distinct curvature.

19. A plurality of shaped abrasive particles, each of the shaped abrasive particles having the features of claim 1, and wherein the plurality of shaped abrasive particles are part of a fixed abrasive article selected from the group consisting of a bonded abrasive article, a coated abrasive article, or a combination thereof.

20. A fixed abrasive article of claim 19, further including a blend of different types of abrasive particles, including a first type including the plurality of shaped abrasive particles and a second type different from the first type based on at least one of size, shape, hardness, fracture toughness, strength, tip sharpness, Shape Index, composition, type and/or content of dopants, or any combination thereof.

* * * * *

UNITED STATES PATENT AND TRADEMARK OFFICE
CERTIFICATE OF CORRECTION

PATENT NO. : 10,557,067 B2
APPLICATION NO. : 14/686733
DATED : February 11, 2020
INVENTOR(S) : Christopher Arcona et al.

Page 1 of 1

It is certified that error appears in the above-identified patent and that said Letters Patent is hereby corrected as shown below:

In the Specification

Column 5, Line 55, please delete "$Al_2O_3.H_2O$", and insert --$Al_2O_3 \cdot H_2O$--

Signed and Sealed this
Twenty-seventh Day of September, 2022

Katherine Kelly Vidal
*Director of the United States Patent and Trademark Office*